(12) United States Patent
Lee et al.

(10) Patent No.: US 12,362,898 B2
(45) Date of Patent: *Jul. 15, 2025

(54) METHODS, APPARATUS AND SYSTEMS FOR INTERFERENCE MANAGEMENT IN A FULL DUPLEX RADIO SYSTEM

(71) Applicant: InterDigital Patent Holdings, Inc., Wilmington, DE (US)

(72) Inventors: Moon-il Lee, Melville, NY (US); Janet A. Stern-Berkowitz, Little Neck, NY (US); J. Patrick Tooher, Montreal (CA); Nobuyuki Tamaki, Melville, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 8 days.

This patent is subject to a terminal disclaimer.

(21) Appl. No.: 18/220,401

(22) Filed: Jul. 11, 2023

(65) Prior Publication Data

US 2023/0353336 A1   Nov. 2, 2023

Related U.S. Application Data

(63) Continuation of application No. 17/113,703, filed on Dec. 7, 2020, now Pat. No. 11,743,020, which is a
(Continued)

(51) Int. Cl.
*H04L 5/14*     (2006.01)
*H04L 5/00*     (2006.01)

(52) U.S. Cl.
CPC ............ *H04L 5/1461* (2013.01); *H04L 5/006* (2013.01); *H04L 5/0066* (2013.01); *H04L 5/143* (2013.01)

(58) Field of Classification Search
CPC ..... H04L 5/1461; H04L 5/006; H04L 5/0066; H04L 5/143; H04L 5/0053; H04L 5/14;
(Continued)

(56) References Cited

U.S. PATENT DOCUMENTS 10,243,720 B2   3/2019   Lee et al.
2008/0062896 A1  3/2008   Shirakabe et al.
(Continued)

FOREIGN PATENT DOCUMENTS

CN   102648646 A   8/2012
CN   103120010 A   5/2013
(Continued)

OTHER PUBLICATIONS

"3rd Generation Partnership Project, Technical Specification Group Radio Access Network, Evolved Universal Terrestrial Radio Access (E-UTRA), Physical layer procedures (Release 11)", 3GPP TS 36.213 V11.4.0, Sep. 2013, 182 pages.
(Continued)

*Primary Examiner* — Walli Z Butt
(74) *Attorney, Agent, or Firm* — Majid Albassam

(57) ABSTRACT

Methods, apparatus and systems for enabling interference avoidance, for example from self and neighboring interference are disclosed. In one representative method implemented in a Wireless Transmit/Receive Unit (WTRU) using time-frequency (TF) resources in first and second directions, the method includes comprising TF resource muting or symbol muting, by the WTRU, one or more TF resources for communication in the first direction based on information associated with a communication in the second direction or subframe shortening, by the WTRU, by one or more TF resources for communication in the first direction based on information associated with a communication in the second direction.

24 Claims, 9 Drawing Sheets

Related U.S. Application Data continuation of application No. 16/259,428, filed on Jan. 28, 2019, now abandoned, which is a continuation of application No. 15/103,441, filed as application No. PCT/US2014/069786 on Dec. 11, 2014, now Pat. No. 10,243,720.

(60) Provisional application No. 61/917,924, filed on Dec. 18, 2013.

(58) Field of Classification Search
CPC .... H04L 1/0013; H04W 52/10; H04W 52/243
See application file for complete search history.

(56) References Cited

U.S. PATENT DOCUMENTS

| | | | |
|---|---|---|---|
| 2009/0034437 A1 | 2/2009 | Shin et al. | |
| 2011/0128895 A1 | 6/2011 | Sadek et al. | |
| 2011/0222445 A1 | 9/2011 | Alanara | |
| 2012/0076106 A1 | 3/2012 | Bhattad et al. | |
| 2013/0083710 A1 | 4/2013 | Chen et al. | |
| 2013/0194981 A1* | 8/2013 | Wang | H04L 5/14 370/280 |
| 2013/0194984 A1* | 8/2013 | Cheng | H04L 5/0073 370/294 |
| 2013/0223294 A1* | 8/2013 | Karjalainen | H04L 5/1438 370/277 |
| 2014/0301217 A1 | 10/2014 | Choi et al. | |
| 2014/0301336 A1 | 10/2014 | Kim et al. | |
| 2014/0328283 A1 | 11/2014 | Wan et al. | |
| 2015/0304096 A1 | 10/2015 | Sahlin et al. | |
| 2016/0234003 A1* | 8/2016 | Wang | H04L 5/0073 |
| 2016/0249245 A1 | 8/2016 | Kim et al. | |
| 2016/0278117 A1* | 9/2016 | Sahlin | H04W 72/0446 |
| 2017/0257184 A1* | 9/2017 | Stirling-Gallacher | H04L 1/0026 |
| 2018/0007724 A1* | 1/2018 | Kazmi | H04W 8/005 |

FOREIGN PATENT DOCUMENTS

| | | |
|---|---|---|
| GB | 2497937 A | 7/2013 |
| JP | 2008067211 A | 3/2008 |
| JP | 2013514722 A | 4/2013 |
| JP | 2013542642 A | 11/2013 |
| KR | 20090012956 A | 2/2009 |
| WO | WO 2011054372 A1 | 5/2011 |
| WO | WO 2011075178 A1 | 6/2011 |
| WO | WO 2012037025 A1 | 3/2012 |
| WO | WO 2013071471 A1 | 5/2013 |
| WO | WO 2013107214 A1 | 7/2013 |
| WO | WO 2013169170 A1 | 11/2013 |
| WO | WO 2014036025 A1 | 3/2014 |

OTHER PUBLICATIONS

"3rd Generation Partnership Project, Technical Specification Group Radio Access Network, Evolved Universal Terrestrial Radio Access (E-UTRA), Multiplexing and channel coding (Release 11)", 3GPP TS 36.212 V11.3.0, Jun. 2013, 84 pages.

3rd Generation Partnership Project (3GPP), TS 36.211 V11.4.0, 3rd Generation Partnership Project; Technical Specification Group Radio Access Network; Evolved Universal Terrestrial Radio Access (E-UTRA); Physical channels and modulation (Release 11), Sep. 2013, 120 pages.

"Text proposal on inband full duplex relay for TR 36.814", 3GPP Tdoc R1-101659, 3GPP TSG RAN WG1 Meeting #60, San Francisco, USA, Feb. 22-26, 2010, 4 pages.

"PCT International Search Report and Written Opinion", PCT Application No. PCT/US14/69786, Mar. 23, 2015, 16 pages.

\* cited by examiner

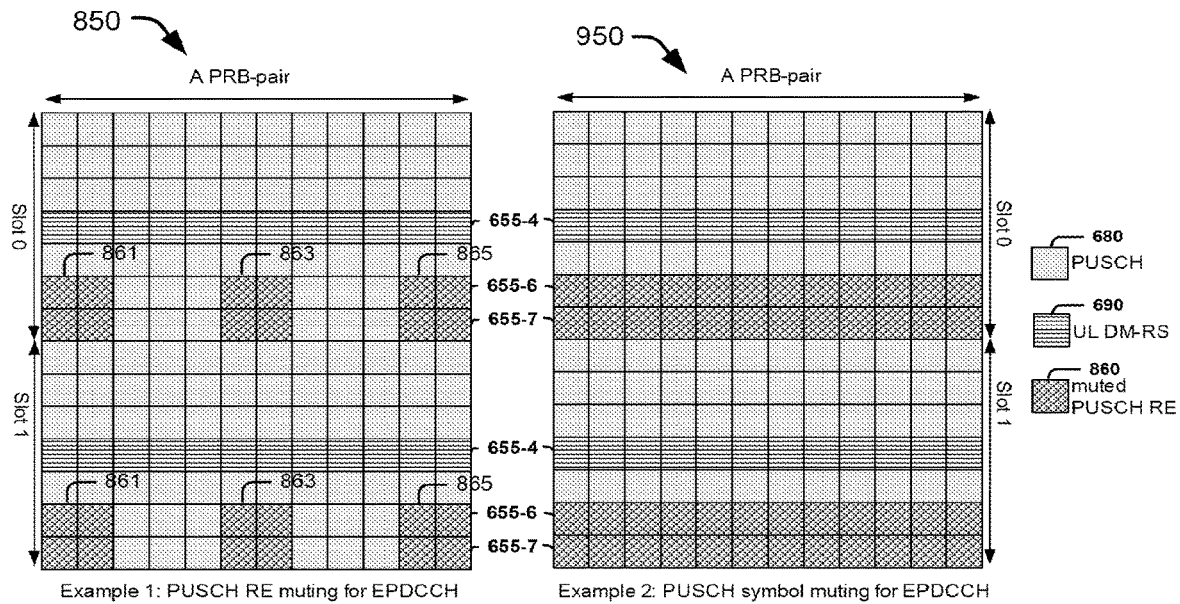
FIG. 8
FIG. 9
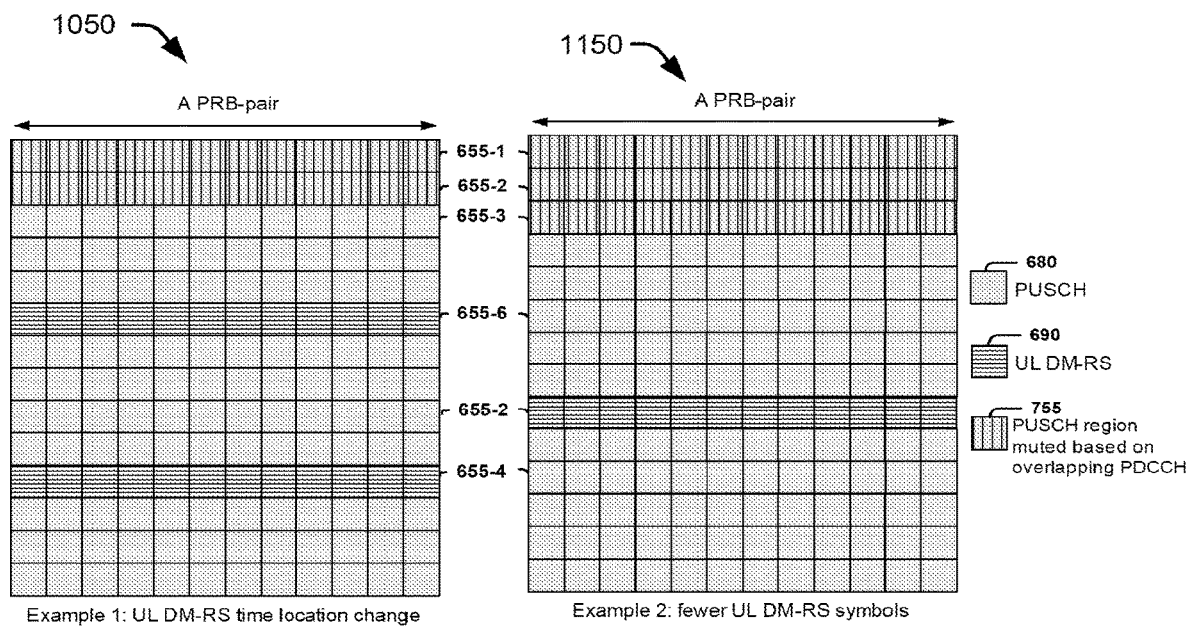
FIG. 10
FIG. 11

2210 — TF RESOURCE MUTE OR SYMBOL MUTE, BY THE WTRU, ONE OR MORE TF RESOURCES FOR COMMUNICATION IN THE FIRST DIRECTION BASED ON INFORMATION ASSOCIATED WITH A COMMUNICATION IN THE SECOND DIRECTION OR SUBFRAME SHORTEN, BY THE WTRU, BY ONE OR MORE TF RESOURCES FOR COMMUNICATION IN THE FIRST DIRECTION BASED ON INFORMATION ASSOCIATED WITH A COMMUNICATION IN THE SECOND DIRECTION

2310 — CONFIGURE THE WTRU FOR MUTING OF ONE OR MORE TF RESOURCES FOR COMMUNICATION IN THE FIRST DIRECTION BASED ON INFORMATION ASSOCIATED WITH A COMMUNICATION IN THE SECOND DIRECTION

2410 — CONFIGURE THE WTRU FOR SHORTENING OF A SUBFRAME FOR COMMUNICATION IN THE FIRST DIRECTION BASED ON INFORMATION ASSOCIATED WITH A COMMUNICATION IN THE SECOND DIRECTION

2510 — OBTAIN INFORMATION ASSOCIATED WITH COMMUNICATION IN THE SECOND DIRECTION INDICATING A SELF-INTERFERENCE CONDITION, A POTENTIAL SELF-INTERFERENCE CONDITION, A NEIGHBORING INTERFERENCE CONDITION OR A POTENTIAL NEIGHBORING INTERFERENCE CONDITION

2520 — CONFIGURE THE WTRU FOR AN INTERFERENCE AVOIDING TF RESOURCE STRUCTURE ON CONDITION THAT THE INFORMATION ASSOCIATED WITH COMMUNICATION IN THE SECOND DIRECTION INDICATES ANY OF: THE SELF-INTERFERENCE CONDITION, THE POTENTIAL SELF-INTERFERENCE CONDITION, THE NEIGHBORING INTERFERENCE CONDITION AND/OR THE POTENTIAL NEIGHBORING INTERFERENCE CONDITION

2610 — DETERMINE WHETHER TO TF MUTE, SYMBOL MUTE, AND/OR SUBFRAME SHORTEN A COMMUNICATION IN THE FIRST DIRECTION FOR CONTROLLING INTERFERENCE BETWEEN THE COMMUNICATION IN THE FIRST DIRECTION AND A COMMUNICATION IN THE SECOND DIRECTION

2620 — SEND, BY THE NAP, CONFIGURATION INFORMATION FOR THE WTRU TO TF MUTE, SYMBOL MUTE AND/OR SUBFRAME SHORTEN ONE OR MORE TF RESOURCES, ONE OR MORE SYMBOLS AND/OR ONE OR MORE SUBFRAMES FOR COMMUNICATION IN THE FIRST DIRECTION

METHODS, APPARATUS AND SYSTEMS FOR INTERFERENCE MANAGEMENT IN A FULL DUPLEX RADIO SYSTEM

CROSS REFERENCE TO RELATED APPLICATIONS

This application is a continuation of U.S. patent application Ser. No. 17/113,703, filed Dec. 7, 2020, which is a continuation of U.S. patent application Ser. No. 16/259,428, filed Jan. 28, 2019, which is a continuation of U.S. patent application Ser. No. 15/103,441, filed Jun. 10, 2016, which is the U.S. National Stage Application under 35 U.S.C. § 371 of International Patent Application No. PCT/US2014/069786, filed Dec. 11, 2014, which claims the benefit of U.S. Provisional Application No. 61/917,924, filed Dec. 18, 2013, the contents of each of which is incorporated herein by reference in their entirety.

FIELD

The present invention relates to the field of wireless communications and, more particularly, to methods, apparatus and systems for interference management, for example, in a full duplex radio system.

RELATED ART

Generally, conventional two-way communication systems separate transmit (Tx) and receive (Rx) signals at each device in at least one of: frequency, tune, or space.

BRIEF DESCRIPTION OF THE DRAWINGS

A more detailed understanding may be had from the Detailed Description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals in the Figures indicate like elements, and wherein:

FIG. 8 is a diagram illustrating another representative UL PRB structure showing Physical Uplink Shared Channel (PUSCH) Resource Element (RE) muting;

FIG. 9 is a diagram illustrating a further representative UL PRB structure showing PUSCH symbol muting;

FIG. 10 is a diagram of an additional representative PRB structure showing an example of a UL demodulation (DM) reference signal (DM-RS) time location change;

FIG. 11 is a diagram of still another representative UL PRB structure showing a reduced number of UL DM-RS symbols relative to FIG. 10;

FIG. 22 is a diagram illustrating a representative method implemented in a WTRU;

FIG. 23 is a diagram illustrating another representative method implemented in a WTRU;

FIG. 24 is a diagram illustrating an additional representative method implemented in a WTRU;

FIG. 25 is a diagram illustrating a further representative method implemented in a WTRU; and FIG. 26 is a diagram illustrating a representative method implemented in a Network Access Point (NAP) in communication with a WTRU.

DETAILED DESCRIPTION

A detailed description of illustrative embodiments may now be described with reference to the figures. However, while the present invention may be described in connection with representative embodiments, it is not limited thereto and it is to be understood that other embodiments may be used or modifications and additions may be made to the described embodiments for performing the same function of the present invention without deviating therefrom.

Although the representative embodiments are generally shown hereafter using wireless network architectures, any number of different network architectures may be used including networks with wired components and/or wireless components, for example.

Figure 1:
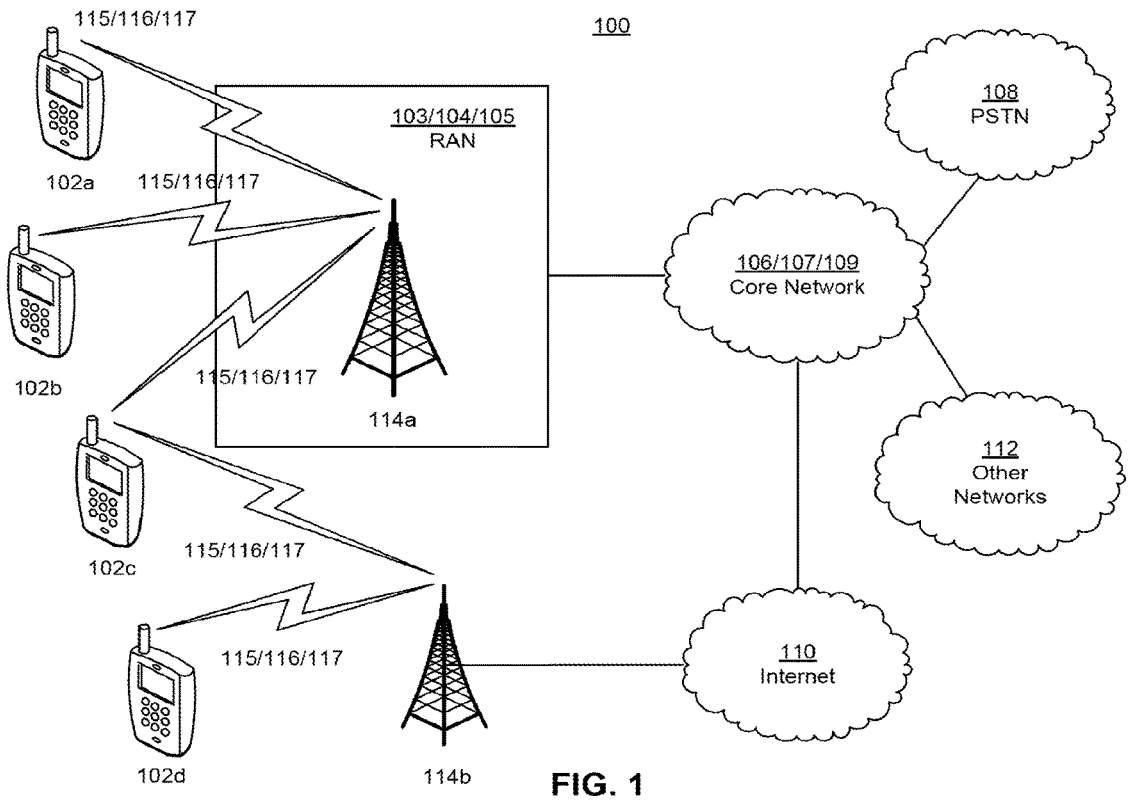
FIG. 1 is a system diagram illustrating an example communications system in which one or more disclosed embodiments may be implemented.

FIG. 1 is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1, the communications system 100 may include wireless transmit/receive units (WTRUs) 102a, 102b, 102c, 102d, a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like. The WTRU 102a, 102b, 102c and 102d is interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the other networks 112. By way of example, the base stations 114a, 114b may be a base transceiver station (BTS), a Node-B, an eNode-B (or cNB), a Home Node B, a Home eNode-B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, e.g., one for each sector of the cell. In another embodiment, the base station 114a may employ multiple-input multiple output (MIMO) technology and may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Tnteroperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1 may be a wireless router, Home Node B, Home eNode-B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM, UMTS, CDMA 2000, WiMAX, or WiFi radio technology.

The core network 106/107/109 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1 may be configured to communicate with the base station 114a, which may employ a cellular-based radio technology, and with the base station 114b, which may employ an IEEE 802 radio technology. Some or all of the WTRUs 102a, 102b, 102c, 102d in the communication system 100 may communicate with other devices using Bluetooth technology.

Figure 2:
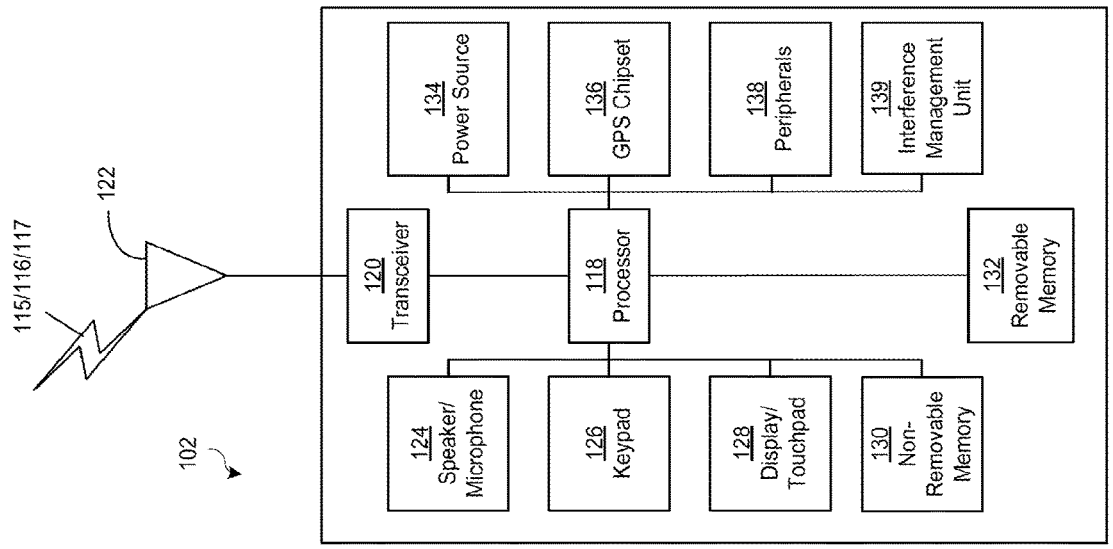
FIG. 2 is a system diagram illustrating an example wireless transmit/receive unit (WTRU) that may be used within the communications system illustrated in FIG. 1.

FIG. 2 is a system diagram illustrating an example WTRU 102. As shown in FIG. 2, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 2 depicts the processor 118 and the transceiver 120 as separate components, it will be appreciated that the processor 118 and the transceiver 120 may be integrated together in an electronic package or chip.

The transmit/receive element 122 may be configured to transmit signals to and/or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 2 as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and/or receiving wireless signals over the air interface 115/116/117.

The transceiver 120 may be configured to modulate the signals that are to be transmitted by the transmit/receive element 122 and/or to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

The WTRU 102 may include a full duplex radio for which transmission and reception of some or all of the signals (e.g., associated with particular subframes for both the UL (e.g., for transmission) and DL (e.g. for reception) may be, for example partially or fully, concurrent and/or simultaneous. The full duplex radio may include an interference management unit 139 to reduce and/or substantially eliminate SINTF via either hardware (e.g., a choke) or signal processing via a processor (e.g., a separate processor (not shown) or via processor 118).

Figure 3:
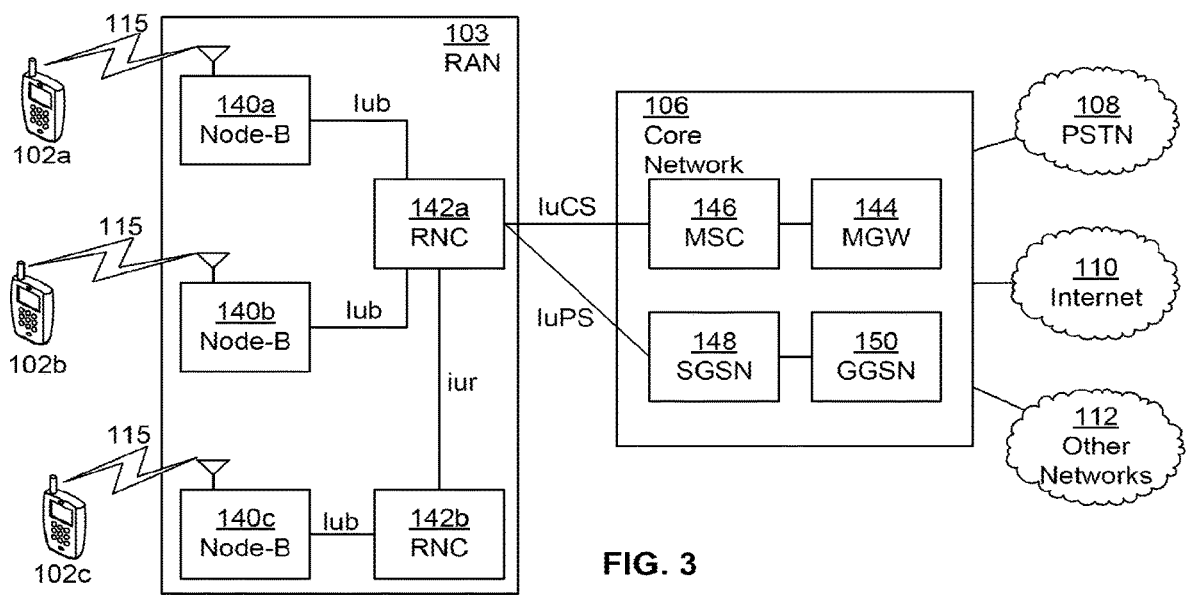
FIG. 3 is a system diagram illustrating an example radio access network and another example core network that may be used within the communications system illustrated in FIG. 1.

FIG. 3 is a system diagram illustrating the RAN 103 and the core network 106 according to another embodiment. As noted above, the RAN 103 may employ a UTRA radio technology to communicate with the WTRUs 102a, 102b, 102c over the air interface 115. The RAN 103 may also be in communication with the core network 106. As shown in FIG. 3, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 3, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 3 may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the other networks 112, which may include other wired and/or wireless networks that are owned and/or operated by other service providers.

Figure 4:
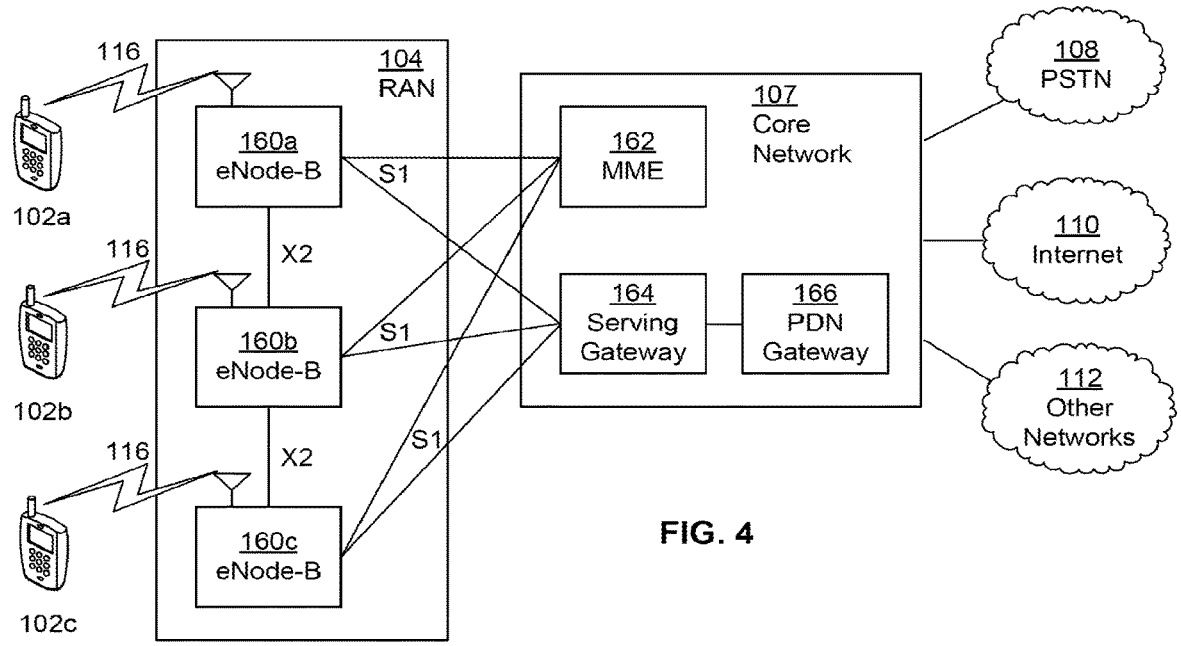
FIG. 4 is a system diagram illustrating another example radio access network and another example core network that may be used within the communications system illustrated in FIG. 1.

FIG. 4 is a system diagram illustrating the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 4, the eNode-Bs 160a, 160b, 160c may communicate with one another over an X2 interface. The eNode-B may include a full duplex radio similar to that of the WTRU (e.g., with an interference management unit). The core network 107 shown in FIG. 4 may include a mobility management entity (MME) 162, a serving gateway (SGW) 164, and a packet data network (PDN) gateway (or PGW) 166. While each of the foregoing elements are depicted as part of the core network 107, it will be appreciated that any of these elements may be owned and/or operated by an entity other than the core network operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may perform other functions, such as anchoring user planes during inter-eNode-B handovers, triggering paging when DL data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the other networks 112, which may include other wired and/or wireless networks that are owned and/or operated by other service providers.

Figure 5:
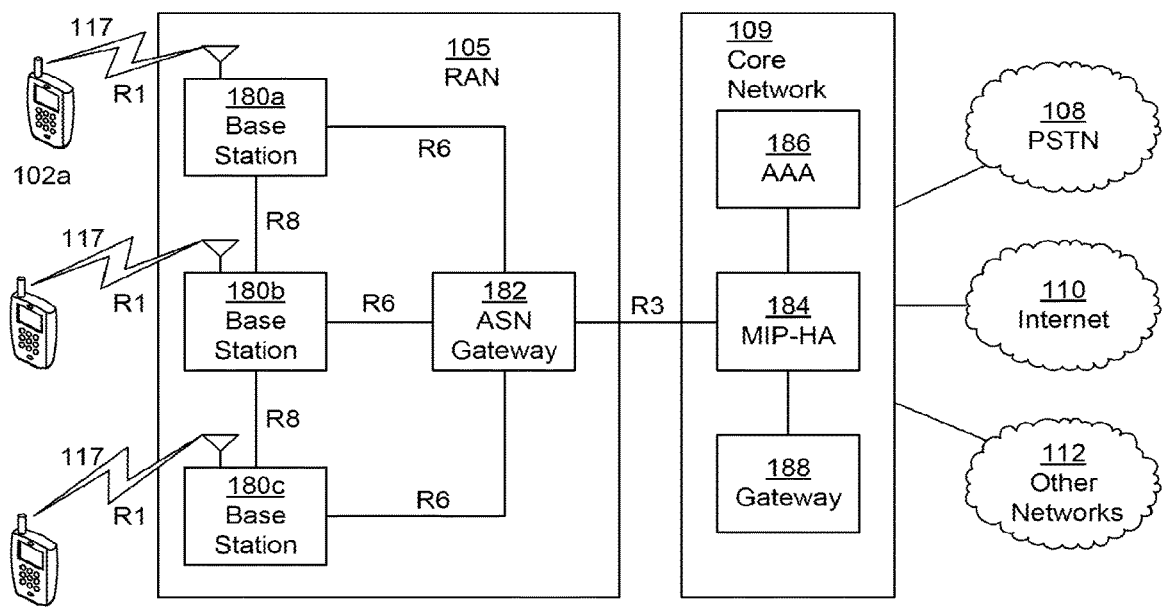
FIG. 5 is a system diagram illustrating a further example radio access network and a further example core network that may be used within the communications system illustrated in FIG. 1.

FIG. 5 is a system diagram illustrating the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 5, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. The base station 180a, for example, may use multiple antennas to transmit wireless signals to, and/or receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 5, the RAN 105 may be connected to the core network 109. The communication link between the RAN 105 and the core network 109 may be defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any of these elements may be owned and/or operated by an entity other than the core network operator.

The MIP-HA 184 may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. The gateway 188 may provide the WTRUs 102a, 102b, 102c with access to the other networks 112, which may include other wired and/or wireless networks that are owned and/or operated by other service providers.

Although not shown in FIG. 5, it will be appreciated that the RAN 105 may be connected to other ASNs, other RANs (e.g., RANs 103 and/or 104) and/or the core network 109 may be connected to other core networks (e.g., core network 106 and/or 107. The communication link between the RAN 105 and the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Although the WTRU is described in FIGS. 1-5 as a wireless terminal, it is contemplated that in certain representative embodiments such a terminal may use (e.g., temporarily or permanently) wired communication interfaces with the communication network.

In a frequency division duplex (FDD) communication system, frequency separation may be used (e.g., implemented) to, for example, reduce interference between the transmitted and received signals. In a single carrier (also referred to as single channel) configuration, communication between a network and a user device such as a user equipment (UE) or WTRU may use, for example, two or more frequency bands (e.g., one frequency band in the UL for communication to the network and one frequency band in the DL for communication from the network). Enough spacing may be provided between the UL and DL channels, for example, for filters to be able to adequately attenuate (e.g., below a threshold level) energy from the transmitted signal that may leak into the received signal.

In a time division duplex (TDD) system, time separation may be used (e.g., implemented) to, for example, reduce interference between the transmitted and received signals. In a single carrier (or single channel) configuration, communication may use a single band, which may be shared in time between UL and DL. In a system, such as 3GPP LTE TDD, a frame (e.g., a 10 ms frame) may be divided into subframes (e.g., ten 1 ms subframes) and each subframe may be used for DL (D), for UL (U), or as a special subframe (S), which may include a DL part, a UL part, and a gap between the DL part and the UL part to allow for transition from DL to UL or UL to DL.

In a full duplex (FD) system, a channel may be used to transmit and receive the radio frequency (RF) signal simultaneously. In a TDD-type system, timeslots may be allocated as DL, UL, or full duplex single channel (FDSC). Timeslots which are allocated as FDSC may be used for simultaneous UL and DL communication between an FDSC-capable basestation (BS) and an FDSC-capable WTRU. FDSC timeslots may be used by an FDSC-capable base station for simultaneous communication with at least one WTRU in the DL and at least one other WTRU in the UL (e.g., when the WTRUs may or may not be FDSC-capable). FDSC may correspond to one or more of: (1) transmit (Tx) and receive (Rx) bands, which may be separated by a gap (e.g., a small gap), such as one not supportable by conventional systems; (2) Tx and Rx bands which may be separated by a zero band gap; (3) partially overlapping Tx and Rx bands; and/or (4) fully overlapping Tx and Rx bands. The term FDSC may be used interchangeably with full duplex radio (FDR), full duplex single frequency (FDSF), and/or full duplex single resource (FDSR).

In 3GPP TDD LTE, the "timeslots" may be, for example, 1 ms subframes of a 10 ms LTE frame and the TDD UL-DL configurations (e.g., defined in the 3GPP specifications) may be modified to include full duplex (F) subframes (e.g., in place of some or all of the U, D, and/or S subframes). Subframes may be split between the UL and the DL at a Resource Block (RB) level. The RB may be a unit of resource allocation and may correspond to a plurality of subcarriers (e.g., 12 subcarriers) in frequency and a number of Orthogonal Frequency Division Multiplexing (OFDM) symbols in time.

Procedures such as Radio Resource Management (RRM) procedures may assign timeslots for FDSC operation, may choose WTRUs (e.g., for operation or resource assignments in FDSC timeslots) that are suitable for Tx and/or Rx in FDSC timeslots, and/or may pair WTRUs for half-duplex (UL or DL) operation in the same timeslot. The RRM may implement such assignments, choices, and/or pairings such that Tx interference or leakage into Rx (e.g., Tx-Rx coupling) does not prevent the successful reception of the Rx signal. Measurements, capabilities (e.g., WTRU capabilities), and/or WTRU location among other factors may, for example, be taken into account in the assignments, choices, and/or pairings. For example, limiting FDSC communication to WTRUs close to (e.g., within a threshold distance from) the base station may be one way to limit interference.

In certain representative embodiments, Tx-Rx interference mitigation procedures are implemented for handling and/or reducing various types of Tx-Rx interference.

Although 3GPP LTE FDD and TDD systems are illustrated, it is contemplated that the procedures are applicable to other systems, methods and/or devices.

In certain representative embodiments, procedures may be implemented to mitigate various types of interference including one or more of: (1) eNode-B (eNB) SINTF for which an eNB transmission (e.g., DL transmission of the eNB) may interfere with its own reception (e.g., UL reception of the eNB); (2) WTRU SINTF for which a transmission (e.g., a UL transmission) of the WTRU may interfere with its own reception (e.g., DL reception of the WTRU); (3) WTRU NINTF for which a transmission (e.g., a UL transmission) of one WTRU may interfere with reception (e.g., a DL reception) of another WTRU.

In certain representative embodiments, procedures may be implemented to mitigate interference using for example, collision avoidance and/or power control. For example, procedures may be implemented to handle transmission power adjustment (e.g., reduction) for certain channels, such as for data channels and/or for other channels. Transmission power and corresponding interference in FDSC subframes may be reduced and/or limited, for example, by applying FDSC to certain WTRUs (e.g., those WTRUs which are close to the base station (e.g., close-in WTRUs)).

In certain representative embodiments, other procedures (e.g., collision avoidance procedures and other procedures) may be implemented for other channels and/or signals (e.g., control and/or reference channels and/or signals, among others) that may be present in those subframes. These other procedures may mitigate or reduce interference in combination with and/or without transmission power reduction, as transmission power reduction may limit the effective range of the channels and/or signals.

For example, collision avoidance procedures may be implemented to handle interference from certain signals in the DL (e.g., control channels and/or RSs, which may be transmitted at high power in order to reach the cell edge, for example the Physical DL Control Channel (PDCCH) or Cell-specific RS (CRS)). At the eNB, these signals may cause excessive SINTF to a UL received signal which may use the same time/frequency resources. Since these signals may, for example, be present in all subframes and/or may span many RBs across the entire system bandwidth, and it may not be useful and/or practical to avoid using subframes and/or RBs containing or including these signals for FDSC communications, collision avoidance procedures may be implemented to handle interference in subframes and/or RBs in which these (or other) signals may be present.

Similarly, collision avoidance procedures may be implemented where WTRU SINTF and/or NINTF may arise, for example, when a WTRU transmits a Sounding RS (SRS). The SRS may be transmitted by a WTRU in the last symbol of certain subframes and may span the entire UL bandwidth. The SRS may have a power requirement higher than that for other UL signals or channels (e.g., data channels), which may cause interference (e.g., excessive interference) to signals in that symbol in the DL which may be received by the same or another WTRU.

In certain representative embodiments, procedures to reduce interference, for example of the Tx (e.g., the signals which may be transmitted) into the Rx (e.g., the signals which may be received) may be implemented. For example, representative procedures are provided that address the interference to and/or from signals and signal types in opposite directions. The terms signals and channels may be used interchangeably.

In certain representative embodiments, UL resource muting (e.g., blanking, puncturing and/or rate-matching) may be based on the DL channel and/or the RS location. For example, PUSCH RE muting may occur (or may be performed) to avoid collisions with at least one of the following: the Primary Synchronization Signal (PSS), the Secondary Synchronization Signal (SSS), the Physical Broadcast Channel (PBCH), the CRS, and/or the DM-RS. In other examples, a PUCCH may be shortened to avoid collisions with a PDCCH.

In certain representative embodiments, PUSCH prioritization (e.g., relative to a DL channel or signal) may depend on whether the PUSCH contains or includes certain information types (e.g., UL Control Information (UCI), etc.).

In certain representative embodiments, DL resource muting (e.g., blanking, puncturing and/or rate-matching) may be based on the UL channel and/or the RS location. For example, PDSCH RE muting may occur to avoid collisions with the PUCCH and/or the Physical Random Access Channel (PRACH). As other examples, the PDSCH RE muting may occur (or be performed) to avoid collisions with the PUSCH and/or the PUSCH DM-RS. In certain examples, the PDSCH RE muting (e.g., shortened PDSCH) may occur (or may be performed) to avoid collision with the SRS.

In certain representative embodiments, PDSCH prioritization (e.g., relative to a UL channel or signal) may depend on whether the PDSCH contains or includes certain information types (e.g., System Information Block (SIB), and/or Medium Access Control (MAC) Control Element (CE), among others).

In certain representative embodiments, PDCCH RE muting may occur (or may be performed) to avoid collisions in the opposite direction (e.g., with the UL).

In certain representative embodiments, unequal power control for the DL and/or the UL may be implemented. For example, unequal power allocation may be implemented for the PDSCH according to the UL channel that may be interfered with (e.g., SINTF which may occur at the eNB) by the PDSCH. In certain representative embodiments, associated power allocation indications may be implemented to indicate, for example, the unequal power allocations (e.g., to the WTRU). As other examples, unequal power allocation may be implemented for the PUSCH according to the DL channel that may be interfered with (e.g., SINTF which may occur at the WTRU) by the PUSCH. In certain representative embodiments, an associated power control loop (or multiple power control loops) may be implemented.

In certain representative embodiments, SINTF handling procedures and/or NINTF handling procedures may be implemented. For example, procedures for discovery or determination of SINTF subframe and/or NINTF subframe may be implemented. As other examples, procedures may be implemented for SINTF handling and/or NINTF handling when subframes are determined to be SINTF subframes and/or NINTF subframes.

In certain representative embodiments, a supportable SINTF level (SIL) and/or SIL reporting may be implemented. For example, procedures may be implemented to provide power control (e.g., maximum power control) to enable (or maintain) operations of the WTRU within the supportable SIL.

In certain representative embodiments, procedures may be implemented to support multimedia broadcast multicast service single frequency network (MBSFN) subframe usage in a full-duplex operation.

The representative procedures for reducing interference may include collision avoidance procedures including, for example: blanking, puncturing, and/or rate matching around and/or for certain locations (e.g., time and/or frequency locations) in one direction (e.g., UL and/or DL) which may correspond to the locations (e.g., time and/or frequency locations) of certain channels and/or signals (e.g., high priority signals) in the other direction (e.g., the DL and/or the UL).

The representative procedures for reducing interference may include collision avoidance procedures including, for example, subframe and/or transmission modifications in one direction (e.g., the UL and/or the DL) to avoid collisions with and/or between certain signal types (e.g., one or more control channels and/or RSs) in the opposite direction (e.g., the DL and/or the UL). In certain representative embodiments, modifications may be made or provided to any of: the UL the DM-RSs, DM-RSs, and/or other RSs. In certain representative embodiments, transmissions may be shortened to avoid conflict (e.g., the PUCCH region may be shortened to avoid the PDCCH region and/or the PDSCH region may be shortened to avoid the SRS symbol for example, from the opposite direction).

The representative procedures for reducing interference may include power control procedures including, for example: power control such that (1) transmission power in one direction (e.g., the UL and/or DL direction) may be controlled based on the time/frequency location (e.g., of the transmission) and/or the types of signals, which may be present in the same time/frequency location (e.g., of the transmission) in the opposite direction; and/or (2) transmission power of certain time/frequency locations associated with a signal may have different power or power control from other time/frequency locations associated the same signal, (and in certain representative embodiments, an indication of the power offset (e.g., which may be used and/or required) may be provided).

In certain representative embodiments, high priority signals may include at least one of: (1) a DL synchronization channel, e.g., the PSS and/or the SSS, among others; (2) a DL broadcast channel, e.g., the PBCH and other broadcast channels; (3) a DL RS, e.g., a CRS, a DM-RS, and/or a Positioning RS (PRS), among others; (4) a DL control channel, e.g., PDCCH, a Physical Control Format Indicator Channel (PCFICH), a Physical Hybrid automatic repeat request Indicator Channel (PHICH), and/or an Enhanced Physical Downlink Control Channel (EPDCCH), among others; (5) a UL control channel, e.g., PUCCH; and/or (6) a UL RS, e.g., the UL DM-RS, and/or the SRS, among others.

A typical FDSC communications application may be one in which the WTRUs involved may be close to the base station, which may result in lower power transmissions that may result (e.g., likely result) in less interference. For close-in WTRUs, UL and DL transmissions may be (e.g., may likely be) close to time aligned. In certain representative embodiments, FDSC applications may be applied to close-in WTRUs (e.g., for which the UL and the DL may or may not be time aligned or close to time aligned). In the same or other representative embodiments, the FDSC applications may be applied to WTRUs that are not close-in (e.g., for which the UL and the DL may not be time aligned or close to time aligned).

In certain representative embodiments, procedures may be implemented for addressing SINTF including detection, handling and/or reporting of SINTF.

Wireless communication systems compliant with Third Generation Partnership Project (3GPP) Long Term Evolution (LTE) may support up to 100 Mbps in the DL, and up to 50 Mbps in the UL for a 2×2 configuration. The LTE DL scheme may be based on an Orthogonal Frequency Division Multiple Access (OFDMA) air interface. Each radio frame may consist of ten subframes of 1 ms each. Each subframe may consist of two timeslots of 0.5 ms each. There may be either seven or six OFDM symbols per timeslot. Seven symbols per timeslot may be used with normal CP length, and six symbols per timeslot may be used with extended CP length. The subcarrier spacing for a particular specification may be 15 kHz. A reduced subcarrier spacing mode using 7.5 kHz may also be possible. The terms "frame" and "radio frame" may be used interchangeably.

A RE may correspond to one subcarrier during one OFDM symbol interval. Twelve consecutive subcarriers during a 0.5 ms timeslot may constitute one RB. With seven symbols per timeslot, each RB may consist of 12×7=84 REs.

The basic time-domain unit for dynamic scheduling may be one subframe and may include two consecutive timeslots. This may be referred to as a RB pair or a Physical RB pair. Certain subcarriers on some OFDM symbols may be allocated to carry pilot or RSs in the time-frequency grid. A number of subcarriers at the edges of the transmission bandwidth may not be transmitted to comply with spectral mask uses and/or requirements.

UL channels which may be provided and/or used may include the PUSCH and/or the PUCCH. Control information, which may be referred to as UCI may be transmitted by the WTRU, for example in a subframe, on the PUSCH or the PUCCH, and/or part may be transmitted on the PUCCH and part may be transmitted on the PUSCH. The UCI may include one or more of: (1) a Hybrid Automatic Repeat Request (HARQ) ACK/NACK, (2) a scheduling request (SR), and/or (3) Channel State Information (CSI) which may include one or more of: (i) a Channel Quality Indicator (CQI) (2) a Precoding Matrix Indicator (PMT), and/or (3) a Rank Indicator (RT). Resources which may be allocated for the PUCCH transmission may be located at or near the edges of the UL band.

DL channels, which may be provided and/or used, may include the PDSCH and/or DL control channels which may include one or more of: the PCFTCH, the PHTCH, the PDCCH, and/or the EPDCCH.

A plurality of symbols (e.g., the first 1 to 3 OFDM symbols) in each subframe in the DL may be occupied by one or more of: (1) the PCFICH, the PHICH, and/or the PDCCH according to the overhead of the control channels. The symbols in this region may be referred to as the DL control region. The PCFICH may be transmitted in the 1st OFDM symbol (e.g., symbol 0) in each subframe and/or may indicate the number of OFDM symbols used for the DL control region in the subframe. A WTRU may detect a Control Format Indicator (CFI) from the PCFICH and the DL control region may be defined in the subframe according to the CFI value. The PCFICH may be skipped, if a subframe is defined as and/or is a non-PDSCH supportable subframe. DL symbols, which are not part of a DL control region, may be referred to as the data or PDSCH region. The EPDCCH may be provided and/or used in the PDSCH region. The location of the EPDCCH in that region may be signaled, for example via higher layer signaling such as Radio Resource Control (RRC) signaling, to a WTRU that may (or may be expected to) monitor, receive or otherwise use that EPDCCH. The PDCCH and/or the EPDCCH may provide control information, resource allocations (e.g., grants) for the UL transmission and/or the DL transmission, and the like.

DL signals and/or channels may be provided or transmitted by an eNB and/or may be received and/or used by a WTRU. The UL signals and/or channels may be provided or transmitted by the WTRU and/or may be received and/or used by the eNB.

Signals and/or channels may be associated with a cell, which may correspond to a certain carrier frequency and/or geographic area. A carrier frequency may be a center frequency of a cell (e.g., the center frequency of a cell's supported bandwidth). The eNB may have one or more associated cells. The eNB and cell (e.g., its associated cell) may in certain representative embodiments be used or referred to interchangeably.

Synchronization signals, which may include for example the PSS and/or the SSS, may be provided and/or transmitted, for example by the eNB or cell. Such signals may be used by the WTRU to acquire time and/or frequency synchronization with the eNB or cell. The PSS and/or the SSS may be present, for example in subframes 0 and/or 5, and/or may be present in every radio frame. Transmission may be on subcarriers (e.g., 62 subcarriers) at the center of a bandwidth of a cell. Five subcarriers on each side of the 62 subcarriers used for transmission of the synchronization signals may be reserved and/or unused. For FDD, PSS transmission may be in the last OFDM symbol and SSS transmission may be in the 2nd to last (e.g., next to last) OFDM symbol, for example, of timeslot 0 (e.g., the first timeslot of subframe 0) and/or timeslot 10 (e.g., the first timeslot of subframe 5) of each radio frame. For TDD, the PSS transmission may be in the 3rd OFDM symbol in subframe 1 and/or subframe 6 and/or the SSS transmission may be in the last OFDM symbol in timeslot 1 (e.g., the second timeslot of subframe 0) and/or timeslot 11 (e.g., the second timeslot of subframe 5) of each radio frame. The synchronization signals may convey information regarding the physical cell identity (cell TD) of the cell.

The PBCH, which may be transmitted by an eNB, may carry cell information such as a Master Information Block (MIB). The PBCH may be provided and/or transmitted in subframe 0 of a radio frame (e.g. each radio frame) and may be repeated (e.g., in consecutive radio frames, for example, each of four consecutive radio frames where four radio frames may correspond to a 40 ms time period). The PBCH may be transmitted in the first four OFDM symbols of the second timeslot of subframe 0 and may be transmitted on subcarriers (e.g., 72 subcarriers) at or close to the center of the bandwidth of a cell. The MIB may provide information, for example, (1) the DL bandwidth of the cell, (2) PHICH information, and/or (3) at least part of the System Frame Number (SFN), for example the most significant bits (e.g., 8 bits of a 10-bit) of the SFN.

The DL RSs may include a DL CRS, a CSI RS (CSI-RS), a DM-RS, and/or a PRS. The DL RSs may be received and/or used by a WTRU. The DL CRS may be used by a WTRU for channel estimation for coherent demodulation of a (e.g., any) DL physical channel with certain possible exceptions. For example, the DL CRS may not be used for channel estimation and/or coherent demodulation for certain DL channels, which may include at least one of: (1) the Physical multicast channel (PMCH), (2) the EPDCCH, and/or (3) the PDSCH when configured with Transmission Mode (TM) 7 (TM7), TM8, TM9, or TM10. The CRS may be used by a WTRU for CSI measurements for the reporting of the CQI, the PMI, and/or the RI, for example, if the WTRU is configured with a TM using the DL CRS for the PDSCH demodulation. The DL CRS may be used by the WTRU for cell-selection and/or mobility-related measurements. The DL CRS may be received in certain subframes (e.g., any subframe) and a plurality of ports (e.g., up to 4 antenna ports) may be supported. The DM-RS may be used by the WTRU for demodulation of certain channels which may include at least one of the EPDCCH and/or the PDSCH configured with TM7, TM8, TM9, or TM10. The DM-RS, which may be used for the demodulation of a certain channel (e.g., the EPDCCH and/or the PDSCH, among others), may be transmitted in the RBs assigned to the channel (e.g., the EPDCCH and/or the PDSCH). The CSI-RS, which may be transmitted with a duty cycle, may be used by the WTRU for the CSI measurements. The WTRU may be configured with a TM that may use the DM-RS for the PDSCH demodulation. Certain possible exceptions may exist, for example, DM-RS may not be used for the PDSCH demodulation when certain TMs, such as TM7 and/or TM8 are configured and/or used). The CSI-RS may be used for cell-selection and/or mobility-related measurements (for example, if a WTRU is configured with a certain TM (e.g., TM10). The PRS may be used by a WTRU for position related measurements.

The UL RSs, which may include the SRS, and/or the DM-RS, among others, may be transmitted by the WTRU. The SRS may be transmitted in the last SC-FDMA symbol in the UL subframes, which may be configured as WTRU-specific SRS subframes. The WTRU-specific SRS subframes may be a subset of the cell-specific SRS subframes. The SRS may be transmitted by the WTRU dynamically, periodically or aperiodically in the WTRU-specific SRS subframes within a configured and/or predefined frequency bandwidth. The SRS may be transmitted by the WTRU in an aperiodic or periodic manner. For example, the WTRU may transmit SRS in response to (e.g., following reception of) an aperiodic SRS (A-SRS) transmission trigger which the WTRU may receive in Downlink Control Information (DCI). The DM-RS may be transmitted by the WTRU for the PUSCH demodulation at the eNB receiver and the location of the DM-RS may be in the middle of the SC-FDMA symbols (e.g., the 4th SC-FDMA symbol of a subframe using normal CP) in each slot for the RBs for which the PUSCH transmission may be granted.

In certain representative embodiments, for example, which may use TDD such as LTE TDD, multiple (e.g., one or more) TDD UL-DL subframe configurations may be available, identified, supported, specified, and/or otherwise known, and one (or at least one) of the subframe configurations may be used in the eNB. Each TDD UL-DL subframe configuration may contain or include at least one of a DL subframe, a UL subframe and/or a special subframe as shown, for example in Table 1 herein in which a DL subframe is indicated by a 'ID', a UL subframe is indicated by a 'U', and a special subframe is indicated by an 'S'. The eNB may communicate with a WTRU in a subframe in the direction indicated by the configuration that the eNB uses. Communication (e.g., direction of communication) in a special subframe may be in accordance with a special subframe configuration which may provide or identify the size and/or location(s) of a DL and/or UL part of the subframe.

MAC control elements (CEs) in the PDSCH: (1) Random Access Response (RAR) MAC protocol data unit (PDU); and/or (2) a WTRU contention resolution MAC CE, among others.

The RAR may contain or include one or more sets of: a Timing Alignment Command, a UL grant for msg3 transmission, and/or a temporary Cell Radio Network Temporary Identifier (C-RNTI). The WTRU, based on the random access preamble index (RAPID) used, may use the RAR information to perform the transmission of the msg3. The RAR may be sent by a common RNTT (e.g., a Random Access (RA)-RNTI) on the PDCCH in a common search space (CSS) and the RAPID may be used by multiple WTRUs.

The WTRU may receive the contention resolution MAC CE during a contention based Random Access (RA) procedure to identify that the msg3 may have been or was properly received by the network. The message may be WTRU specific, although multiple WTRUs may receive the contention resolution CE. The WTRU may determine that it is the intended recipient of the CE by finding the Common Control Channel (CCCH) Service Data Unit (SDU) (e.g., using the RRC connection request message) the WTRU transmitted (e.g., in msg3) in the CE content.

The RAR MAC PDU and the contention resolution MAC CE may be addressed to and/or received by multiple WTRUs using the RA-RNTI and the temporary C-RNTI, respectively. The following MAC CEs may be WTRU specific: (1) an Activation/Deactivation CE (e.g., the Activation/Deactivation CE may be included in the PDSCH for a WTRU configured for carrier aggregation to activate or deactivate certain secondary serving cells); (2) a Discontinuous Reception (DRX) command CE (e.g., the DRX command CE may be included in the PDSCH to indicate the start and/or the stop of a DRX cycle for a WTRU that may have been configured for connected mode DRX); and/or (3) a Timing Advance Command CE (e.g., the Timing Advance Command MAC CE may be included in the PDSCH for a WTRU to provide the WTRU with a timing advance command for the UL transmissions), among others.

The WTRU may receive one or more of the following types of data and control PDUs in the PDSCH: (1) a RLC data PDU which may consist of or include any of: (i) a transparent mode data PDU; (ii) an unacknowledged mode data PDU; and/or (iii) an acknowledged mode (AM) data PDU. The AM data PDU may be further categorized as a

TABLE 1

Example TDD LTE UL-DL Configurations

| UL-DL Configuration | DL-to-UL Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

The WTRU may receive user plane data and/or control plane data in a PDSCH transmission from the eNB. The WTRU may receive Radio Control Link (RLC) and/or MAC control information in the PDSCH transmission from the eNB. The WTRU may receive one or more of the following data PDU for an initial transmission or for a re-transmission and a data PDU for re-transmission may include PDU segments. The AM data PDU may include a POLLING bit, which may be useful for the Automatic Repeat Request (ARQ) functionality which may be supported by the RLC AM functionality; and/or (2) an RLC STATUS PDU which may be included in the PDSCH by the eNB to inform the WTRU of the RLC PDUs (e.g., UL RLC PDUs) that have been successfully received and/or the RLC service data units (SDUs) (e.g., the UL SDUs) that have yet to be detected. The WTRU may include an RLC STATUS PDU in the PUSCH to inform the eNB of the RLC PDUs (e.g., DL RLC PDUs) that have been successfully received and/or the RLC SDUs (e.g., DL SDUs) that have yet to be detected.

The term "node" generally refers to or represents a user equipment (UE) a WTRU, or other device, an eNB or a cell such as a macrocell, a picocell, a femtocell, a home eNB, a relay, a remote radio head (RRH), and/or a small cell, among others. The term "at the same time" generally refers to sending and/or receiving signals, messages and/or control or user data at the same instance, concurrently, coincidently, and/or simultaneously. For example, the sending and/or receiving of the signals, messages and/or control or user data may, for example, overlap in time either partially or fully.

One or more representative embodiments described herein may be used in a full-duplex radio (FDR) resource (FDRR). An FDRR may include one or more of the following: a resource in which a node (e.g., an eNB and/or WTRU) may transmit and receive signals in a same time/frequency resource. The FDRR may be a RE and/or a set of REs in which a node may transmit and receive signals at the same time. The RE in which a node may transmit and receive signals at the same time is sometimes referred to as a FDR RE.

The FDRR may be a RB (e.g. physical RB (PRB) or PRB-pair) and/or a set of RBs in which a node may transmit and receive signals at the same time. As an example, a set of REs within the RB may be used for a UL transmission and another set of REs within the RB may be used for a DL reception where the set of REs for the UL transmission and the set of REs for the DL reception may be non-overlapped, partially overlapped, and/or fully overlapped (e.g., the same set of REs). A RB, which may include one or more FDR REs, may be referred to as a FDRR. A RB, which may be a FDRR, may be referred to as a FDR RB.

A FDRR may be a subframe and/or a set of subframes in which a node may transmit and receive signals at the same time. As an example, a set of RBs in or within the subframe may be used for a UL transmission and another set of RBs may be used for a DL reception. In this case, the set of RBs for the UL transmission and the set of RBs for the DL reception may be non-overlapped, partially overlapped, and/or fully overlapped (e.g., the same set of RBs). A subframe, which may include one or more of FDR RE and/or FDR RB, may be referred to as a FDRR. A subframe, which may be an FDRR, may be referred to as a FDR subframe. The FDR subframe may be a SINTF subframe and/or a NINTF subframe according to the interference type (e.g., SINTF or NINTF in the opposite direction). A subframe which may not include the FDR RE and/or the FDR RB may be referred to as a non-FDR subframe. The non-FDR subframe may be a NINTF subframe since SINITF may only exist in the FDR resource.

The operation of transmitting and receiving signals in a same FDRR, which may be at least one of a FDR RE, a FDR RB, and/or a FDR subframe may be referred to as a full-duplex (FD) operation.

Representative UL-DL Channel Collision Avoidance

RE muting procedures may be implemented or used to avoid collisions of signals. For a muted RE, puncturing and/or rate-matching may be used, for example in a coding chain perspective. When puncturing is used, a signal, which may be mapped to a punctured RE, may not be transmitted or may be transmitted at zero power in that RE. When rate-matching is used, the mapping of signals to REs may avoid mapping to certain REs which may result in certain signals not being transmitted.

In one example, an N-bit coded bit sequence for a channel, for example (c1, . . . , cN), may be an output of a channel encoder with a payload or information as an input, where the channel encoder may implement any channel code, for example, including a turbo code, a convolutional code, and/or a Reed-Muller code, among others. The coded bit sequence may be an input of a mapper. A M-symbol modulated symbol sequence, for example (x1, . . . , xM), may be an output of the mapper where the coded bit sequence may be modulated using a modulation scheme (for example, Binary Phase Shift Keying (BPSK), Quaternary Phase Shift Keying (QPSK), 16 Quadrature Amplitude Modulation (16QAM), or 64 Quadrature Amplitude Modulation (64QAM), among others). According to the modulation scheme used, the modulated symbol sequence length M may be equal to or smaller than N.

The modulated symbol sequence may be mapped to a set of REs for the channel according to a certain order (e.g., a predefined order). For instance, (x1, . . . , xM) may be mapped onto M REs, which may be used for the channel in the predefined order. If the k-th RE is muted (e.g., where k≤M), for example due to a collision, puncturing may cause the modulated symbol Xk to not be transmitted. Rate-matching may cause the mapper to skip REs which may be muted such that fewer modulated symbols may be mapped. For one rate-matched RE, M−1 modulated symbols may be mapped and transmitted. For example, (x1, . . . , xM−1) may be transmitted and one last modulated symbol may not be transmitted due to the muting of the k-th RE. Puncturing may lose coded bits in the positions of the muted REs, while the rate-matching may lose coded bits from the last coded bits.

RE muting procedures with puncturing may be generally referred to as RE puncturing procedures and RE muting procedures with rate-matching may be generally referred to as RE rate-matching procedures. RE muting procedures may include RE puncturing and/or RE rate-matching procedures.

In certain representative systems (e.g., LTE systems), the RE muting procedures may be performed to avoid collision between signals of different types in the same direction. For example, in the DL, PDSCH REs may be muted to avoid collision with the CSI-RS and/or PRS REs may be muted to avoid collision with the PSS and/or the SSS. In the UL, the PUSCH and/or the PUCCH may be shortened to avoid collision with the SRS in the UL.

In certain FDR systems, the RE muting procedures may be performed to avoid collision of signals in opposite directions (e.g., avoid collision between resources in the UL with resources in the DL). The performance and type of collision avoidance may be dependent on: (1) the signals themselves, (2) the priorities of the signals (for example, which may be pre-defined, configured, and/or signaled) and/or (3) other factors which may include when FDRRs may be used (e.g., if a subframe can be a FDR subframe), and/or based on an eNB indication, among others.

Representative DL Channel Dependent Puncturing/Rate-Matching

RE puncturing procedures or RE rate-matching procedures may be used for a UL channel, if the RE of the UL channel may and/or does collide with a DL channel or a DL RS has a higher priority than the UL channel. RE muting procedures may generally refer to RE puncturing and/or RE rate-matching procedures.

RE muting procedures may be used in SC-FDMA symbol level operations in which some or all REs in one or more of the SC-FDMA symbols may be muted. As generally referred to herein, shortened PUSCH, shortened PUCCH, PUSCH shortening, PUCCH shortening, SC-FDMA symbol level RE puncturing, SC-FDMA symbol level RE rate-matching, SC-FDMA symbol level RE muting, shortened subframe, and/or subframe shortening may be interchangeably used.

For the UL resource in which RE muting may be used, the WTRU behavior may include at least one of the following: (1) the WTRU may allocate zero transmission power at the UL resource where RE muting is used; (2) the WTRU may consider the muted RE as an unused RE for the UL transmission; and/or (3) the WTRU may perform the same behavior for the muted RE as the behavior associated with other UL resource not allocated for the WTRU, among others.

For a UL resource in which RE muting is used, the eNB behavior may include at least one of the following: (1) the eNB may preclude the UL resource, in which RE muting is used, in its demodulation procedure (for instance, modulation symbol detection may not be performed for the muted RE); and/or (2) the eNB may preclude the coded bits from the muted RE after the demodulation procedure in its channel decoding procedure.

Representative PUSCH RE Muting

In certain representative embodiments, the RE muting (e.g., the RE puncturing and/or the RE rate-matching) may be used for the PUSCH, if a PUSCH RE is to collide with a DL channel and/or a RS.

Figures 6A, 6B:
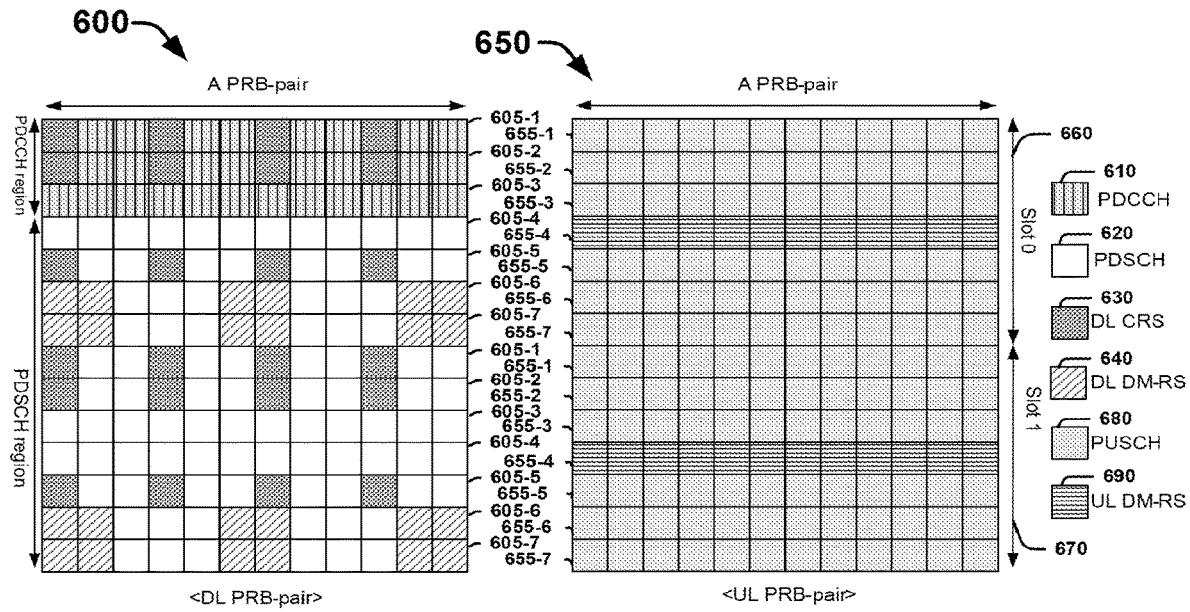
FIG. 6A is a diagram illustrating an example of a downlink (DL) Physical Resource Block (PRB) pair with normal Cyclic Prefix (CP)
FIG. 6B is a diagram illustrating an example uplink (UL) PRB pair with normal CP.

FIG. 6A is a diagram illustrating an example of a DL PRB pair (and/or structure) with normal CP and FIG. 6B is a diagram illustrating an example UL PRB pair (and/or structure) with normal CP.

Referring to FIGS. 6A and 6B, the DL PRB structure 600 and the UL PRB structure 650 with normal CP are shown. The DL PRB structure 600 may include a PRB having a PDCCH region and a PDSCH region. In the PDCCH region, REs may include a PDCCH 610 (e.g., control information) and/or DL Cell-Specific RSs (CRSs) 630, among others. In the PDSCH region, the REs may include a PDSCH 620, the DL CRSs 630 and/or DL DM-RSs 640, among others. The DL PRB structure 600 may include a DL PRB pair, which may include a plurality of subcarriers (e.g., 12 subcarriers). The DL PRB structure 600 may include a plurality of symbols 605-1, 605-2, 605,3, 605-4, 605-6 and 605-7 (e.g. 7 symbols) for each of the slots 0 and 1. The UL PRB structure 650 may include a first timeslot (e.g., slot 0) 660 and a second timeslot (e.g., slot 1) 670. Slot 0 (e.g., the first slot 660) and/or slot 1 (e.g., the second slot 670) of the UL PRB structure 650 may include a PUSCH 680 and/or UL DM-RSs 690. The UL PRB structure 650 may be a UL PRB pair, which may include a plurality of subcarriers (e.g., 12 subcarriers). The UL PRB structure 650 may include a plurality of symbols 655-1, 655-2, 655-3, 655-4, 655-5, 655-6 and 655-7 (e.g. 7 symbols) for each of the slots 0 and 1.

Although FIGS. 6A and 6B illustrate a particular set of PRB pairs/structures, it is contemplated that other PRB structures may be used in representative embodiments. For example, it is contemplated that the number of symbols, the type of CP (e.g., extended CP) and the locations of the various REs, among others, may be modified/varied while still allowing for RE or symbol muting in either the UL or DL to reduce or eliminate interference from overlapping signals.

In certain representative embodiments, a WTRU 102 may perform RE muting in a subframe which may be configured by one or more higher layers (e.g., by the eNB 160 to be an FDR subframe). The WTRU 102 may perform RE muting in a subframe based on the relative priorities of the UL signals to be transmitted and the DL signals, which may be received in the subframe. In certain representative embodiments, a prioritization may be predefined and/or pre-configured.

In certain representative embodiments, RE muting may be used to mute the PUSCH 680 in RE locations and/or in symbols associated with the prioritized DL channel or channels and/or the prioritized RS or RSs of a particular subframe. The associated DCI (e.g., for granting UL resources) may indicate to use RE muting. The DCI may include one or more bits to indicate the use of PUSCH RE muting for the one or more prioritized DL symbols, channels and/or RSs. The WTRU 102 may be provided an indication (e.g., explicitly indicated) that one or more particular DL symbols, channels and/or RSs may be of a higher priority than the UL transmission (e.g., any UL transmission) (for example, a simultaneous or an overlapping UL transmission). Such an indication may be provided in the DCI granting the assignment (e.g., the DCI granting the UL assignment and/or resources).

In certain representative embodiments, the WTRU 102 may be configured with a set of subframes for which UL transmissions may be of a higher priority than the DL transmissions and/or another set of subframes for which the DL transmissions may be of a higher priority than the UL transmissions. In certain representative embodiments, the WTRU 102 may indicate, for example in a scheduling request, the priority level of its UL transmissions.

In certain representative embodiments, the priority level of a channel (e.g., one, channel, certain channels or each channel) may be determined based on a channel index. The channel index may be preconfigured, dynamically configured and/or configured via higher layer signaling. For example, a PDCCH channel with a lower index than a PUSCH channel may have priority and may lead to RE muting (and/or symbol muting) of the PUSCH 680 for overlapping or simultaneous transmissions.

Representative PUSCH RE Muting for PDCCH

In certain representative embodiments, a PUSCH RE may collide with the PDCCH region and the PDCCH region may have a higher priority. Based on the relative priority, the PUSCH REs that may collide with a PDCCH region may be muted. As an example, one or more of following may apply.

The number of OFDM symbol of the PDCCH region for the PUSCH RE muting in the subframe may be dynamically configured, predefined and/or configured by a higher layer. The number of OFDM symbol used for PUSCH RE muting may be independent of the number of OFDM symbol indicated by the PCFTCH in the subframe. The WTRU 102 may transmit the PUSCH 680 with RE muting of the first N PUSCH-RE-Muting SC-FDMA symbols, where the N PUSCH-RE-Muting SC-FDMA symbols may be dynamically configured, predefined and/or configured by a higher layer (e.g., above the physical layer). The WTRU 102 may monitor the PDCCH 610 of the PDCCH region, which may be indicated by the PCFICH in the subframe. The starting SC-FDMA symbol (e.g., the PUSCH starting symbol) for the PUSCH transmission may be predefined or configured by a higher layer.

The number of OFDM symbols of the PDCCH region for the PUSCH RE muting in a subframe may be indicated by the PCFICH in the subframe. The starting point of the PUSCH transmission may be indicated by the PCFICH in a subframe (e.g., for each subframe).

Figure 7:
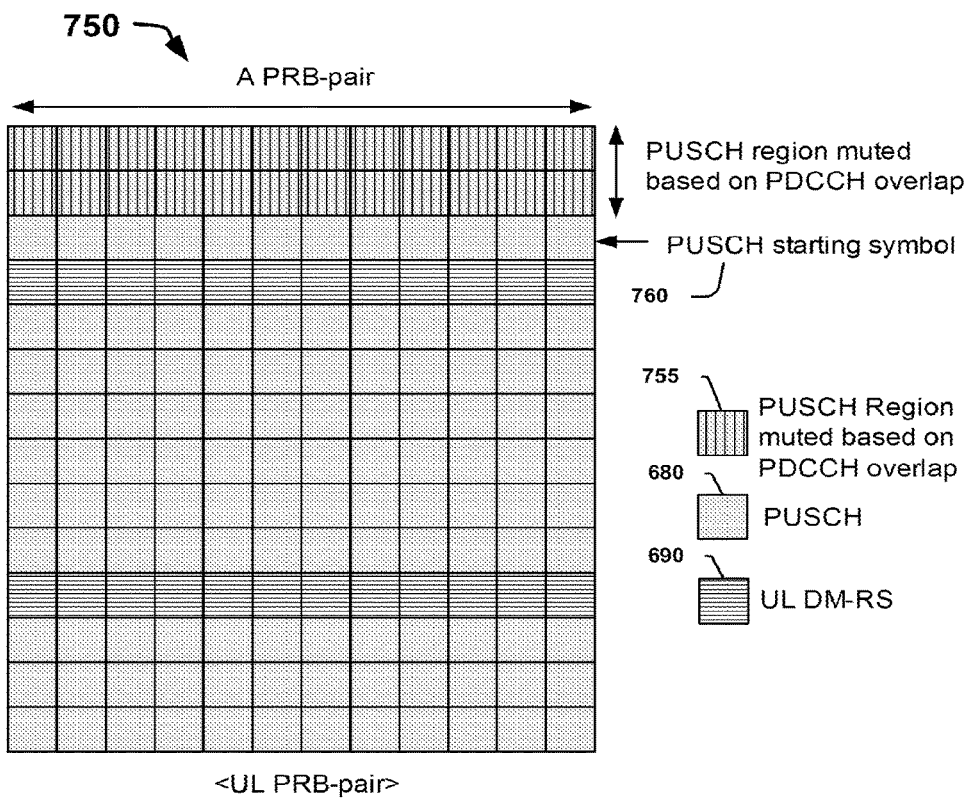
FIG. 7 is a diagram illustrating a representative UL PRB structure that overlaps with a Physical Downlink Control Channel (PDCCH) region.

FIG. 7 is a diagram illustrating a representative UL PRB structure 750 that may overlap with a PDCCH region of a DL PRB structure.

Referring to FIG. 7, the UL PRB structure 750 may be muted (e.g., PUSCH RE muted, for example by PUSCH shortening when a PUSCH starting symbol 760 is used or applied to start the PUSCH 680 of the UL PRB structure 750. For example, on condition that the PUSCH 680 and the PDCCH region of the DL PRB structure (not shown) overlap, the UL PRB structure 750 may be shortened by muting the PUSCH region 755. The PUSCH region 680 may include PUSCH REs and/or one or more UL DM-RSs 690, for example. The number of OFDM symbol to be muted in the PUSCH region 755 (e.g., may be the same number or a different number of symbols as the symbols of the PDCCH region that overlap with the subframe) and may be defined using the PUSCH starting symbol 760. The PUSCH starting symbol 760 may indicate the starting SC-FDMA symbol. The PUSCH starting symbol 760 may be predefined, configured by a higher layer, and/or indicated by the PCFICH in a subframe (e.g., each subframe).

The number of OFDM symbol of the PDCCH region for the PUSCH RE muting in a subframe may be defined as a shortened PUSCH format. For example, a PUSCH 680 with a configurable PUSCH starting symbol 760 may be defined as a shortened PUSCH format.

The PUSCH RE muting for (e.g., reducing or eliminating interference in) the PDCCH region may be used, if (e.g., responsive to or when) a PUSCH transmission power is higher than a threshold. For example, the PUSCH RE muting for (e.g., reducing or eliminating interference in) the PDCCH region may not be used, if the PUSCH transmission power is lower than a threshold. In certain representative embodiments, the PUSCH RE muting for the PDCCH region may be used, if a PUSCH transmission has any one of: a transmission power, a Transmission Block Size (TBS), a Modulation and Coding Scheme (MCS) and/or a redundancy version that exceeds a threshold (e.g., is greater than or less than a corresponding threshold). The power threshold, the TBS threshold, the MCS threshold and/or the redundancy version threshold may be dynamically configured, predefined and/or configured by a higher layer.

Representative PUSCH RE muting for EPDCCH

In certain representative embodiments, a PUSCH RE may collide with an EPDCCH and, for example, the EPDCCH may have a higher priority. To not interfere with the EPDCCH, the PUSCH RE that may collide with the EPDCCH may be muted. As an example, one or more of following may apply.

For an EPDCCH transmitted in a subset of a PRB in a subframe in the PDSCH region, the PUSCH REs (e.g., some or all PUSCH REs) within a PRB pair that may collide with the EPDCCH PRB-pair may be muted.

The WTRU 102 may transmit the PUSCH 680 from a first SC-FDMA symbol (e.g., for a subframe having a non-FDRR) and may transmit the PUSCH 680 from the starting SC-FDMA symbol (e.g., as the PUSCH starting symbol 760 for a subframe having a FDRR). The type of subframe (e.g., whether an FDRR or a non-FDRR) may be predefined, configured by a higher layer, and/or the PCFICH may indicate the type of subframe, such as FDRR or non FDRR). For example, if a subframe is used as an FDRR, the WTRU 102 may selectively transmit the PUSCH 680 from the starting SC-FDMA symbol (e.g., the PUSCH starting symbol) 760 and, if a subframe is used as a non-FDRR, the WTRU 102 may selectively transmit the PUSCH 680 from the first SC-FDMA symbol in the subframe (which may selectively provide a shortened subframe for transmission).

In certain representative embodiments, a PUSCH RE 860, which may collide with a DL DM-RS of the EPDCCH, may be muted, and a PUSCH RE, which may collide with the EPDCCH RE (e.g., but not a DL DM-RS RE), may not be muted.

FIG. 8 is a diagram illustrating another representative UL PRB structure 850 having a PUSCH 680 showing PUSCH RE muting (e.g., applied when the PUSCH RE or PUSCH REs 860 are to collide with an EPDCCH (no shown) such as the DL DM-RS REs) (e.g., associated with antenna port 107 to 114) used for EPDCCH demodulation.

Referring to FIG. 8, the UL PRB structure 850 may include a first timeslot (e.g., slot 0) and a second timeslot (e.g., slot 1). Slot 0 and/or slot 1 of the UL PRB structure 850 may include the PUSCH 680 and/or the UL DM-RSs 690. The UL PRB structure 850 may be a UL PRB pair, which may include a plurality of subcarriers (e.g., 12 subcarriers). The UL PRB structure 850 may include a plurality of symbols 655-1, 655-2, 655-3, 655-4, 655-5, 655-6 and 655-7 (e.g. 7 symbols) for each of the slots 0 and 1. The UL DM-RS 690 may be included in one or more symbols (e.g., the fourth symbol 655-4 in each slot (e.g., slot 0 or 1).

The PUSCH RE or PUSCH REs 860 that may collide with the DL DM-RS of the EPDCCH and/or the PUSCH RE or PUSCH REs 860 located in the same SC-FDMA symbol or symbols 655-6 and 655-7 (e.g., in the vicinity and/or adjacent to the PUSCH RE or PUSCH REs 860 that may collide with the DM-RS of the EPDCCH) may be muted.

For example, certain PUSCH REs 860 may be muted. The PUSCH REs 860 may include individual PUSCH REs 860 and/or PUSCH RE groups (such as PUSCH RE groups 861, 863 and 865) that may be muted. The REs 860 and/or RE groups 861, 863 and/or 865 may be associated with a particular symbol or particular symbols (e.g., symbols 655-6 and/or 655-7). In certain representative embodiments, the PUSCH REs 860 may be associated with symbols at the end of one or more slots (e.g., slot 0 and/or slot 1) 660 and 670 such as the last N symbols of those slots)). As another example, the PUSCH REs 860 may include certain subcarriers (e.g., only certain subcarriers), for example, at the beginning portion, middle portion and/or end portion of a PRB for the particular symbol or symbols. If the PUSCH PRB-pair is to collide with an EPDCCH PRB-pair, the PUSCH RE muting may be used for (e.g., only for) the RE that may collide with the DL DM-RS REs for the EPDCCH (e.g., only for particular REs, for example having a high priority that is above a threshold).

Although certain PUSCH REs are illustrated as muted, it is contemplated that any PUSCH RE may be muted to reduce interference with a colliding signal (e.g., in the DL and/or from other signals). For example, one RE or a group of REs may be muted to reduce or eliminate interference from a collision with a higher priority signal (e.g., from the opposite direction and/or from a neighboring device).

FIG. 9 is a diagram illustrating a further representative UL PRB structure 950 showing PUSCH symbol muting (e.g., of all PUSCH REs associated with one or more symbols 655-6 and 655-7 applied when the symbols 655-6 and 655-7 are to collide with the EPDCCH) (e.g., DL DM-RS REs of a PRB pair).

Referring to FIG. 9, the UL PRB structure 950 may include a first timeslot (e.g., slot 0) and a second timeslot (e.g., slot 1). Slot 0 and/or slot 1 of the UL PRB structure 950 may include the PUSCH 680 and/or the UL DM-RSs 690. The UL PRB structure 950 may be a UL PRB pair, which may include a plurality of subcarriers (e.g., 12 subcarriers). The UL PRB structure 950 may include a plurality of symbols 655-1, 655-2, 655-3, 655-4, 655-5, 655-6 and 655-7 (e.g. 7 symbols) for each of the slots 0 and 1. The UL DM-RS 690 may be included in one or more symbols (e.g., the fourth symbol 655-4 in each slot (e.g., slot 0 or 1).

The representative PRB structure 950 shows muting of: (1) the PUSCH REs 860 that may collide with the DL DM-RS REs; and (2) the PUSCH REs 860 located in the same SC-FDMA symbol or symbols (e.g., symbols 655-6 and 655-7) as the PUSCH REs that collided with the DL DM-RS REs. By muting all PUSCH RE 860 in a particular SC-FDMA symbol or symbols 655-6 and 655-7 in which DL DM-RS (e.g., of the opposite direction) may be transmitted, the single carrier property of SC-FDMA may be maintained. The muting of the particular SC-FDMA symbol or symbols 655-6 and 655-7 may be for (e.g., only for) the PUSCH PRB-pair that may collide with the EPDCCH PRB-pair.

If a PUSCH 680 is to collide with both the PDSCH DL DM-RSs and the EPDCCH DL DM-RSs, at least one of following may be applied: (1) the PUSCH RE that may collide with the DL DM-RS of the PDSCH 620, may not be muted and the PUSCH RE 860 may be muted for (e.g., only) the DL DM-RS REs of the EPDCCH; and/or (2) the PUSCH RE 860 may be muted for one or both of the DM-RS REs of the PDSCH 620 and/or the DM-RS REs of the EPDCCH.

In certain representative embodiments, PUSCH RE muting for (e.g., reducing or eliminating interference in) the EPDCCH may be applied, if the WTRU 102 monitors (e.g., detects) the EPDCCH in the subframe. In certain representative embodiments, PUSCH RE muting for the EPDCCH may be applied for (e.g., only for) an EPDCCH PRB-pair containing or including an EPDCCH WTRU-specific search space and/or an EPDCCH common search space. In certain representative embodiments, PUSCH RE muting for the EPDCCH may be used for (e.g., only for) an EPDCCH PRB-pair containing or including an EPDCCH common search space and the PUSCH RE that may collide with the EPDCCH WTRU-specific search space may not be muted.

Representative UL DM-RS Pattern According to PUSCH RE Muting

An UL DM-RS pattern may be changed when PUSCH RE muting is used (e.g., applied) due to the collision with a DL channel or a RS. The RS pattern may be interchangeably associated with and refer to a RS structure, a RS location, and/or a RS time/frequency location. For example, one or more of the following may apply.

The UL DM-RS structure may be changed according to the collision with and/or potential collision with the DL channel and/or the DL channel colliding with the PUSCH 680. For instance, the UL DM-RS structure 1 (e.g., a Release-8 (Rel-8) DM-RS structure) may be used, if the WTRU 102 transmits a PUSCH 680 without any collision with a higher priority DL channel. If the WTRU 102 is to transmit a PUSCH 680 that is to collide with the PDCCH 610 (when it is determined or known that the PDCCH 610 and/or certain PDCCH REs have a higher priority than the PUSCH 680 and/or certain PUSCH REs), the WTRU 102 may apply or use a UL DM-RS structure 2. If the WTRU 102 is to transmit a PUSCH 680 that is to collide with the EPDCCH when it is determined or known that the EPDCCH DM-RS (or REs of the EPDCCH) has a higher priority than the PUSCH 680 (or the REs of the PUSCH 680), the WTRU 102 may transmit the PUSCH 680 using a UL DM-RS structure 3, which may be different from the UL DM-RS structure 1 and/or the UL DM-RS structure 2. For the UL DM-RS structures, one or more of following may apply: (1) the UL DM-RS structure, which may be used or applied when the PUSCH 680 is not to collide with or does not collide with a higher priority DL channel or RS may be the Rel-8 UL DM-RS structure as shown in FIG. 8; (2) the UL DM-RS structures, which may be used or applied when the PUSCH 680 is to collide with a higher priority DL channel or RS may have different time locations of the UL DM-RS symbols. In certain representative embodiments, the UL DM-RS structure, which may be used or applied when the PUSCH 680 is to collide with a higher priority DL channel or RS may have a lesser number of UL DM-RS symbols. In certain representative embodiments, the UL DM-RS structure may be changed according to the subframe type (e.g., a SINTF subframe and/or a NINTF subframe.) For instance, the UL DM-RS structure 1 may be used in the SINTF subframe and/or the UL DM-RS structure 2 may be used in the NINTF subframe.

Figures 15, 16:
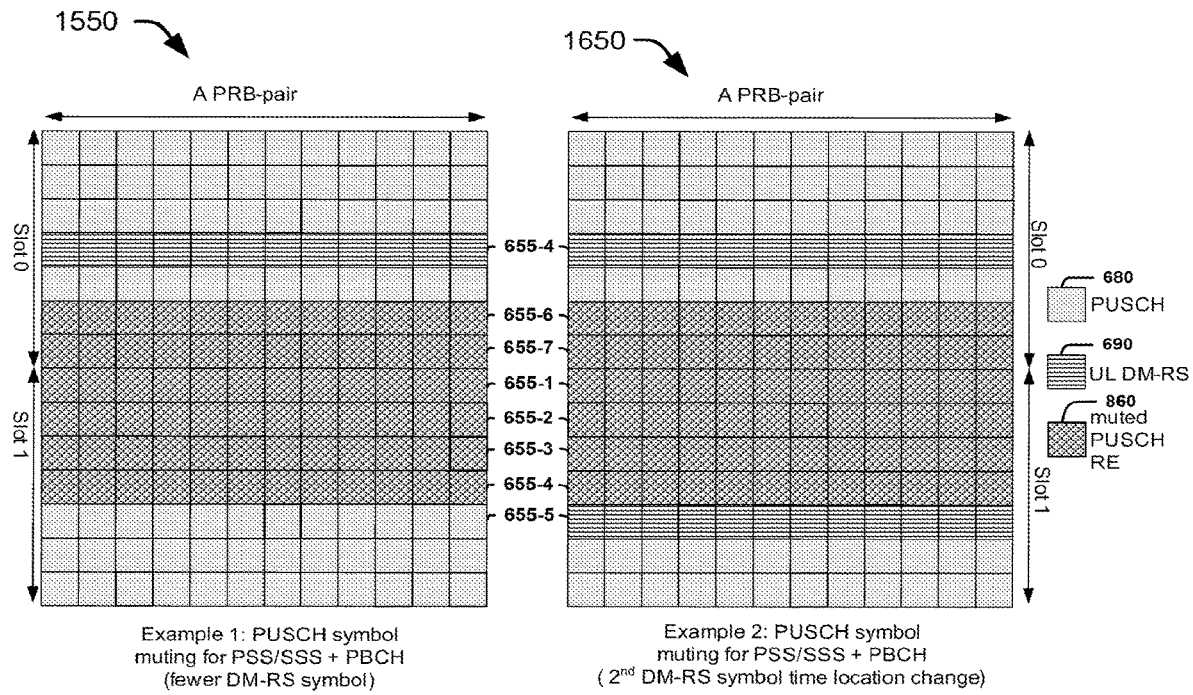
FIG. 15 is a diagram illustrating a yet further representative PRB structure showing PUSCH symbol muting with fewer DM-RS symbols relative to FIG. 16.
FIG. 16 is a diagram illustrating a yet additional representative PRB structure showing PUSCH symbol muting with a DM-RS symbol time location change.

Although UL DM-RS structures 1, 2 and/or 3 are disclosed herein, (for example, DM-RS structure 1 may be shown in FIG. 8, DM-RS structure 2 may be shown in FIG. 11, and DM-RS structure 3 may be shown in FIG. 16, other UL DM RS structures are possible including different DM-RS locations, for example, which may be applied for PUSCH transmissions.

FIG. 10 is a diagram of an additional representative UL PRB structure 1050 showing an example of a UL DM-RS time location change and FIG. 11 is a diagram of still another representative UL PRB structure showing a reduced number of (e.g., fewer) UL DM-RS symbols relative to FIG. 10.

Referring to FIGS. 10 and 11, a PDCCH region of a DL transmission may collide with (e.g., overlap) multiple symbols of the PUSCH 680 of the UL (e.g., the first two or three symbols of the PUSCH 680 of the UL). One or more of the UL DM-RS structures (e.g., UL DM-RS structures 1 2, and/or 3) may be defined and/or configured and one of these UL DM-RS structures may be selected for PUSCH transmission according to the DL channel and/or RS that is to collide with the PUSCH 680.

For example, the UL DM-RS structure may be changed or modified (e.g., the symbol or symbols 655-4 generally associated with the UL DM-RS 690 may be time shifted, for example as shown in FIG. 10 and/or changed/reduced in number, for example as shown in FIG. 11) when the PUSCH 680 (and/or the UL DM-RS 690 of the PUSCH 680) is to collide with a higher priority DL channel or RS and/or, when a specific condition is satisfied).

In certain representative embodiments, the UL DM-RS 690 may be time shifted, for example, from the fourth symbol 655-4 to the sixth symbol 655-6 for slot 0 and may be maintained without time shifting in the fourth symbol 655-4 for slot 1.

The condition to be satisfied may include at least one of following: (1) a PUSCH transmit power may exceed a threshold (e.g., be lower or higher than a threshold); and/or (2) an eNB absolute transmission power may be less than a threshold, among others.

In other representative embodiments, the UL DM-RS 690 may be eliminated in slot 0 and time shifted from the fourth symbol 655-4 to the second symbol 655-2 for slot 1

Although the time shifting and adjustment in the number of symbols for UL DM-RS is described using particular symbols, it is contemplated that any time-shifting and any number of UL DM-RM symbols may be used as long as interference to high priority signals is reduced and/or eliminated.

Although two UL DM-RSs are illustrated in FIG. 10 to be time shifted, it is contemplated that one, some or all of the UL DM-RSs may be time shifted (e.g., to avoid collision with higher priority DL signaling).

Although UL DM-RSs are illustrated in FIG. 11 to be reduced in number, it is contemplated that any UL DM-RS and/or group of UL DM-RSs may be reduced, increased or changed in number (e.g., to avoid collision with higher priority DL signaling).

Representative PUSCH RE Muting for CRS

A PUSCH RE may collide (e.g., overlap) with a CRS (e.g., a DL CRS 630) and, for example the DL CRS 630 may have a higher priority. To avoid interference for the DL CRS 630, the PUSCH RE that may collide with the DL CRS 630 may be muted. For example, one or more of the following may apply.

The PUSCH RE that may collide with the DL CRS 630 may be muted. The muted PUSCH RE location may be different according to the number of CRS port and/or the v-shift value of the DL CRS 630.

Figures 12, 13:
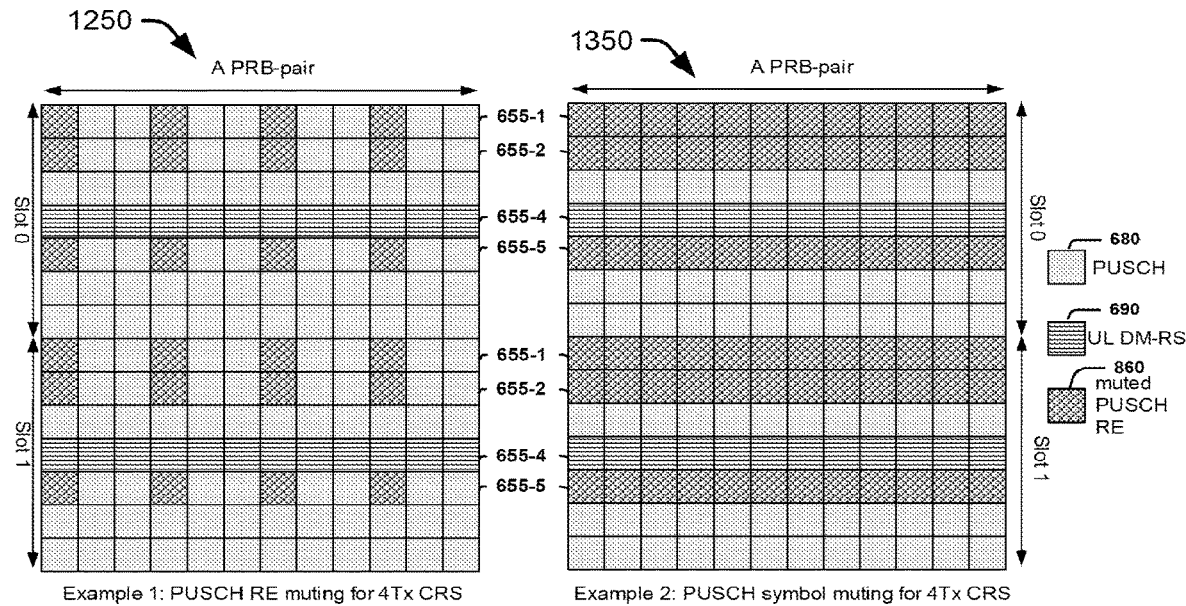
FIG. 12 is diagram illustrating a still further representative UL PRB structure showing PUSCH RE muting.
FIG. 13 is diagram illustrating a still additional representative PRB structure showing PUSCH symbol muting.

FIG. 12 is diagram illustrating a still further representative UL PRB structure 1250 showing PUSCH RE muting (e.g., applied for 4Tx CRS) and FIG. 13 is a diagram illustrating a still additional representative UL PRB structure 1350 showing PUSCH symbol muting (e.g., applied for 4Tx CRS RE locations (e.g., when v-shift=0 is used)).

In certain representative embodiments, the DL CRS configuration including the number of CRS port and/or v-shift value for the PUSCH RE muting may be: (1) signaled from a serving cell or a neighbor cell; and/or (2) configured via higher layer signaling (e.g., above the physical layer).

Referring to FIGS. 12 and 13, the UL PRB structures 1250 and 1350 may each include a first timeslot (e.g., slot 0) and a second timeslot (e.g., slot 1). Slot 0 and/or slot 1 of the UL PRB structures 1250 and 1350 may each include a PUSCH 680 and/or the UL DM-RSs 690. The UL PRB structure 1250 and 1350 may each be a UL PRB pair, which may each include a plurality of subcarriers (e.g., 12 subcarriers). The UL PRB structure 1250 and 1350 may include a plurality of symbols 655-1, 655-2, 655-3, 655-4, 655-5, 655-6 and 655-7 (e.g. 7 symbols) for each of the slots 0 and 1. The UL DM-RS 690 may be included in one or more symbols (e.g., the fourth symbol 655-4 in each slot (e.g., slot 0 or 1).

The representative UL PRB structure 1250 shows muting of: (1) the PUSCH REs 860 that may collide with DL DM-RS REs. The representative UL PRB structure 1350 shows muting of: (1) the PUSCH REs 860 that may collide with the DL DM-RS REs and the PUSCH REs 860 located in the same SC-FDMA symbol (e.g., symbols 655-1, 655-2, and/or 655-5) as the PUSCH REs 860 that collided with the DL DM-RS REs. As shown in FIG. 13, by muting all PUSCH RE 860 in a particular SC-FDMA symbol or symbols 655-1, 655-2 and 655-5 overlapping with DL DM-RS transmitted in the opposite direction, the single carrier property of SC-FDMA may be maintained. Particular SC-FDMA symbols 655-1, 655-2 and 655-5 may be muted for (e.g., only) a PUSCH PRB-pair that may collide with the EPDCCH PRB-pair.

In certain representative embodiments, the PUSCH REs 860 located in the SC-FDMA symbols (e.g., the SC-FDMA symbols 655-1, 655-2, and 655-5 in slot 0 and/or slot 1 which may collide with the OFDM symbol containing or including the DL CRS 630 may be muted.

If a SC-FDMA symbol is to collide with an OFDM symbol containing or including a DL CRS 630 (e.g., in the 1st, 2nd, and/or 5th OFDM symbol in a slot 0 and/or slot 1), the PUSCH REs 860 (e.g., the PUSCH REs 860 that may collide with the DL CRS 630, for example as illustrated, in FIG. 12, and/or all PUSCH REs 860 associated with the SC-FDMA symbols (e.g., the SC-FDMA symbols 655-1, 655-2, and 655-5 in each slot) that may collide with the DL CRS 630, for example as illustrated in FIG. 13 may be muted. For example, a SC-FDMA symbol or symbols (e.g., the SC-FDMA symbols 655-1, 655-2, or 655-5 in one or more slots that may collide with the DL CRS 630 (e.g., overlap with the OFDM symbol containing or including the DL CRS 630) may be muted. The number of the SC-FDMA symbols that may collide with the OFDM symbol containing or including the DL CRS 630 may be different (e.g., according to the number of CRS port). For example, if one or two CRS ports are used or applied, the PUSCH REs in 4 SC-FDMA symbols may be muted (not shown). If four CRS ports are used or applied, the PUSCH REs in 6 SC-FDMA symbols may be muted. In FIG. 12, the muting may be specific to particular REs, while in FIG. 13, the muting may be the REs (e.g., each of the REs) in the SC-FDMA symbols (e.g., symbols 655-1, 655-2 and/or 655-5) associated with a collision of the DL CRSs 630.

The PUSCH RE muting for the DL CRS 630 may be used or applied, if the PUSCH transmission power is higher than a threshold. In certain representative embodiments, the PUSCH RE muting for the DL CRS 630 may be used or applied, if the CRS power level is lower than a threshold. Each subset of subframes used for measurement reporting may be configured with a different type of PUSCH RE muting for the DL CRS 630 (for example, PUSCH RE muting, PUSCH symbol muting and/or no muting). The number of CRS ports may be independent (for example according to whether a resource is a FDRR or a non-FDRR). For example, the maximum number of CRS port in a FDRR may be two and the maximum number of CRS port in a non-FDRR may be four. In another example, two CRS ports may be used in a FDRR (and/or the FDR subframe) and four CRS ports may be used in a non-FDRR (and/or the non-FDR subframe).

Representative PUSCH RE Muting for Sync Channel and/or PBCH

A PUSCH RE may collide with one or more DL synchronization channels (e.g., a PSS and/or a SSS) and/or the PBCH. To avoid interference for the synchronization channels and/or the PBCH, the PUSCH RE that may collide with the PSS/SSS and/or the PBCH may be muted. For example, one or more of the following may apply: (1) the PUSCH RE that may collide with the synchronization channel may be muted. In a subframe containing or including the PSS/SSS and without the PBCH (e.g., subframe 5), the PUSCH RE that may collide with the PSS/SSS may be muted and the same UL DM-RS pattern may be used for the PUSCH transmission.

Figure 14:
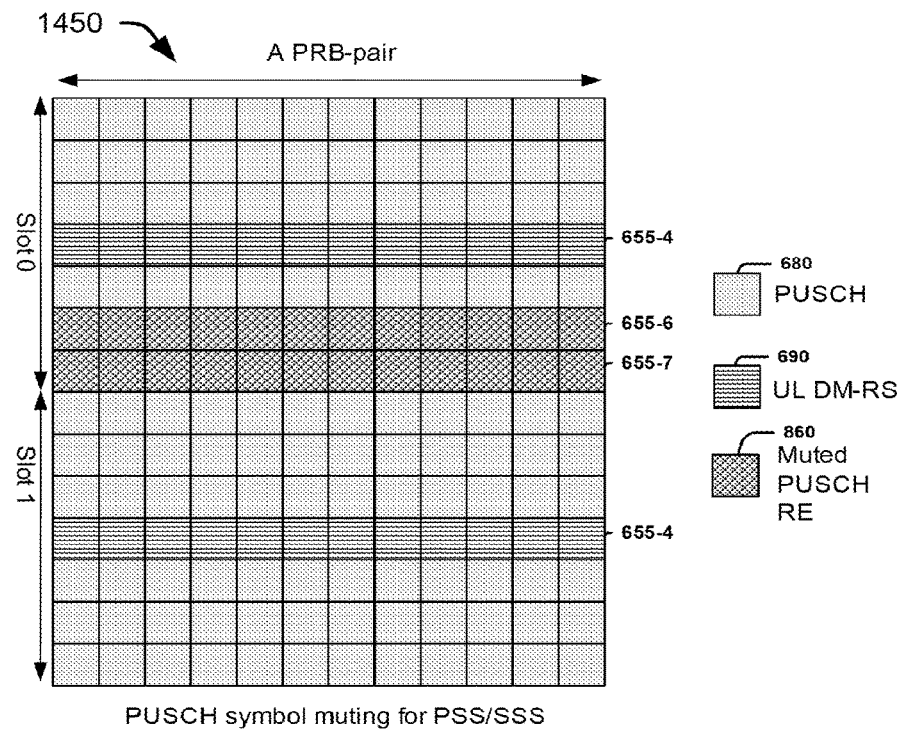
FIG. 14 is a diagram illustrating yet another representative PRB structure showing PUSCH symbol muting.

FIG. 14 is a diagram illustrating yet another representative UL PRB structure 1450 showing PUSCH symbol muting.

Referring to FIG. 14, the UL PRB structure 1450 may include a first timeslot (e.g., slot 0) and a second timeslot (e.g., slot 1). Slot 0 and/or slot 1 of the UL PRB structure 1450 may include the PUSCH 680 and/or the UL DM-RSs 690. The UL PRB structure 1450 may be a UL PRB pair, which may include a plurality of subcarriers (e.g., 12 subcarriers). The UL PRB structure 1450 may include a plurality of symbols 655-1, 655-2, 655-3, 655-4, 655-5, 655-6 and 655-7 (e.g. 7 symbols) for each of the slots 0 and 1. The UL DM-RS 690 may be included in one or more symbols (e.g., the fourth symbol 655-4 in each slot (e.g., slot 0 or 1).

The PUSCH RE muting for the PSS/SSS may be defined as PUSCH symbol muting. The PUSCH RE muting for the PSS/SSS may be applied (e.g., only used) for the center 6 RBs. If a PUSCH transmission includes a PRB-pair which is not in (e.g., within) the center 6 RBs, the PRB-pair may not include the PUSCH muting for the PSS/SSS. The PUSCH RE muting for the PSS/SSS may be applied (e.g., used) for the PRB-pairs (e.g., all PRB-pairs) granted for PUSCH transmission, if one or more of the PRB-pairs granted for the PUSCH transmission located in (e.g., within) the center 6 RBs contain or include the PSS/SSS. For instance, if the WTRU 102 is scheduled to transmit the PUSCH 680 and none of the RBs granted for the PUSCH transmission are to collide with the PSS/SSS, the WTRU 102 may transmit the PUSCH 680 without PUSCH RE muting for the PSS/SSS. In certain representative embodiment, if the WTRU 102 is scheduled to transmit the PUSCH 680 and one or more of the RBs granted for the PUSCH transmission are to collide with the PSS/SSS, the WTRU 102 may transmit the PUSCH 680 with muted PUSCH REs 860 for (e.g., reducing and/or eliminating interference with) the PSS/SSS for the granted RBs (e.g., all of the RBs granted).

FIG. 15 is a diagram illustrating a yet further representative UL PRB structure 1550 showing PUSCH symbol muting with fewer DM-RS symbols relative to FIG. 16.

Referring to FIG. 15, the UL PRB structure 1550 may include a first timeslot (e.g., slot 0) and a second timeslot (e.g., slot 1). Slot 0 and/or slot 1 of the UL PRB structure 1550 may include the PUSCH 680 and/or the UL DM-RSs 690. The UL PRB structure 1550 may be a UL PRB pair, which may include a plurality of subcarriers (e.g., 12 subcarriers). The UL PRB structure 1550 may include a plurality of symbols 655-1, 655-2, 655-3, 655-4, 655-5, 655-6 and 655-7 (e.g. 7 symbols) for each of the slots 0 and 1. The UL DM-RS 690 may be included in one or more symbols (e.g., the fourth symbol 655-4) in slot 0 and may not be included in one or more symbols (e.g., the fourth symbol 655-4) in slot 1, which may reduce the number of symbols used for UL DM-RS for a PRB pair relative to, for example, FIG. 16.

For example, the UL DM-RS 690 may generally be located in the fourth symbol 655-4 in slots 0 and 1. In other representative embodiments, the UL DM-RS 690 may be located in (e.g., only located in) one slot 0 or 1 (e.g., the fourth symbol 655-4 of slot 0 or slot 1). It is contemplate that the symbol associated with UL DM-RS 690 may be any symbol that does not overlap with a high priority signal from another direction (e.g., the DL direction).

In FIG. 15, the PRB structure 1550 may have PUSCH RE muting applied to mitigate collisions with the PSS/SSS and/or the PBCH. The PUSCH RE 860 that may collide with the PSS/SSS and/or the PBCH may be muted. In a subframe containing or including the PSS/SSS with the PBCH (e.g., subframe 0), the PUSCH RE 860 (e.g., that are associated with symbols 655-6, 655-7 of slot 0 and symbols 655-1-655-2, 655-3 and 655-4 of slot 1) that may collide with the PSS/SSS and/or the PBCH may be muted and the UL DM-RS pattern may be different from the UL DM-RS pattern used for the subframe containing or including the PSS/SSS without the PBCH (e.g., the Rel-8 UL DM-RS pattern). If a PRB-pair contains or includes both the PSS/SSS and the PBCH, fewer UL DM-RS symbols as compared with Rel-8 UL DM-RS may be applied or used in the PRB-pair. For example, if the PRB-pair contains or includes both the PSS/SSS and the PBCH, one UL DM-RS symbol may be applied in the PRB-pair and the UL DM-RS symbol may be located in one of the SC-FDMA symbols (e.g., symbol 655-4), which does not collide with the PSS/SSS and the PBCH.

FIG. 16 is a diagram illustrating a yet additional representative UL PRB structure 1650 showing PUSCH symbol muting with a DM-RS symbol time location change (e.g., applied when the PUSCH symbol is to collide with the PSS/SSS and/or the PBCH such that the time location of the DM-RS symbol is modified or changed).

For example, the UL DM-RS 690 may generally be located in the fourth symbol 655-4 in slots 0 and 1. In other representative embodiments, the UL DM-RS 690 may be located in the fourth symbol 655-4 of slot 0 and at a different symbol (e.g., the fifth symbol 655-5 of slot 1). It is contemplate that the symbol associated with UL DM-RS 690 may be in any slot and in any number of symbols that does not overlap with a high priority signal from another direction (e.g., the DL direction).

Referring to FIG. 16, the UL PRB structure 1650 may include PUSCH muting similar to or identical to that of FIG. 15 and may include a first timeslot (e.g., slot 0) and a second timeslot (e.g., slot 1). Slot 0 and/or slot 1 of the UL PRB structure 1650 may include the PUSCH 680 and/or the UL DM-RSs 690. The UL PRB structure 1650 may be a UL PRB pair, which may include a plurality of subcarriers (e.g., 12 subcarriers). The UL PRB structure 1650 may include a plurality of symbols 655-1, 655-2, 655-3, 655-4, 655-5, 655-6 and 655-7 (e.g. 7 symbols) for each of the slots 0 and 1. The UL DM-RS 690 may be included in one or more symbols (e.g., the fourth symbol 655-4 in a first one of the slots (e.g., slot 0 or 1) and in one or more symbols (e.g., the fifth symbol 655-5 in a second one of the slots (e.g., slot 0 or 1).

If a PRB-pair contains or includes both the PSS/SSS and the PBCH, the same number of DM-RS symbols, as the Rel-8 UL DM-RS, may be used or applied with a time location change as illustrated in FIG. 16. In one example, the 2nd DM-RS symbol location may be changed. In another example, the location of both DM-RS symbols may be changed.

If the PUSCH 680 that may collide with the PSS/SSS and the PBCH contains or includes a UCI (e.g., including HARQ_ACK), the PUSCH 680 that may collide may not be transmitted in the subframe.

Representative PUSCH RE Muting for PDSCH

In certain representative embodiments, a PUSCH RE may collide with the PDSCH 620 and the DL DM-RS for the PDSCH 620 may have a higher priority than the PUSCH RE. The PUSCH RE may be muted to avoid interference. For example, one or more of following may apply: (1) the PUSCH RE that may collide with the DL DM-RS for the PDSCH demodulation may be muted as shown in FIGS. 8 and 9; (2) the PUSCH RE that may collide with the DL DM-RS for a scheduled PDSCH 620 may be muted; and/or (3) if the PUSCH 680 contains or includes a UCI (e.g., including HARQ ACK), the PUSCH RE may not be muted, although the PUSCH RE is to collide with the PDSCH DM-RS.

In certain representative embodiments, a PUSCH RE may collide with the PDSCH 620 and the PDSCH 620 containing or including the SIB or paging information may have a higher priority than the PUSCH RE. The PUSCH RE may be muted to avoid interference. For example, the following may apply: (1) the PUSCH RE may be muted, if the PUSCH RE is to collide with a PDSCH 620 containing or including the SIB or paging information. For instance, a PUSCH PRB-pair that may collide with the PDSCH PRB-pair containing or including the SIB or the paging information may be muted.

Representative PUSCH RE Muting for CSI-RS

In certain representative embodiments, the PUSCH RE that may collide with a CSI-RS (or equivalently a CSI-IM) may be muted. If the WTRU 102 transmits the PUSCH 680 and the WTRU 102 receives or needs to receive the CSI-RS, the PUSCH RE 860 that may collide with the CSI-RS may be muted.

In certain representative embodiments, a zero-power CSI-RS (ZP-CSI-RS) may be applied or used for the PUSCH transmission. For example, one or more of following may apply: (1) the ZP-CSI-RS may be configured independently for the PDSCH 620 and/or the PUSCH 680; (2) the WTRU 102 may measure the DL interference from a ZP-CSI-RS location for the PUSCH 680 and/or an eNB 160 may measure the UL interference from the ZP-CSI-RS location for the PDSCH 620; (3) the WTRU 102 may report CSI based on the interference measurement from one or both of the ZP-CSI-RS for the PUSCH 680 and/or the ZP-CSI-RS for the PDSCH 620.

Representative PUSCH Prioritization can Depend on Included Information Type

In certain representative embodiments, the WTRU 102 may adjust a prioritization of the PUSCH 680 (e.g., compared to or relative to certain DL channels and/or signals) as a function of a MAC CE (e.g., that may be included in the transmission). The WTRU 102 may follow one or more of the prioritization rules herein to determine the prioritization of the PUSCH 680 relative to certain DL channels and signals.

For the prioritization of the Random Access Channel (RACH) related MAC CE and UL data, the WTRU 102 may consider or may set the PUSCH 680 containing or including the C-RNTI MAC CE and/or the UL CCCH data, which may be transmitted as part of a random access procedure, to be prioritized higher than other signals or channels. The WTRU 102 may consider or set the PUSCH priority to be higher compared to the DL channels and signals, for example: (i) the PUSCH 680 may be a higher priority than the PDSCH 620, except for possibly when the PDSCH 620 is carrying cell related information, for example, paging information and/or the SIBs; and/or (ii) the PUSCH 680 may be a higher priority than the PDCCH 610, except for possibly the PDCCH 610 in the CS S, which may carry DCI scrambled with a common RNTI, for example SI-RNTI and/or P-RNTI, among others.

For the prioritization of scheduling related CEs, the WTRU 102 may consider or set the PUSCH 680 containing or including the CEs, which provide information to the network for proper UL scheduling, to be prioritized higher than other signals or channels. For example, the Buffer Status Report (BSR), the Power Headroom Report (PHR), and/or the extended BSR may be considered to be scheduling related CEs. For the PUSCH 680, which contains or includes these CEs, the WTRU 102 may determine the PUSCH priority to be the following compared to the DL channels: (i) the PUSCH 680 may be a higher priority than the PDSCH 620, except for possibly the PDSCH 620, which may be addressed to multiple WTRUs 102 (for example, the PDSCH 620 may contain or include the paging information or the SIBs); and/or (ii) the PUSCH 680 may be a higher priority than the PDCCH 610 except for possibly the PDCCH 610 in the CSS, which may carry DCI scrambled with a common RNTI, for example the SI-RNTI, the P-RNTI, and/or the RA-RNTI, among others.

For the prioritization of data, the WTRU 102 may consider or set the PUSCH 680 for data to be prioritized higher than other signals or channels. For example, a PUSCH transmission that is based on semi-persistent scheduling (SPS) grants may be prioritized higher than a PUSCH transmission based on and/or set by dynamic grants. The PUSCH 680, which includes data based on the SPS, may be a higher priority than the PDSCH 620 and its associated PDCCH 610 carrying the dynamic grant. In certain representative embodiments, the WTRU 102 may consider or set the dynamic grant based PUSCH 680 to be of a higher priority than the SPS based grants, and the WTRU 102 may consider or may set the PUSCH 680 to be of a higher priority than the PDSCH 620 carrying SPS data.

For the prioritization of the PUSCH 680 compared to (e.g., relative to the PBCH, the PSS/SSS and/or the DL CRS 630), the WTRU 102 may not consider or set the PUSCH 680 to a higher priority compared to specific channels and/or signals such as the PBCH, the PSS/SSS, and/or the DL CRS 630, regardless of the MAC CE, which are included in the PUSCH 680.

One or more channels, which have lower priority based on the above rules and/or have resource collisions, may perform rate matching, puncturing, and/or RE muting based on various representative embodiment described herein for the PUSCH 680, for the PDSCH 620 and/or for the PDCCH 610.

The WTRU 102 may apply the prioritization of the PUSCH 680 based on information content (e.g., implicitly provided to the WTRU 102 and/or explicitly signaled by the eNB 160 or another node). The WTRU 102 may apply the prioritization to one channel, certain channels, or all channels commonly and/or may provide different prioritizations to different channels (e.g., logical channels or logical channel groups). The WTRU 102 may apply different prioritizations based on, for example QoS parameters (e.g., of a logical channel or each logical channel).

Representative PUCCH RE Muting

Figures 17A, 17B:
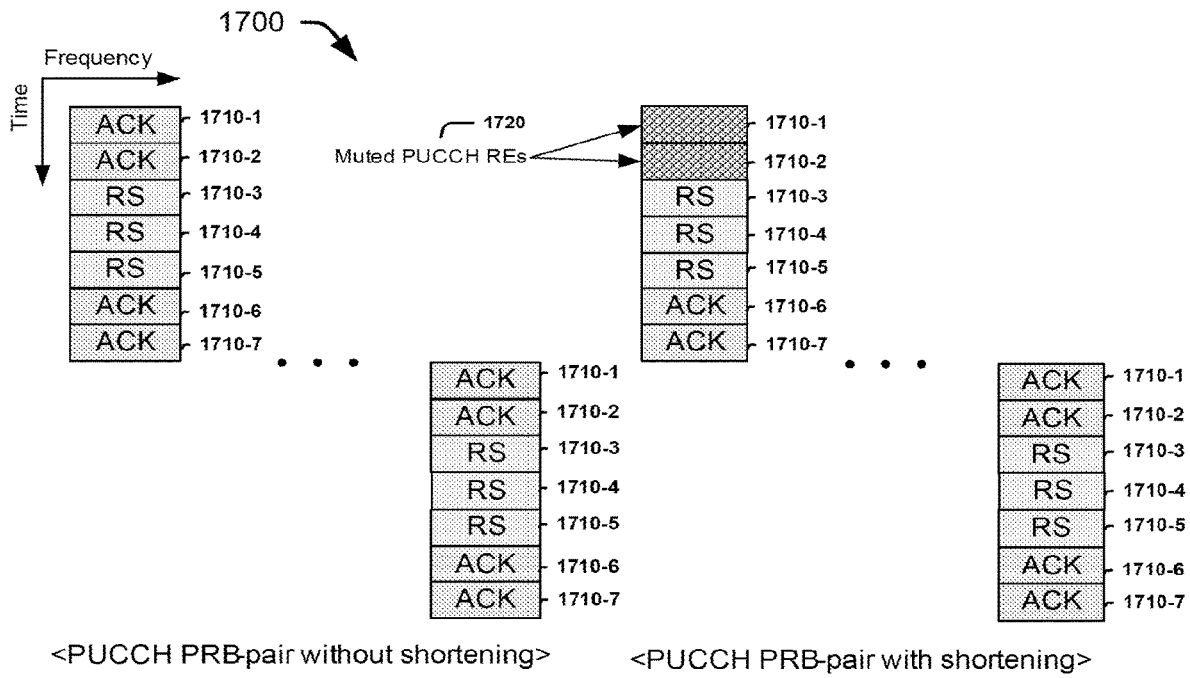
FIG. 17A is a diagram illustrating a representative PUCCH PRB pair without subframe shortening.
FIG. 17B is a diagram illustrating another representative PUCCH PRB pair with subframe shortening.

FIG. 17A is a diagram illustrating a representative PUCCH PRB pair 1700 without subframe shortening and FIG. 17B is a diagram illustrating another representative PUCCH PRB pair 1750 with subframe shortening (e.g., PUCCH shortening).

Referring to FIGS. 17A and 17B, the PUCCH PRB pairs 1700 and 1750 may include ACK/NACK, CQI (not shown) and/or RS signaling. The UL PUCCH PRB pairs 1700 and 1750 may include a plurality of subcarriers (e.g., 12 subcarriers) (e.g., in frequency) and a plurality of symbols 1710-1, 1710-2, 1710-3, 1710-4, 1710-5, 1710-6, and 1710-7 (e.g., in time) for each of the slot.

FIGS. 17A and 17B illustrate that certain PUCCH REs may be selectively muted (e.g., the subframes may be shortened). For example, the PUCCH REs (e.g., in symbols 1710-1 and 1710-2 associated with ACK/NACK signaling may collide with a PDCCH region (not shown) and may be muted. As another example, one or more of following may apply.

(1) The first one or a plurality of symbols 1710-1 and 1710-2 (e.g., two PUCCH symbols) may be muted when the PUCCH symbols 1710-1 and 1710-2 are to collide with a PDCCH region. This muting may be defined as or referred to as PUCCH shortening. The PUCCH shortening may imply that the first N PUCCH symbols 1710, 1710-2 . . . 1710-N may be muted. The number of muted PUCCH symbol may be indicated by the number of OFDM symbol used for the PDCCH region. The PCFICH in the subframe may indicate the number of muted PUCCH symbol in the subframe. The number of muted PUCCH symbols may be predefined, as a fixed number. For instance, the first two PUCCH symbols 1710-1, and 1710-2 may be muted as shown in FIG. 17B which illustrates a PUCCH PRB-pair with shortening. The number of muted PUCCH symbols may be configured via higher layer signaling.

(2) A PUCCH format (e.g., a new PUCCH format) may be defined and/or applied and the new PUCCH format may have muted SC-FDMA symbols corresponding to locations of the PDCCH region. For the 3GPP LTE PUCCH formats 1, 1a and/or 1b, RS symbols 1710-4 and 1710-5 (e.g., two RS symbols) may be used for each slot and the RS symbols may be located at or in the 4th and 5th SC-FDMA symbols. For the 3GPP LTE PUCCH format 2, 2a, and/or 2b, a RS symbol 1710-1, 1710-2, 1710-3, 1710-4, 1710-5, 1710-6, or 1710-7 (e.g., a single or one RS symbol) may be used for a slot (e.g., each slot) and the RS symbol may be located in any SC-FDMA symbol which may not overlap with the PDCCH region. A PUCCH RE muting may be used or applied according to the PUCCH format set or used. For instance, the PUCCH RE muting may be used or applied for the PUCCH formats 2, 2a, and/or 2b and the PUCCH RE muting may not be used or applied for the PUCCH formats 1, 1a, and/or 1b.

Representative UL Channel Dependent Puncturing/Rate-Matching

Representative PUCCH RE Muting

RE puncturing and/or RE rate-matching may be used or applied for a DL channel, for example if an RE of the DL channel is to collide with a UL channel or a UL RS, which may have a higher priority than the DL channel. RE muting may employ RE puncturing and/or RE rate-matching.

RE muting may be applied at the OFDM symbol level in which REs (e.g., some or all REs) in one or more of the OFDM symbols may be muted. The terms shortened PDSCH, PDSCH shortening, OFDM symbol level RE puncturing, OFDM symbol level RE rate-matching, and OFDM symbol level RE muting may be interchangeably used. For the DL resource in which RE muting may be used or applied, an eNB 160 may perform at least one of following: (1) the eNB 160 may allocate zero transmission power at the DL resource where RE muting may be used or applied; (2) the eNB 160 may consider the DL resource as the UL resource; and/or (3) the eNB 160 may perform the same behavior as for Interference Measurement-CSI-RS (IM-CSI-RS), among others.

For the DL resource in which RE muting may be used or applied, the WTRU 102 behavior may include at least one of following: (1) the WTRU 102 may preclude the DL resource in which RE muting may be used or applied in its demodulation procedure (for instance, the modulation symbol detection may not be performed for the muted RE; (2) the WTRU 102 may preclude the coded bits from the muted RE after the demodulation procedure in its channel decoding procedure; and/or (3) the WTRU 102 may perform the same behavior as the IM-CSI-RS for the muted RE due to the collision with a higher priority UL channel, among others.

Representative PDSCH RE Muting

A PDSCH RE that may collide with a UL channel or an RS having a higher priority may be muted.

Representative PDSCH RE Muting for PUCCH or PRACH

In certain representative embodiments, a PDSCH RE that may collide with the PUCCH may be muted. The PUCCH PRB-pairs 1700 and 1750 may be located in a band edge. The PDSCH RE muting may be performed by one or more of following.

(1) PDSCH PRB level muting for the PUCCH may be used or applied, if the PDSCH PRB is to collide with a PUCCH PRB 1700. For example, the WTRU 102 may decode or may need to decode a PDSCH 620 in a subframe and the PDSCH 620 may contain or include the PRBs overlapped with a PUCCH PRB. The WTRU 102 may decode the PRBs, which are not overlapped with the PUCCH. The PDSCH PRB level muting may be either RE puncturing or RE rate-matching. In certain representative embodiments, the PDSCH PRB level muting for the PUCCH may be used or applied for the PUCCH PRB containing or including a specific PUCCH format such as a PUCCH format used for ACK/NACK, e.g., the 3GPP LTE PUCCH format 1, 1 a, and/or 1b.

(2) PDSCH PRB level muting (e.g., per time slot) may be used, if the PDSCH PRB is to collide with the PUCCH PRB. For example, the WTRU 102 may decode or may need to decode the PDSCH 620 in a subframe and the PDSCH 620 may contain or include the PRBs that overlap with a PUCCH, (for example transmitted by the same WTRU 102). The WTRU 102 may decode the PRBs which are not overlapped with the PUCCH. The WTRUs 102 may decode a single time slot of the PRB, for which a time slot may not be overlapping with the PUCCH, but the other time slot of the same PRB may be overlapping with the PUCCH. The PDSCH PRB level muting may be either RE puncturing or RE rate-matching.

(3) PDSCH PRB level muting for the PUCCH may be used or applied with a reduced bandwidth. For instance, if a system bandwidth is $N_{PRB}$, the reduced bandwidth may be defined as $N_{TOTAL}=N_{PRB}-N_{PUCCH}$ and the reduced bandwidth may be located in the center bandwidth and/or elsewhere, where $N_{PUCCH}$ is the number of PRB used or applied for the PUCCH. In certain representative embodiments, the DL resource allocation may be based on $N_{TOTAL}$. In certain representative embodiments, CSI measurements, which may include PMI, CQI, and/or RI, may be based on $N_{TOTAL}$.

In certain representative embodiments, a PDSCH RE that may collide with a PRACH resource may be muted. For example, the PDSCH PRB corresponding to the location of the PRACH PRB may be muted. The WTRU 102 may receive the PDSCH 620 and one or more of the PRBs for the PDSCH 620 corresponding to the location of the PRACH resource may be punctured and/or rate-matched.

Representative PDSCH RE Muting for PUSCH

Figure 18:
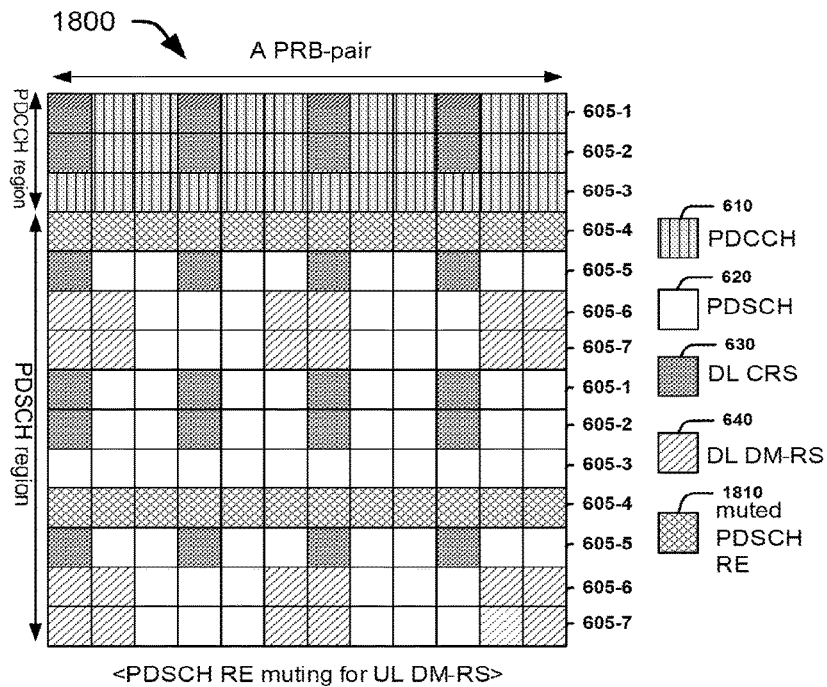
FIG. 18 is a diagram illustrating a representative DL PRB structure showing Physical Downlink Shared Channel (PDSCH) PUSCH RE muting.

FIG. 18 is a diagram illustrating a representative DL PRB structure 1800 showing PDSCH RE muting (e.g., applied for interference mitigation for collisions with an UL DM-RS).

Referring to FIG. 18, the DL PRB structure 1800 may include a DL PRB pair with a PDCCH region and a PDSCH region. The PDCCH region may include the PDCCH 610 and the DL CRS 630. The PDSCH region may include the PDSCH 620, the DL CRS 630 and/or the DL DM-RS 640. The PDCCH region may be the first N symbols (e.g., 2 or 3 symbols 605-1, 605-2 and/or 605-3) The DL PRB pair 1800 may include a plurality of subcarriers (e.g., 12 subcarriers) and may have a plurality of symbols 605-1, 605-2, 605,3, 605-4, 605-6 and 605-7 (e.g. 7 symbols) for each slot 0 and 1. The DL CRS 630 may be located in particular subcarriers (e.g., spaced apart such as subcarriers 1, 4, 7 and/or 10, among other configurations). The DL CRS 630 may be located in particular symbols (e.g., symbols 605-1, 605-2 and/or 605-5, among other configurations). The DL DM-RS 640 may be located in particular subcarriers (e.g., subcarriers 1, 2, 6, 7 11, and/or 12, among other configurations). The DL DM-RS 640 may be included in one or more symbols (e.g., at the end of one or more slots of the DL PRB pair 1800 such as the next to last and the last symbols 605-6 and 605-7 in one or more slots (e.g., slot 0 and/or slot 1).

In certain representative embodiments, a PDSCH RE 1810 may collide with the PUSCH 680 and/or the UL DM-RS 690 located in the PUSCH region and the PDSCH RE 1810 may be muted to avoid interference. For example, one or more of following may apply.

(1) The PDSCH RE 1810 that may collide with the PUSCH RE may be muted, if the PUSCH 680 contains or includes UCI. For example, the PDSCH RE muting may be used or applied according to a UCT type. As one example, if the UCT contains or includes ACK/NACK information, the PDSCH RE muting may be used or applied and, otherwise, the PDSCH RE muting may not be used or applied. In certain representative embodiments, the PDSCH RE muting for (e.g., interference mitigation to) the PUSCH 680 containing or including the UCT may be used or applied irrespective of the UCI type.

(2) The PDSCH RE 1810 that may collide with the UL DM-RS 690 for the PUSCH region may be muted. FIG. 18 is a diagram of a representative PRB-pair (e.g., a portion of a subframe) having PDSCH RE muting applied for (e.g., interference mitigation to) the UL DM-RS 690. If the PDSCH RE 1810 is muted for the PUSCH UL DM-RS 690, the WTRU 102 may decode the PDSCH 620 by assuming or providing for either or both of RE puncturing and/or RE rate-matching according to one or more predefined rules.

(3) The PDSCH RE 1810 that may collide with the UL DM-RS 690 for the PUSCH 620 containing or including UCI may be muted, and no PDSCH RE muting may be used or applied for the PUSCH 680 that does not containing or including the UCI. For example, the PDSCH RE muting may be applied or used according to the UCI type. For instance, if a UCI contains or includes ACK/NACK information, the PDSCH RE muting may be applied or used. Otherwise, the PDSCH RE muting may not be applied or used. In certain representative embodiments, the PDSCH RE muting for the PUSCH 680 containing or including the UCI may be used or applied irrespective of the UCI type.

(4) The PDSCH RE 1810 that may collide with the UCI RE within the PUSCH 680 may be muted. For example, the PDSCH RE 1810 that may collide with the ACK/NACK and/or the CSI information may be muted.

Representative PDSCH RE Muting for SRS

Figures 19, 20:
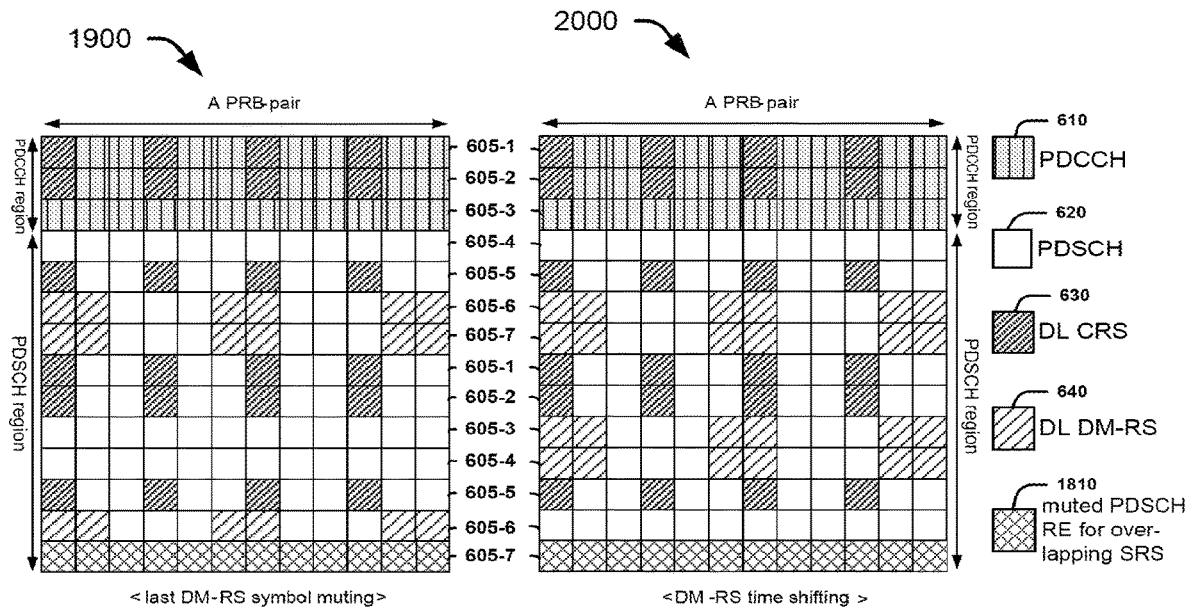
FIG. 19 is a diagram illustrating another representative DL PRB structure showing PDSCH RE muting of the last DL DM-RS symbol.
FIG. 20 is a diagram illustrating a further representative DL PRB structure showing RS time shifting.

FIG. 19 is a diagram illustrating another representative DL PRB structure 1900 with a PRB pair showing PDSCH RE muting of the last DL DM-RS symbol 605-7 in the PRB structure 1900 (e.g., which may be applied for collisions (e.g., collision mitigation) with the SRS) and FIG. 20 is a diagram illustrating a further representative PRB structure 2000 with a PRB pair showing RS time shifting (e.g., DL DM-RS time shifting that may be applied for collisions (e.g., collision mitigation) with the SRS).

Referring to FIG. 19, the DL PRB structure 1900 may each include a DL PRB pair with a PDCCH region and a PDSCH region. The PDCCH region may include the PDCCH 610 and the DL CRS 630. The PDSCH region may include the PDSCH 620, the DL CRS 630 and/or the DL DM-RS 640. The PDCCH region may be the first N symbols (e.g., 2 or 3 symbols 605-1, 605-2 and/or 605-3) The DL PRB structure 2000 may include a plurality of subcarriers (e.g., 12 subcarriers) and may have a plurality of symbols 605-1, 605-2, 605,3, 605-4, 605-6 and 605-7 (e.g. 7 symbols) for each slot 0 and 1. The DL CRS 630 may be located in particular subcarriers (e.g., spaced apart such as subcarriers 1, 4, 7 and/or 10, among other configurations). The DL CRS 630 may be located in particular symbols (e.g., symbols 605-1, 605-2 and/or 605-5, among other configurations) . The DL DM-RS 640 may be located in particular subcarriers (e.g., subcarriers 1, 2, 6, 7 11, and/or 12, among other configurations). In general, the DL DM-RS 640 may be included in one or more symbols (e.g., at the end of one or more slots of the DL PRB structure 2000 such as the next to last and the last symbols 605-6 and 605-7 in one or more slots (e.g., slot 0 and/or slot 1) In certain representative embodiments, one or more DL DM-RS REs may be muted or one or more symbols associated with the DL DM-RS 640 may be muted (e.g., the last symbol 605-7 of one of the slots, for example, slot 1 may be muted)).

Referring to FIG. 20, the DL PRB structure 2000 may include a DL PRB pair with a PDCCH region and a PDSCH region. The PDCCH region may include the PDCCH 610 and the DL CRS 630.

The PDSCH region may include the PDSCH 620, the DL CRS 630 and/or the DL DM-RS 640. The PDCCH region may be the first N symbols (e.g., 2 or 3 symbols 605-1, 605-2 and/or 605-3) The DL PRB structure 2000 may include a plurality of subcarriers (e.g., 12 subcarriers) and may have a plurality of symbols 605-1, 605-2, 605,3, 605-4, 605-6 and 605-7 (e.g. 7 symbols) for each slot 0 and 1. The DL CRS 630 may be located in particular subcarriers (e.g., spaced apart such as subcarriers 1, 4, 7 and/or 10, among other configurations). The DL CRS 630 may be located in particular symbols (e.g., symbols 605-1, 605-2 and/or 605-5, among other configurations). The DL DM-RS 640 may be located in particular subcarriers (e.g., subcarriers 1, 2, 6, 7 11, and/or 12, among other configurations). In general, the DL DM-RS 640 may be included in one or more symbols (e.g., at the end of one or more slots of the DL PRB pair such as the next to last and the last symbols 605-6 and 605-7 in one or more slots (e.g., slot 0 and/or slot 1) In certain representative embodiments, one or more DL DM-RS REs may be time and/or frequency shifted or one or more symbols associated with the DL DM-RS 640 may be time shifted (e.g., the symbols 605-6 and 605-7 of slot 1 may be time shifted to other symbols, for example, symbols 605-3 and 605-4 of slot 1).

For example, the PDSCH RE 1810 that may collide with the SRS may be muted. In certain representative embodiments, one or more of following may apply.

(1) The PDSCH RE 1810 that may collide with a WTRU-specific SRS may be muted. If the WTRU 102 is configured to transmit the SRS in a subframe in or within a specific bandwidth (hereafter sometime referred to as the WTRU-specific SRS bandwidth) and, for example, the WTRU 102 may receive or may need to receive the PDSCH 620 in the WTRU-specific SRS bandwidth, the PDSCH REs 1810 located in the last OFDM symbol 605-7 within the WTRU-specific SRS bandwidth may be muted. The muting may depend on the frequency shift (or comb) applied to the SRS transmission. For example, every second (e.g., only every second) subcarrier may use or require muting for the SRS in or within the last OFDM symbol (e.g., symbol 605-7 of slot 2).

(2) The PDSCH RE 1810 that may collide with the cell-specific SRS may be muted. If the WTRU 102 receives the PDSCH 620 in the cell-specific SRS subframe, the PDSCH REs 1810 corresponding to the location of the last OFDM symbol 605-7 in or within the cell-specific SRS subframe may be muted.

(3) The WTRU 102 may be configured with a TM using the DL DM-RS for PDSCH demodulation including TM8, TM9 and/or TM10. The PDSCH RE muting may be used for WTRU-specific SRS and/or cell-specific SRS. The DL DM-RS 640 for the PDSCH 620 may be defined as at least one of following: (i) the DL DM-RS 640 in the last OFDM symbol 605-7 (e.g., of the PDSCH region) may be muted, for example, as shown in FIG. 19; (ii) the DL DM-RS 630 in the last two OFDM symbols 605-6 and 605-7 may be shifted to one or more other locations (e.g., to other OFDM symbols 605-3 and 605-4 of the PDSCH region), as shown in FIG. 20 in which the DL DM-RS 640 is time shifted to earlier OFDM symbols; (iii) the DL DM-RS 640 in the last two OFDM symbol 605-6 and 605-7 may be muted; and/or (iv) the DM-RS pattern used or applied for the Downlink Pilot Time Slot (DwPTS) in a TDD special subframe may be reused, among others.

Representative PDSCH Prioritization Depends on Information Type

In certain representative embodiments, a WTRU 102 may have the PDSCH 620 scheduled by the eNB 160 and the PDSCH 620 may be given a different priority (e.g., as a function of the MAC data, the RLC data and/or the control information included in the PDSCH 620). The PDSCH priority may be relative to the scheduling of the UL channels and/or RSs. For scheduling of the PDSCH 620, one or more of the following prioritization rules may apply.

(1) For prioritization using MAC control information, the PDSCH 620 containing or including MAC control information may be prioritized higher than the UL channels or the PDSCH 620 containing or including MAC data PDUs (e.g., only MAC data PDUs). For example, the MAC control information may include MAC control elements and/or MAC RAR PDUs as described herein. The PDSCH 620 with the MAC control information may be: (i) prioritized over PUSCH transmissions containing or including data (e.g., only data), as control information may be prioritized over data; (ii) prioritized over the PUSCH transmissions containing or including data and control information (e.g., HARQ-ACK and/or UCI, among others); or (iii) prioritized over the PUSCH transmission for control information only or the PUCCH transmission, if the DL transmissions are considered or set as a higher priority than the UL transmissions, in general.

(2) For prioritization using MAC group control information, the PDSCH 620 containing or including MAC control information that is intended for multiple WTRUs 102 may be prioritized higher than the UL channels or the PDSCH 620 containing or including MAC control information for a specific WTRU 102 or MAC data PDUs. For example, MAC CEs intended for multiple WTRUs 102 may include a MAC RAR PDU or MAC Contention Resolution CEs. The PDSCH 620 with MAC group control information may be: (i) prioritized over the PUSCH 680 containing or including data and/or control information as the PUSCH 680 may be a point-to-point transmission intended or destined for a single cell/eNB 160; and/or (ii) prioritized over the PUCCH as the PUCCH may be a point-to-point transmission intended or destined for the single cell/eNB 160.

(3) For prioritization of control information related to random access (RA), the PDSCH 620 containing or including MAC control information that may be used for an RA procedure may be prioritized higher than UL channels and/or the PDSCH 620 containing or including other MAC data and/or control information. For example, Contention Resolution MAC CEs, Timing Advance Command MAC CEs, and/or MAC RAR PDUs, among others may be included as MAC control information for an RA. The PDSCH 620 including the RA control information may be: (i) prioritized over the PUSCH 680 containing or including data and/or control information. In certain representative embodiments, the PUSCH transmission including msg3, for example a CCCH SDU may be prioritized higher than the PDSCH 620; and/or (ii) prioritized over the PUCCH, among others.

(4) For prioritization of RLC AM and/or Automatic Request (ARQ) related information and data, the PDSCH 620 containing or including one or more RLC data PDUs and/or control PDUs related to the RLC AM ARQ functionality may be prioritized higher than the UL channels. For example, the RLC AM PDUs for ARQ retransmissions, RLC AM PDUs, which may include the POLL bit, and/or the RLC STATUS control PDU may be included in the PDSCH 620, which may be considered or set as a higher priority than other signals or channels. The PDSCH 620 including the RLC AM ARQ related data and/or information may be: (i) prioritized over the PUSCH 680 which may not include control and/or data related to the RLC AM ARQ process (e.g., prioritization of the PDSCH 620 over the PUSCH 680 containing or including such data and/or control information may depend on prioritization of the UL and the DL in general, for example, the composite prioritization of the UL and the DL); and/or (ii) prioritized over the PUCCH, among others. For example, the PDSCH 620 may not be prioritized over the PUCCH containing or including HARQ-ACK.

(5) For prioritization of data, the PDSCH 620 containing or including user plane data may be prioritized over other control information. The PDSCH 620 may be prioritized differently (e.g., with different priority rules) depending on whether the PDSCH 620 is based on scheduling by a dynamic grant or is based on SPS and/or whether there is no associated DL grant for the PDSCH 620. The PDSCH 620 including data may be: (i) prioritized over the PUSCH 680 containing or including control information (e.g., only control information). The PDSCH 620 containing or including data may be prioritized below the PUSCH 680, if the PUSCH 680 contains or includes (e.g., also contains) user plane data, and the UL is prioritized higher than the DL transmissions (e.g., in general); and/or (ii) prioritized over the PUCCH which may contain of include control information (e.g., only control information).

(6) For prioritization of control information related to WTRU energy savings, the PDSCH 620 containing or including MAC control information (e.g., used to maximize energy savings of a WTRU 102) may be prioritized higher than the UL channels. For example, the MAC CE for the DRX Command and/or the Carrier Aggregation (C A) Activation/Deactivation (e.g., and/or Activation/Deactivation CE) may be control information, which may be prioritized higher than other signals or channels such as UL channels (e.g., because they enhance energy efficiency for WTRU operations).

(7) For prioritization of the PDSCH 620 compared to or relative to the UL RSs, the PDSCH 620 may not be prioritized over the UL RSs, for example the DM-RS and/or SRS among others, and may be (e.g., may always be) the channel with rate matching, puncturing, and/or RE muting applied when resource collision are to occur with these channels.

(8) For PDSCH prioritization based on included control information compared to the UL channels and the RSs, the UL channels may be rate matched, punctured and/or RE muted according to the disclosure herein, if the PDSCH 620 is considered to be of a higher priority and resource collisions are to occur. If the UL channel and/or the RS are considered to be of a higher priority and resource collisions are to occur with the PDSCH 620, the PDSCH 620 may be rate matched, punctured and/or RE muted according to procedures described herein.

The WTRU 102 may apply prioritization rules for PDSCH 620 implicitly or based on rules, as explicitly signaled by the eNB 160. The prioritization may apply to all configured logical channels or logical channel groups commonly or each logical channel may be configured with a different set of prioritization rules, for example according to the QoS configuration of the logical channel.

Representative PDCCH RE Muting

In certain representative embodiments, a PDCCH RE may collide with the PUCCH and the PDCCH RE may be muted. For example, one or more of following may apply: (1) the WTRU 102 may monitor a WTRU-specific search space and if any RE Group (REG) (or CCE) for a PDCCH candidate is located in the PUCCH PRB, the WTRU 102 may skip monitoring the PDCCH candidate; (2) the WTRU 102 may monitor a common search space and the WTRU 102 may monitor or may need to monitor the PDCCH (e.g., some or all PDCCH) candidates (e.g., irrespective of any collision between the PDCCH 610 and the PUCCH (not shown)); and/or (3) the PDCCH bandwidth may be defined within a reduced bandwidth, among others. For instance, if a system bandwidth has NPRB number of PRBs, the reduced bandwidth may be defined or set as $N_{TOTAL}=NPRB-N_{PUCCH}$, the reduced bandwidth may be located in the center bandwidth and/or the $N_{PUCCH}$ may be defined or set as the number of PRBs used for the PUCCH. In certain representative embodiments, the REG and/or the CCE may be defined or set to be within the $N_{TOTAL}$ bandwidth. In certain representative embodiments, the common search space and/or the WTRU-specific search space may be defined within the $N_{TOTAL}$ bandwidth. In certain representative embodiments, the number of PRBs for the PDCCH 610 may be changed according to the subframe type (i.e., the SINTF subframe and/or the NINTF subframe). For instance, the PDCCH 610 may be configured over NPRB in the NINTF subframe and the PDCCH 610 may be configured over $N_{TOTAL}$ subframe in the SINTF subframe.

In certain representative embodiments, the PDCCH RE that may collide with the PRACH may be muted. For example, one or more of following may apply: (1) the WTRU 102 may monitor a WTRU-specific search space and if a REG or a CCE (e.g., any REG or CCE) for a PDCCH candidate is located in the PRACH PRB, the WTRU 102 may skip monitoring the PDCCH candidate; and/or (2) the WTRU 102 may monitor the common search space and the WTRU 102 may monitor (e.g., need to monitor) the PDCCH candidates (e.g., some or all PDCCH candidates) (e.g., irrespective of any collision between the PDCCH 610 and the PRACH).

Representative Application of Collision Avoidance

Application of certain representative embodiments, described herein, including for example collision avoidance, may or may only be applied in or for certain resources such as FDRRs and/or resources which may be used in an FDR manner. For a resource which may be a non-FDRR and/or which may be used in a non-FDR manner, one or more collision avoidance procedures may or may not be used. A non-FDRR may be an RE, RB, and/or subframe, which may be used or applied for either the UL or the DL at a time. A non-FDRR may include FDD LTE resources associated with or conforming to Rel-8, Rel-9, Rel-10, Rel-11 and/or Rel-12 and/or TDD LTE resources associated with or conforming to Rel-8, Rel-9, Rel-10, and/or Rel-11.

When communicating with a non-FDR capable device such as a legacy WTRU 102, or one which is not configured for FDR, or in resources not identified as FDR, collision avoidance may or may not be used or applied.

In certain representative embodiments, one or more of following may apply.

(1) The WTRU 102 may transmit the UL signal without RE muting (e.g., any RE muting) (e.g., related to the DL channel and/or the RS in non-FDRR), since the WTRU 102 may know, determine, set and/or assume that there may be no collision between the UL and the DL channels.

(2) The WTRU 102 may transmit the UL signal (e.g., with RE muting), if the UL signal is to collide with a higher priority DL channel and/or a high priority RS in the FDRR.

(3) The eNB 160 may transmit the DL signal (e.g., without RE muting) (e.g., without any RE muting) related to the UL channel and/or the RS in a non-FDRR (e.g., because the eNB 160 may know, determine or assume that there is or may be no collision between the DL and the UL channels.

(4) The eNB 160 may transmit the DL signal (e.g., with RE muting), if the DL signal is to collide with a higher priority UL channel or RS in the FDRR.

(5) The UL signal may include one or more of: the PUSCH 680, the PUCCH, the UL DM-RS 690, the SRS, and/or the PRACH, among others.

(6) The DL signal may include one or more of: the PDSCH 620, the PDCCH 610, the EPDCCH, the PHICH, the PCFICH, the PMCH, the DL CRS 630, the DL DM-RS 640, and/or the PRS, among others.

(7) The WTRU 102 may transmit the UL channel with a higher priority than a DL channel (e.g., during reception) in a FDRR, if the given resource is used or applied, as a UL resource for the non-FDR and/or legacy WTRUs 102. For example, the WTRU 102 may prioritize UL channels in a FDRR higher than DL channels, if the resource is allocated on a FDD UL carrier or a TDD UL subframe (for example, from the perspective of a legacy WTRU). Transmitting the UL with a higher priority than the DL may indicate that the WTRU 102 may transmit the UL signal without RE muting (e.g., any RE muting) related to the DL channel and/or RS.

(8) The eNB 160 may transmit the DL signal with a higher priority than a UL channel (e.g., during reception) in the FDRR, if the given resource is used or applied as a DL resource for the non-FDR and/or legacy WTRUs 102. For example, the eNB 160 may prioritize transmission of the DL channels in the FDRR higher than the UL channels, if the resource is allocated on a FDD DL carrier or the TDD DL subframe (for example from the perspective of a legacy WTRU 102). Transmitting the DL with a higher priority than the UL may indicate or provide that the eNB 160 may transmit the DL signal without RE muting (e.g., any RE muting) related to the UL channel and/or the RS.

Representative Power Control
Representative Unequal DL Power Allocation Based on UL Channel Collision The eNB 160 may configure the FDRR in a set of subframes. The ability or capability to use or apply FDR in a subframe may mean or provide that the eNB 160 may provide DL assignments to the WTRUs 102 and UL grants to WTRUs 102 (e.g., possibly the same WTRUs 102) on the same set of time/frequency resources (e.g., frequency and time REs). In the DL (and/or in the UL) the transmissions may be separated by use of legacy MU-MIMO procedures. The eNB 160 interference from the DL transmissions may have a negative impact on proper reception of the UL transmissions. In certain representative embodiments, the eNB 160 may implement unequal DL power allocation on some or all of its DL physical channels (e.g., the PDCCH, the EPDCCH, the PHICH, the PCFICH, the PDSCH, the PSS/SSS, the PBCH, the DL DM-RS, the CSI-RS, the CRS, and/or the PRS, among others) to improve its reception of simultaneous and/or overlapping FDR UL transmissions.

The terms "time/frequency resource" "time-frequency resource" and "TF resource" may be used interchangeably herein.

Unequal DL power allocation may indicate or provide that different DL channels may have different transmission powers. For example, the PDCCH 610 may be transmitted at a different power level than the PDSCH 620. In other examples, unequal DL power allocation may indicate or provide that in or within one physical DL channel, the power may be different depending on the PRB, the symbol and/or the RE. For example, the PDSCH 620 transmitted in or within a PRB may be setup or done with a different power level than the PDSCH 620 transmitted in or within a second PRB in the same subframe. The transmission at different power levels may be applicable whether or not the two PRBs are scheduled for the same WTRU 102. In further examples, the PDSCH RE in or within a PRB may be transmitted with a different power level than another PDSCH RE in or within the PRB.

Representative PDSCH Power Allocation

Unequal PDSCH power allocation may be performed to reduce an amount of eNB SINTF on the UL channels. When the PDSCH power allocation is referred to herein, it is contemplated that the description may be relevant to an appropriate DL DM-RS 640 associated with the PDSCH transmission, as well.

In the FDRR, the PDSCH 620 may collide with the UL RSs (e.g., the UL DM-RS 640 and/or the SRS). The UL RSs may be spread over the entire SC-FDMA symbols 655-1 to 655-7. If such a collision is to occur, the PDSCH 620 may use unequal power allocation. The PDSCH 620 transmitted in the OFDM symbols 605-1, 605-2, 605-3, 605-4, 605-6 and/or 605-7 that may collide with the UL RSs may be transmitted with a different power offset (e.g., relative to the DL CRS 630) than the PDSCH 620 transmitted in the OFDM symbols 605-1, 605-2, 605-3, 605-4, 605-6 and/or 605-7 without a collision with the UL RSs. For example, an offset of x dB relative to the CRS transmission power may be provided for the non-colliding PDSCH symbols 605-3, 605-4, 605-6 and/or 605-1 and a second offset of y dB relative to the CRS transmission power may be provided for the PDSCH symbols 605-3, 605-4, 605-6 and/or 605-7 that are to collide.

The SRS transmission may use a comb-like structure such that the SRS may be interlaced over different REs within a single symbol. The UL SRS may in addition or alternatively use or apply frequency hopping. In certain representative embodiments, the UL SRS may be located in different subsets of subcarriers in different symbols. The PDSCH power allocation may use or apply different offsets per RE in the symbol that may collide with the SRS. For example, a first set of subcarriers may have a SRS collision and a second set of subcarriers may not have a SRS collision. For the PDSCH REs, which may collide with the SRS, a first transmission power offset (e.g., relative to CRS transmission power) may be used and for the PDSCH REs which may not collide with the SRS, a second transmission power offset may be used.

The PDSCH transmission may collide with the PUCCH from either the same WTRU 102 or another WTRU 102 served by the cell. In certain representative embodiments, there may be different power offsets (e.g., relative to DL CRS 630) for the PDSCH 620 in the PRBs which may collide with the PUCCH and in the PRBs without such collisions. The set of PRBs where (e.g. associated with) the power offset (e.g., each power offset) used or applied may be explicitly indicated to the WTRUs 102. In certain representative embodiments, the set of PRBs where the WTRU 102 may expect (e.g., determine and/or know of) reduced transmission power and (for example, may assume an appropriate power offset) may be implicitly indicated. For example, the WTRU 102 with a PUCCH transmission in the same subframe may assume, determine and/or know a second offset of the PDSCH 620 is being used or applied in the PDSCH-PUCCH that are to have colliding PRBs. Similarly, the PDSCH 620 may collide with the PRACH resources. In such situations, the PDSCH power allocation may use a first transmission power offset for the REs, the PRBs and/or the OFDM symbols where there is no collision with the possible PRACH transmissions, and a second transmission power offset for the REs, the PRBs and/or the OFDM symbols if or where there may be a collision with a possible PRACH transmission.

Representative Configuration of Multiple Transmission Power Offsets

In certain representative embodiments, to enable proper reception at the WTRU, the WTRU 102 may be informed of the power allocation used or applied for its PDSCH assignments (e.g., one, some or all of its PDSCH assignments). The eNB 160 may indicate to the WTRU 102 the one or more appropriate transmission power offsets (e.g., relative to the CRS transmission or related to the PDSCH 620 which may not collide with a UL channel) by, for example: (1) including a new element in the DL assignment DCI that may indicate the set of transmission power offsets, for example along with specific REs/PRBs/symbols where they (e.g., each) may have been or may be contemplated to have been used or applied; (2) a semi-static configuration of a set of transmission power offsets via and/or based on higher layer signaling; and/or (3) one or more predefined power offset levels according to and/or based on the UL channel that may collide (e.g., which may be part of a collision if not avoided). The power offset level may include 0 dB. For example, if a PDSCH resource is to collide with the PUSCH 680, a 0 dB power offset may be used or applied, while a x dB (where x>0) power offset may be used or applied, if the PDSCH resource is to collide with the PUCCH.

The transmission power offsets may be updated (e.g., by new transmission power offsets). In certain representative embodiments, an update of the transmission power offsets may be provided as a differential value from which the WTRU 102 may obtain new transmission power offsets by combining (e.g., arithmetically combining) the differential value with the previously configured transmission power offsets. In certain representative embodiments, an update procedure may include a single update loop or separate update loops maintained for every transmission power offset.

To determine when to use a set of multiple power offset values and on what resources, the WTRU 102 may be:
(1) configured with the specific REs/PRBs/symbols (e.g., where the power offset may be contemplated have been used or applied (the configuration may be included in a message (e.g., the same message) that configures the different power offsets and/or may be (e.g., always be) included in the DL assignment DCI);
(2) configured to determine (e.g., implicitly determine) that the reduced (e.g., assumed reduced) PDSCH power offset may be used or applied in REs/PRBs/symbols, for example pre-configured REs/PRBs/symbols and/or any REs/PRBs/symbols) that are to collide with appropriate UL signals to be transmitted by the WTRU 102 (e.g., that WTRU) in the same subframe (for example, the WTRU 102 may be configured to use or apply a set of power offsets in (e.g., only in) subframes in which the WTRU 102 has been granted UL resources (e.g., as well));
(3) configured with subsets of subframes in which different sets of transmission power offsets may be applicable or used (for example, in the non-FDR subframes, the WTRU 102 may determine, know, contemplate, assume, apply and/or use a first PDSCH transmission power offset (in certain representative embodiments, in FDR subframes, the WTRU 102 may determine, know, assume, apply and/or use a set of PDSCH transmission power offsets enabling unequal power allocation); and/or
(4) configured with multiple patterns of REs/PRBs/symbols in which different power offsets may be used or applied. The patterns may indicate which transmission power offsets may be tied to and/or may correspond with the REs/PRBs/symbols (each RE/PRB/symbol) of the DL assignment. The patterns may be contained in the DL assignment. In certain representative embodiments, such patterns may be pre-configured via higher layers. In certain representative embodiments multiple patterns may be pre-configured), among others.

When the WTRU 102 is pre-configured with one or more sets of power offsets and/or patterns of REs/PRBs/symbols (e.g., tied to the different power offsets), the WTRU 102 may determine the appropriate set of power offsets and/or one or more patterns of REs/PRBs/symbols by any one or more the following.
(1) One or more indication bits in the DL assignment indicating what pattern to use for the entire allocated bandwidth. For example, the patterns may cover single PRBs (or set of PRBs) and/or the DL assignment may indicate what pattern to use, apply and/or assume for the PRBs (e.g., every PRB and/or a set of PRBs) of the DL assignment, (e.g., via or by a bitmap).
(2) The RNTI, used for the DL assignment DCI, may be used to determine the set of power offsets and/or patterns of REs/PRBs/symbols. The WTRU 102 may be configured with a different RNTI depending on whether or not the subframe is an FDR subframe.
(3) The precoder, used for the PDSCH 620, may be used to determine the set of power offsets and/or patterns of REs/PRBs/symbols. The WTRU 102 may be preconfigured with distinct sets of precoders depending on whether or not the subframe is an FDR subframe.
(4) The bearer, associated with the PDSCH 620, may be used to determine the set of power offsets and/or patterns of REs/PRBs/symbols. For example, the bearers (e.g., each bearer) may have sets (e.g., their own set) of transmission power offsets.
(5) The contents of the PDSCH 620 may be used to determine the set of power offsets and/or patterns of REs/PRBs/symbols. For example, the PDSCH 620 assigned by the RNTI (e.g., that indicates it is used for SIBs or Paging) may use (e.g., always use) a certain set (e.g., a predefined set) of power offset values.
(6) The set of power offsets and/or patterns of REs/PRBs/symbols may be determined by whether the WTRU 102 has a UL grant in the same subframe. The set of power offsets and/or the pattern to be used, applied set and/or assumed may depend on whether the UL transmission of the WTRU 102 is a transmission or a retransmission of the PUSCH 680.

Representative RE Mapping of Code Blocks

A transport block in the PDSCH 620 may consist or include of one or more code blocks. In certain representative embodiments, the maximum code block size may be limited to 6144. If the input bit sequence length is larger than the maximum code block size (e.g., 6144), more than one code block may be used. The WTRU 102 may receive the PDSCH 620 containing or including more than one code block and one of the code blocks may have an error, the WTRU 102 may determine and/or may consider that the PDSCH reception is failed even though the reception of the other code blocks is successful.

In certain representative embodiments, when unequal power allocation is used or applied on different portions of a PDSCH allocation, one or some code blocks may be more affected than others. For example, some code blocks may be located in (e.g., fall entirely within) a lower power portion of the PDSCH 620. The code block most affected (e.g., the worst code block) may dominate the error events of the transport block error rate. In certain representative embodiments, the eNB 160 may use enhanced mapping of code blocks to ensure equal error protection over the code block (e.g., certain high priority code blocks or all code blocks). The enhanced mapping of code blocks may include one or more of following: (1) along with a pattern of REs/PRBs/symbols, the WTRU 102 may be configured with multiple code block mappings (e.g., these code block mappings may be independently configured or may be tied to each possible pattern of REs/PRBs/symbols); (2) the code block mapping may be semi-statically configured and ensure equal protection for any (e.g., any possible) unequal power allocation; and/or (3) an interleaver may be used to permute coded bit sequences, if multiple code blocks are used, among others.

Representative Link adaptation for Unequal Power Allocation

One or more modulation orders (e.g. QPSK, 16QAM, and 64QAM) may be used or applied according to the channel condition and the modulation used or applied for a PDSCH 620 may be indicated in a DCI associated with the PDSCH 620. If unequal power allocation is used or applied for the PDSCH 620 and a subset of REs/PRBs/symbols for the PDSCH 620 has a different power allocation than one or more other subsets of REs/PRBs/symbols for the PDSCH 620, one or more of following may apply: (1) the lowest modulation order (e.g. QPSK) for the PDSCH REs/PRBs/symbols having lower allocated power may be used or applied while the modulation order for the other PDSCH REs/PRBs/symbols having a higher allocated power may be indicated from the associated DCI; (2) the modulation order offset may be indicated from the associated DCI for the PDSCH REs/PRBs/symbols having a lower allocated power and the offset is from the modulation order indicated from the associated DCI for the other PDSCH REs/PRBs/symbols having higher allocated power; and/or (3) the modulation order for the PDSCH REs/PRBs/symbols having lower allocated power may be configured via higher layer signaling while the PDSCH REs/PRBs/symbols having higher allocated power may be indicated from the associated DCI for the PDSCH 620, among others.

In a TM (e.g., TM3, TM4, TM8, TM9 and/or TM10), one or more transmission ranks may be used or applied. For instance, rank-1 may denote that a single layer transmission is used or applied and rank-2 may denote that a two layer transmission is used or applied. The transmission rank (e.g. rank-1 or rank-2) may be indicated via the associated DCI for the PDSCH 620 in the TM supporting multiple layer transmission. If unequal power allocation is used or applied for a TM supporting multiple layer transmission, one or more of following may apply: (1) a fixed rank may be used for the PDSCH REs/PRBs/symbols having a lower allocated power and the rank may be implicitly or explicitly indicated from the associated DCT (for instance, rank-1 may be used (e.g., always used) for the PDSCH REs/PRBs/symbols having the lower allocated power. The rank may be implicitly indicated by the precoder information, and/or explicitly indicated as the number of layers. For example, if the fixed rank is used and the rank is smaller than the rank for the PDSCH REs/PRBs/symbols having a higher allocated power, the first n columns of the precoder indicated from the associated DCI may be used or applied where n may be a integer greater than 0 and may be the same as the fixed rank used; and/or (2) an offset may be used or applied to indicate the rank for the PDSCH REs/PRBs/symbols having a lower allocated power and the offset may be set or established from the rank used for the PDSCH REs/PRBs/symbols having the higher allocated power.

Representative Combination of Unequal Power Allocation and Puncturing/Rate Matching In certain representative embodiments, the eNB 160 may use a combination of unequal power allocation and puncturing/rate matching. For example, to achieve this combination, the WTRU 102 may be configured with a value of transmission power offset that is interpreted or determined to define (and/or mean) that no PDSCH 620 is transmitted in the associated resources. For example, a power offset value greater than x dB may be configured to indicate to the WTRU 102 that puncturing/rate matching is used or applied on those corresponding or associated resources.

Representative WTRU CSI Feedback

In certain representative embodiments, the WTRU 102 may feedback CSI differently when using unequal power allocation. For the WTRU 102 configured with multiple sets of power offsets and/or patterns of the REs/PRBs/symbols, the WTRU 102 may measure CSI with an assumption on or knowledge of the possible power offset set and/or pattern of the REs/PRBs/symbols. For example, the possible power offsets and/or patterns may be predefined, dynamically established and/or established via higher layer signaling. In certain representative embodiments, the WTRU 102 may explicitly indicate to the eNB 160 the set of offsets and/or pattern for which a feedback report is valid. In certain representative embodiments, the WTRU 102 may assume, determine or know a set of offsets and/or pattern based on the subframe within which a feedback report is transmitted. In certain representative embodiments, some values of RI, PMI, CQI and/or Procedure Transaction Identifier (PTI) may be pre-configured to be tied to (correspond to) sets of power offsets and/or to one or more patterns. Feeding back such values may implicitly indicate to the eNB 160 the determinations/assumptions that the WTRU 102 has made for the transmitted feedback reports. In certain representative embodiments, the CSI (e.g., each CSI) process may be configured with a specific set of power offsets and/or the pattern of the REs/PRBs/symbols tied to (e.g., associated with) the power offsets. For aperiodic feedback, the eNB 160 may indicate in the aperiodic CSI feedback request the set of power offsets and/or the pattern to be applied, used, set or assumed for the CSI measurements.

Representative UL Power Control Based DL Channel Collision

A first WTRU 102 operating in an FDR subframe may have poor reception capabilities due to and/or suffering from SINTF and/or interference from one or more nearby WTRUs 102 transmitting in the same band, as the band of first WTRUs 102 used for DL reception. For example, to reduced SINTF, the first WTRU 102 may be configured to operate with unequal power control for different UL transmissions. The unequal UL power control may, for example, limit SINTF when UL transmissions arc to collide with specific DL channels.

The eNB 160 may determine that the procedure (e.g., best or optimum way) to mitigate the SINTF at the WTRU 102 is to increase the DL power for some REs/PRBs/symbols and/or channels.

It is contemplated that although the procedures arc generally described with reference to the WTRU, the procedures may be applicable to the eNB 160, as well. For example the eNB 160 may reuse any of the procedure and/or methods for unequal DL power allocation.

Representative Unequal Power Control for PUSCH

In certain representative embodiments, PUSCH power control may be applicable to the UL DM-RS. The PUSCH 680 may collide with different DL channels and signals, such as the CRS, the CSI-RS, the DL DM-RS 640, the PRS, the PSS/SSS, the PBCH, the EPDCCH, the PDCCH, the PHICH, and/or the PCFICH. The SINTF from some collisions may be alleviated by using unequal power control over different PRBs (for example the PSS/SSS and/or the PBCH). Other collisions may use and/or may require using unequal power control in or within a PRB (for example the CRS, the CSI-RS and/or the DM-RS). Other collisions may use or may require using unequal power control over entire SC-FDMA symbols (for example in the PDCCH 610).

In representative procedures and/or methods, similar to those described herein, unequal DL power allocation may be used or applied to provide the WTRU 102 with patterns of REs/PRBs/symbols with different power control. For UL power control, the WTRU 102 may maintain separate loops for the PUCCH and the PUSCH 680. In unequal power control, the WTRU 102 may maintain multiple loops per UL channel. For example, the WTRU 102 may split the REs of the PUSCH 680 into multiple groups (e.g., two groups) with a first group having a SINTF that may not be detrimental (e.g., may not be overly detrimental, for example, less than a threshold) and a second group having SINTF that may be damaging to the proper reception of the DL transmissions (e.g., may be greater than the threshold). The power control loop (e.g., each power control loop) may be associated to a set of REs/PRBs/symbols in which the PUSCH 680 is transmitted. The group (e.g., each group) of REs may have a TPC command (e.g., their own TPC command) to update the power control. When providing the WTRU 102 with the TPC command, the eNB 160 may indicate for which loop the TCP command is for by one of: (1) an explicit indication tied to or associated with the TPC commands (e.g., a subset or all the TPC commands) included in the DCT used for UL grant (for example, TPC commands (e.g., all TPC commands) may be (e.g., always be) included in a UL grant DCI and/or the TPC commands may be indexed and/or ordered); (2) a subframe pattern by which a TPC command included in a first set of subframes is intended for a first power loop, whereas a TPC command included in a second set of subframes is intended for a second power loop and so on; and/or (3) a TPC-RNTI for power control loop (e.g., each power control loop), among others.

Representative Use of Multiple Power Offsets

In certain representative embodiments, multiple regions of the PUSCH 680, in which different UL power allocation may be used or applied, may employ the same TPC command. In certain representative embodiments, different transmission power offsets may be used or applied for certain regions, for individual regions and/or for each region. For example, the PUSCH 680 transmitted on REs that may collide with the DL CRS 630 in the DL may use a first UL transmission power offset, and the PUSCH 680 transmitted on the REs that may collide with the CSI-RS may use a second power offset, and so on for other regions.

In certain representative embodiments, the different transmission power offsets may be configured semi-statically via higher layer signaling. At each configuration, the WTRU 102 may be provided a list of transmission power offsets for the regions (e.g., a subset of the regions or every region). In certain representative procedures, the WTRU 102 may be configured with different transmission power offsets for each of the regions in the appropriate patterns (e.g., each possible pattern) of REs/PRBs/symbols that may be used or applied for UL transmissions.

In certain representative embodiments, the WTRU 102 may be configured with a first absolute transmission power offset and the other transmission power offsets (some or all of the other transmission power offsets) may be differential to the first value.

Representative Configuration of Different Power Control

The WTRU 102 may be configured to use different power control loops and/or offsets and/or $P_{CMAX}$ values for different RE/PRB/symbol regions based on or by any one or more of the following.

(1) An indication in the UL grant may inform the WTRU 102 or indicate to the WTRU 102 of the pattern of power control and/or any relevant input to be used or applied to determine the appropriate power control for the regions (e.g., each region).

(2) A type of subframe, for which the UL grant. For example, subframes configured for MBSFN, for Almost Blank Subframe (ABS) and/or for FDR in the DL may use or may require different unequal power control than non-MBSFN, non-ABS and/or non-FDR subframes.

(3) A type of UL channel and/or a format (e.g., a DCI format or other format). For example, different PUCCH formats may use different power control loops, power offsets and/or $P_{CMAX}$ values, among others.

(4) Whether a certain type of protection is used or applied in a subframe (e.g., elsewhere in the subframe). For example, if the WTRU 102 uses reduced UL transmission power in a symbol to protect the reception of a channel (e.g. the PDCCH 610), the WTRU 102 may use or apply a specific power control loop, offset and/or $P_{CMAX}$ in the remaining symbols of the subframe to ensure adequate Peak-to-Average Power Ratio (PAPR). In certain representative embodiments, upon allocating power to appropriate (e.g., all appropriate) regions of its UL transmission, the WTRU 102 may use filtering to limit the PAPR. The use of the filtering may be indicated to the eNB 160.

(5) Higher layer signaling for the semi-static configuration of the unequal power control (for example, whether a UL transmission is a new transport block or a retransmission).

Representative SINTF Handling

Representative FDSC Usage and Potential for FDSC Interference

Certain subframes may be configured for FDSC operation. For example, the WTRU 102 may be configured or informed by the eNB 160, for example via signaling that certain subframes may be used or applied for FDSC operation. The signaling may be at least one of: (1) higher layer signaling such as RRC signaling, (2) MAC layer signaling and/or (3) physical layer signaling.

In certain examples, the WTRU 102 may be configured (e.g., may receive configuration information) via signaling such as RRC signaling as to which subframes may be considered for (e.g., have potential for) use for FDSC (e.g., FDSC operation). The WTRU 102 may be (or may be further) configured via signaling (e.g., other signaling) such as physical layer signaling as to which subframe or subset of those subframes may be used or applied at a certain time or during a certain time window for FDSC (e.g., FDSC operation) and/or specifically for FDSC (e.g., FDSC operation) by the WTRU 102.

In certain examples, a TDD cell may be configured with a TDD UL-DL configuration, for example TDD UL-DL configuration 1 from Table 1 as follows:

| D | S | U | U | D | D | S | U | U | D |

This TDD UL-DL configuration may be a cell-specific TDD configuration of the cell which may be broadcast or otherwise signaled by the eNB 160 and may be received by the WTRU 102 in the cell.

The TDD LTE WTRU 102 may receive (e.g., from the eNB 160) a configuration (e.g., a FDSC configuration) which may identify certain subframes, for example subframes 3 and 8, as potential FDSC subframes:

| D | S | U | F | D | D | S | U | F | D |

This configuration (e.g., the FDSC configuration) may be provided by dedicated or WTRU specific signaling such as RRC signaling. The WTRU 102 may take certain steps or actions and/or behave in certain ways which may include and/or may have an intent of handling interference or potential interference related to FDSC in or for a certain subframe or subframes based on the configuration from the eNB 160, which may indicate that those subframes (e.g., subframes 3 and 8, in the example) may be potential FDSC subframes.

For the WTRU 102 which may support FD operation, SINTF may be interference from a transmission by the WTRU 102 to the reception by the WTRU 102 (for example the interference of a UL transmission from the WTRU 102 to the DL reception by the WTRU 102). Such interference may or may only occur when the WTRU 102 transmits and receives simultaneously in a FDSC.

The WTRU 102 may experience or expect (or only expect) SINTF in potential FDSC subframes (e.g., 3 and/or 8 in the example), if the WTRU 102 is scheduled for both the UL and the DL in the FDSC in those subframes. The FDSC interference from a neighbor WTRU 102 may (or may only) occur if the WTRU 102 and a neighbor arc scheduled in opposite directions in the FDSC in those subframes.

In a given subframe which may be used for FDSC (e.g., subframes 3 and 8 in the example), the eNB 160 may or may not schedule both the UL and the DL in the given subframe. When the eNB 160 schedules one WTRU 102 for FD operation in the given subframe, SINTF at the WTRU 102 may occur. When the eNB 160 schedules different WTRUs 102 in opposite directions in the given subframe in the FDSC, neighbor WTRU interference may occur depending on the relative locations of the WTRUs 102.

The WTRU 102 handling of SINTF and/or neighbor WTRU interference may be (or may only be) used (or may only be necessary) in the subframes in which the eNB 160 actually schedules the WTRU 102 or other WTRUs 102 in opposite directions (e.g., in the UL and the DL directions).

The WTRU 102 may take certain steps or actions and/or behave in certain ways which may include and/or may have an intent of handling interference or potential interference related to the FDSC in or for a certain subframe or subframes, if the WTRU 102 knows, determines and/or understands that the eNB 160 intends or may intend to use the subframe or subframes for the WTRU 102 in both the UL and the DL and/or the WTRU 102 and at least one other WTRU 102 in opposite directions.

The eNB 160 may inform or indicate to the WTRU 102 directly or indirectly as to whether a certain subframe may be used or applied for the WTRU 102 for FD operation and/or for the WTRU 102 and another WTRU 102 in opposite directions, for example, for the WTRU 102 to know whether and/or what type or types of interference handling may be used, needed, required, and/or useful in a subframe such as a current subframe and/or an upcoming subframe.

The WTRU 102 may receive such information via signaling such as physical layer signaling (and/or another type of signaling such as RRC and/or MAC signaling).

Representative Determination of SINTF and/or NINTF Subframe

A SINTF subframe may be used herein to represent a subframe in which SINTF may occur and/or a subframe in which a WTRU 102 may transmit and receive (e.g., simultaneously, concurrently, and/or at the same time) in a FDSC.

A NINTF subframe may be used herein to represent a subframe in which neighbor WTRU interference may occur and/or a subframe in which a WTRU 102 and at least one other WTRU 102 may (e.g., simultaneously, concurrently, and/or at the same time) use an FDSC in opposite directions.

In the description herein, simultaneous transmission in the UL and the DL may refer to simultaneous transmission in the UL and the DL in a FDSC. In the descriptions herein, transmission in opposite directions may refer to transmissions in opposite directions (e.g., with the UL being a first direction and the DL being a second, opposite direction) in the FDSC. Simultaneous transmissions may mean transmissions which are fully or partially overlapped in time.

The WTRU 102 may determine that a current or upcoming subframe may be or may potentially be a SINTF subframe and/or a NINTF subframe based on at least one of the following.

(1) The determination may be based on whether the subframe is configured or otherwise identified as an FDSC subframe. For example, the WTRU 102 may determine that a subframe may be or may have potential for being a SINTF subframe and/or a NINTF subframe, if the subframe may be or may have been configured or otherwise identified as a FDSC or potential FDSC subframe. In another example, the WTRU 102 may determine that a subframe may not be or may not have potential for being a SINTF subframe and/or a NINTF subframe, if the subframe may not be or may not have been configured or otherwise identified as a FDSC or potential FDSC subframe.

(2) The determination may be based on whether the WTRU 102 may have a UL grant or UL allocation for the subframe. For example, if the WTRU 102 has a UL grant (e.g., a PUSCH grant) or UL allocation (e.g., for a PUSCH 680 via SPS or a PUSCH retransmission, a PUCCH, and/or an SRS) for a certain subframe, the subframe may be or may have potential for being a SINTF subframe for the WTRU 102. In a second example, if the WTRU 102 does not have a UL grant or UL allocation for a certain subframe, the subframe may not be or may not have potential for being a SINTF subframe for the WTRU 102 and the WTRU 102 may determine that the subframe may not be a SINTF subframe. In a third example, the WTRU 102 may determine that a subframe may be or may have potential to be a SINTF subframe, if (e.g., only if) the WTRU 102 may have a UL grant or a UL allocation for the subframe of a certain type or types which may include one or more of a PUSCH grant or allocation, a PUCCH allocation, and/or an SRS allocation, among others. The UL grant or allocation may be provided in accordance with ordinary LTE (e.g., LTE TDD) scheduling and HARQ timing rules.

(3) The determination may be based on at least one of the time, the frequency, the RBs, and/or the REs of a UL grant or of a UL allocation for the subframe and/or at least one of the time, the frequency, the RBs, and/or the REs of a DL allocation for the subframe. For example, if the WTRU 102 has the UL grant and the DL grant with overlapping RBs and/or RBs which may be within a certain frequency separation of each other in a certain subframe, the subframe may be or may have potential for being a SINTF subframe for the WTRU 102.

(4) The determination may be based on whether the WTRU 102 may transmit or may intend to transmit in the subframe and/or has something to transmit in the subframe for example, data, control information such as the UCI, the RS such as the SRS, among others. For example, the WTRU 102 may determine that a subframe may be or may have potential for being a SINTF subframe if the WTRU 102 has a UL allocation (e.g., a PUSCH grant or allocation) in the subframe and something (e.g., data and/or UCI) to transmit in the allocation.

(5) The determination may be based on whether the WTRU 102 may be configured for both UL and DL in a same subframe according to one or more SPS configurations. For example, if the WTRU 102 is configured for both the UL and the DL in a same subframe according to one or more SPS configurations, the WTRU 102 may determine that the subframe may be a SINTF subframe or a potential SINTF subframe. In a second example, if the WTRU 102 is configured for both the UL and the DL in a same subframe according to one or more SPS configurations and the WTRU 102 may have something (e.g., data and/or UCI) to transmit in the subframe, the WTRU 102 may determine that the subframe is or may be a SINTF subframe or a potential SINTF subframe.

(6) The determination may be based on whether the WTRU 102 may receive a DL allocation, for example via PDCCH 610 (or EPDCCH), for the subframe. For example, based on reception of the PDCCH 610 (or EPDCCH) in a given subframe, the WTRU 102 may receive a DL resource allocation for the given subframe. If the WTRU 102 has a UL grant or other UL allocation (e.g., for a PUSCH 680 scheduled by SPS, a PUSCH retransmission, a PUCCH, and/or a SRS) for the subframe, the WTRU 102 may determine that the subframe may be or may have potential to be a SINTF subframe (for example, based on the existence of the DL allocation and the UL grant or allocation for the subframe and/or certain aspects of the DL allocation and/or the UL grant or allocation such as at least one of the time, the frequency, the RBs, and/or the REs of the allocated resources). The determination of a SINTF subframe based on a received PDCCH 610 (or EPDCCH) may (or may only) be possible or useful for example: (i) if the WTRU 102 handles or intends to handle the SINTF before beginning the UL transmission; (ii) if the WTRU 102 has time to decode or attempt to decode the PDCCH 610 before the UL transmission may begin; and/or (iii) if the UL transmission occurs later in the subframe such as for the SRS, among others. In certain examples, if the subframe is one in which the UL transmission (e.g., such as the PUSCH 680 or the PUCCH) may be adjusted to begin after the PDCCH region (or potential PDCCH region) (e.g., a FDSC or potential FDSC subframe), the WTRU 102 may have sufficient time (e.g., enough time) to decode or attempt to decode the PDCCH 610 to determine whether the WTRU 102 may have a DL allocation in the subframe prior to transmitting in the UL. Beginning the UL transmission in a subframe after the PDCCH region in that subframe may enable the WTRU 102 to determine if the subframe may be a SINTF subframe prior to the UL transmission. In other examples, based on reception of the PDCCH 610 in a particular subframe, the WTRU 102 may receive a DL resource allocation for the subframe. The WTRU 102 may determine that the subframe may be or may have potential to be a NINTF subframe (for example, based on the existence of the DL allocation and/or certain properties, characteristics and/or aspects of the DL allocation, such as at least one of the time, the frequency, the RBs, and the REs of the allocated resources. In further examples, if the WTRU 102 does not receive the DL resource allocation (for example via the PDCCH 610) for a given subframe such as a potential FDSC subframe, and/or if the WTRU 102 does not have a DL SPS allocation for the subframe, the WTRU 102 may determine that the subframe may not be or may not have potential to be a SINTF subframe and/or a NINTF subframe. It is contemplated that in certain representative embodiments, the EPDCCH may be substituted for the PDCCH 610 herein. If the EPDCCH may not be fully decoded by the WTRU 102 in a subframe before the WTRU 102 may begin UL transmission in the subframe, the WTRU 102 may use (or may only use, e.g., with respect to SINTF and NINTF determination) a DL allocation provided by the EPDCCH for a determination of whether the subframe may be a SINTF subframe as it relates to DL reception and/or a determination of whether the subframe may be a NINTF subframe.

(7) The determination may be based on whether the WTRU 102 may receive or expect to receive a DL channel which may not be explicitly granted or allocated by the PDCCH 610 (e.g., the PHICH). For example the WTRU 102 may determine that a subframe may be or may have the potential to be a SINTF if the WTRU 102 may be expecting (e.g., in the subframe) and/or may be configured to receive the PHICH, for example from the eNB 160 based on a previous UL transmission.

(8) The determination may be based on an indication, for example an explicit indication, by the eNB 160 that a current or future subframe may be used for simultaneous FDSC UL transmission and DL reception by the (e.g., a first) WTRU 102 or the (e.g., the first) WTRU 102 and at least one other (e.g., a second) WTRU 102.

For example, the WTRU 102 may receive a UL grant in subframe n (e.g., where n is a non-negative integer) which may allocate resources for the UL transmission for the WTRU 102 in subframe n+k (e.g., k>=0). Along with or separate from the UL grant, the WTRU 102 may receive an indication (e.g., one or more bits in a DCI format) which may indicate to the WTRU 102 to consider (and/or determine) subframe n+k to be a SINTF subframe and/or a NINTF subframe.

In other examples, the WTRU 102 may receive the UL grant in subframe n (e.g., where n is a non-negative integer) which may allocate resources for UL transmission for the WTRU 102 in subframe n+k (e.g., k>=0). Separate from or along with the UL grant, the WTRU 102 may receive the indication (e.g., one or more bits in a DCI format) which may indicate to the WTRU 102 that the eNB 160 may or may intend to schedule (and/or configure) the WTRU 102 for FD operation (e.g., for DL and UL in the FDSC) in subframe n+k. The WTRU 102 may, for example as a result of the indication, consider and/or determine subframe n+k, as a SINTF subframe.

In further examples, the WTRU 102 may receive the UL grant in subframe n (e.g., where n is a non-negative integer) which may allocate resources for the UL transmission for the WTRU 102 in subframe n+k (e.g., k>=0). Separate from or along with the UL grant, the WTRU 102 may receive the indication (e.g., one or more bits in a DCI format) which may indicate to the WTRU 102 that the eNB 160 may or may intend to schedule (and/or configure) FD operation where another WTRU 102 may be scheduled (and/or configured) in the DL (or may have an allocation in the DL) in the FDSC in subframe n+k. The WTRU 102 may, for example as a result of the indication, consider and/or determine that subframe n+k is a NINTF subframe. The WTRU UL transmission may potentially interfere with the DL reception by the other WTRU.

In additional examples, the WTRU 102 may receive the indication via the PDCCH 610 or the EPDCCH (e.g., one or more bits in a DCI format) which may indicate to the WTRU 102 to consider and/or determine that a current or future subframe may be a SINTF subframe and/or a NINTF subframe.

In still further examples, the WTRU 102 may receive the indication via the PDCCH 610 or the EPDCCH (e.g., one or more bits in a DCI format) which may indicate to the WTRU 102 that in the current subframe (e.g., the subframe in which the PDCCH 610 or the EPDCCH may be transmitted by the eNB 160 and/or received by the WTRU 102) the eNB 160 may or may intend to schedule and/or configure the WTRU 102 for the DL and another WTRU 102 for UL in the FDSC and/or vice versa. The WTRU 102 may, for example as a result of the indication, consider and/or determine that the current subframe may be a NINTF subframe.

In certain representative embodiments, parameters and/or other information may be included in the DCI format to assist the WTRU 102 in handling the SINTF and/or the NINTF.

In still other examples, the WTRU 102 may receive the DL grant in subframe n (e.g., where n is a non-negative integer) which may result in a PUCCH allocation for the WTRU 102 and/or a PUCCH transmission by the WTRU 102 in subframe n+k (e.g., k>=0). Separate from or along with the DL grant, the WTRU 102 may receive the indication (e.g., one or more bits in a DCI format) which may indicate to the WTRU 102 to consider and/or determine subframe n+k, as a SINTF subframe and/or a NINTF subframe.

The WTRU 102 may receive the indication (e.g., one or more bits in a DCI format) which may indicate to the WTRU 102 that the eNB 160 may or may intend to schedule and/or configure the WTRU 102 for FD operation (e.g., for DL and UL in the FDSC) in subframe n+k. The WTRU 102 may, for example as a result of this indication, consider and/or determine that subframe n+k may be a SINTF subframe.

The WTRU 102 may receive the indication (e.g., one or more bits in a DCI format) which may indicate to the WTRU 102 that the eNB 160 may or may intend to schedule the FD operation where another WTRU 102 may be scheduled in the DL in the FDSC in subframe n+k. The WTRU 102 may (for example as a result of this indication) consider and/or determine that subframe n+k may be a NINTF subframe. The WTRU UL may potentially interfere with the other WTRU DL.

In other examples, the WTRU 102 may receive the indication, for example via the PDCCH 610 or the EPDCCH (e.g., one or more bits in a DCI format) in subframe n (e.g., where n is a non-negative integer), which may indicate to the WTRU 102 to consider and/or determine that a certain future or upcoming subframe or subframes may be SINTF subframes and/or NINTF subframes. The WTRU 102 may (for example as a result of this indication) consider and/or determine those subframes to be SINTF subframes and/or NINTF subframes.

In further examples, the WTRU 102 may receive the indication via the PDCCH 610 or the EPDCCH (e.g., one or more bits in a DCI format) periodically, aperiodically and/or in a certain subframe or subframes (e.g., subframe 0 of every N frames) which may indicate to the WTRU 102 to consider and/or determine that a certain future or upcoming subframe or subframes (e.g., the FDSC subframes, such as subframe 3 and/or subframe 8 in an example, in the N frames) as SINTF subframes and/or NINTF subframes. The WTRU 102 may (for example as a result of this indication) consider and/or determine those subframes to be SINTF subframes and/or NINTF subframes.

One of ordinary skill in the art understands that in the various examples and embodiments described herein, the relationship between n and n+k may be in accordance with LTE (e.g., LTE TDD) scheduling and/or HARQ timing rules for the UL and/or DL.

Although various representative embodiments have been described with regard to certain subframe attributes, channels and indications, certain representative embodiments may include allocations and/or indications for other channels (e.g., any other channel) and/or transmissions which may include, but may not be limited to, periodic or aperiodic SRS, PUCCH which may carry periodic or aperiodic CSI, and the like.

Figure 21:
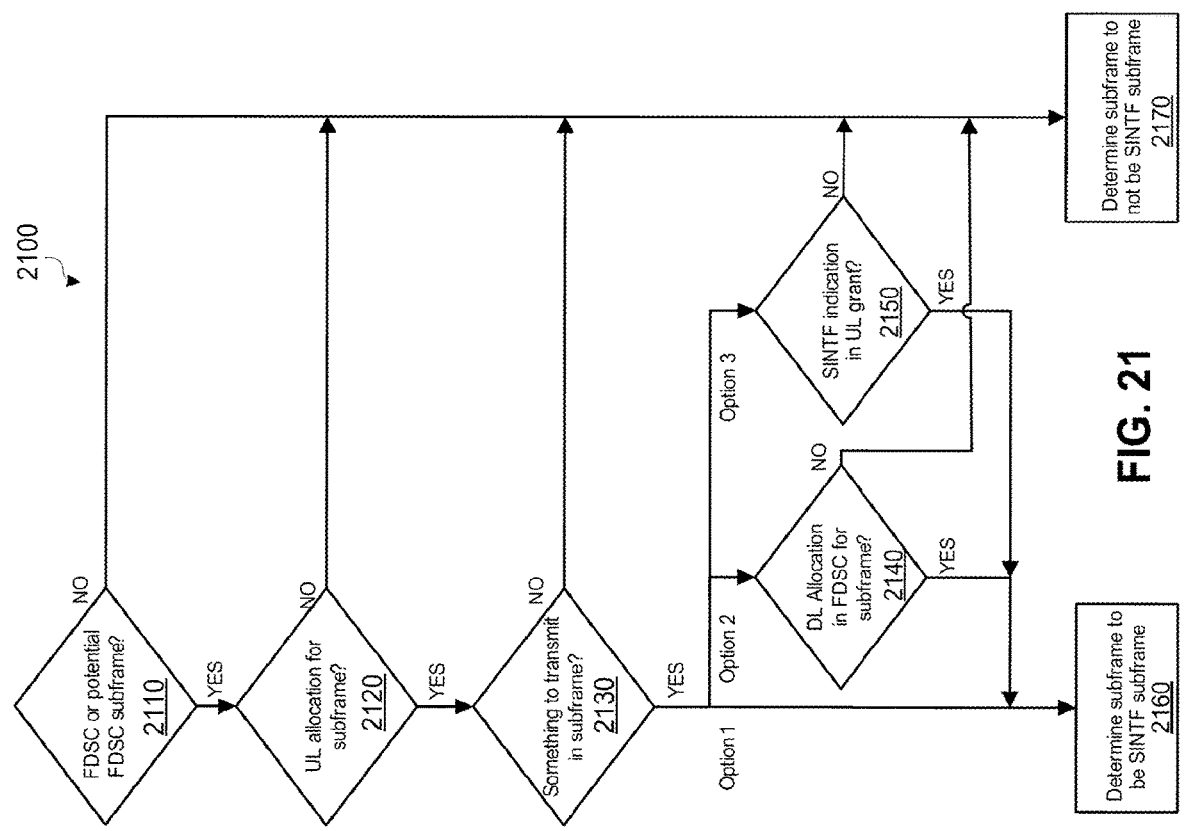
FIG. 21 is a flow chart illustrating a representative procedure for determining whether a subframe is a self-interference (SINTF) subframe.

FIG. 21 is a flow chart illustrating a representative procedure for determining whether a subframe is a SINTF subframe.

Referring to FIG. 21, flow chart 2100 may include, at block 2110, that a determination is made as to whether a subframe is a FDSC subframe or potential FDSC subframe. If it is determined at block 2110 that the subframe is not a FDSC subframe or potential FDSC subframe, processing moves to block 2170. If it is determined at block 2110 that the subframe is a FDSC subframe or potential FDSC subframe, at block 2120, it is determined whether there is a UL allocation for the subframe. If it is determined at block 2120 that there is not a UL allocation for the subframe, processing moves to block 2170. If it is determined at block 2120 that there is a UL allocation for the subframe, at block 2130 it is determined whether there is something to transmit in the subframe. If it is determined at block 2130 that there is not something to transmit in the subframe, processing moves to block 2170. If it is determined at block 2130 that there is something to transmit in the subframe, the processing may optionally move to any one of blocks 2140, 2150 or 2160. At block 2140, it is determined whether there is a DL allocation in the FDSC for the subframe. If it is determined at block 2140 that there is not a DL allocation in the FDSC for the subframe, processing moves to block 2170. If it is determined at block 2140 that there is a DL allocation in the FDSC for the subframe, processing moves to block 2160. At block 2150, it is determined whether there is a SINTF indication in the UL grant associated with the subframe. If it is determined at block 2150 that there is not a SINTF indication in the UL grant associated with the subframe, processing moves to block 2170. If it is determined at block 2150 that there is a SINTF indication in the UL grant associated with the subframe, processing moves to block 2160. At block 2160, it is determined that the subframe may be a SINTF subframe. At block 2170, it is determined that the subframe may not be a SINTF subframe.

Although blocks 2140 and 2150 are shown as parallel procedures, they may be accomplished serially in either order. For example, the presence of the SINTF indication may be determined and if an indicator is not present in the UL grant then whether there is a DL allocation in the FDSC for the subframe may be determined. For example, if the SINTF indication is determined to be present and/or if a DL allocation in the FDSC for the subframe is present, the processing may move to block 2160 where the subframe may be determined to be a SINTF subframe and otherwise, processing may move to block 2170 where the subframe may be determined to not be a SINTF subframe.

Representative WTRU Behavior for SINTF and/or NINTF Subframe

If the WTRU 102 determines that a certain subframe may be a SINTF subframe and/or a NINTF subframe, the WTRU 102 may behave in certain ways (e.g., perform certain procedures) so as to handle or attempt to handle the SINTF and/or the NINTF which may (or may potentially) occur or may (or may potentially) be present in the subframe. For example, the WTRU 102 may determine whether to reduce, and/or may reduce, its transmission power to reduce or attempt to reduce interference (e.g., to satisfy certain interference limits) in the subframe. As another example, the WTRU 102 may have or may determine a SINTF level (SIL) and/or a supportable SIL and if the SIL exceeds the supportable SIL (e.g., in the SINTF subframe), the WTRU 102 may take action to reduce the STL in the subframe. In certain representative embodiments, the WTRU 102 may ensure its transmission power does not exceed an allowed limit in the SINTF subframe and/or the NINTF subframe.

Representative Supportable SINTF Level (SIL)

The WTRU 102 may be able to support a FDSC (e.g., configured for FD operations), or FD operation in a FDSC, with up to a certain SINTF level (SIL) based on, for example, the implementation, operation and/or type of the WTRU 102. The supportable SIL or the WTRU's supportable SIL, for example for the FDSC, may be a function of (and/or may be determined by the WTRU 102 based on or as a function of) at least one of: (1) the FDSC carrier frequency of transmission and/or reception; (2) the actual frequency of transmission and/or reception (e.g., in the FDSC); (3) the number and/or frequency location of the RBs which may be allocated for the UL and/or the DL (for example at a certain time or time window such as in a subframe, a TTI, and/or a frame, among others); (4) the number and/or frequency location of the RBs of the transmission and/or reception (for example at a certain time or time window such as in a subframe, a TTT, and/or a frame, among others); (5) the properties of the FDSC such as the size of the gap (e.g., the frequency gap and/or the RB gap) between the Tx and Rx of the FDSC or the amount of overlap (e.g., the frequency and/or RB overlap) between the Tx and Rx of the FDSC; (6) the relative frequency location of the RBs and/or the REs of the WTRU 102 transmission and/or the RBs and/or REs of the WTRU reception; (7) the relative frequency location of the RBs and/or the REs which may be allocated for WTRU 102 transmission and/or the RBs and/or the REs, which may be allocated for WTRU 102 reception; (8) the number of WTRU antennas being used or applied for transmission and/or reception; (9) eNB transmission parameters such as the CRS power level, the DM-RS power level, and/or other RS power levels, among others; (10) Pathloss; (11) the channel type and/or types of the transmission and/or reception (e.g., the PUSCH 680, the PUCCH, the PDCCH 610, the EPDCCH, and/or the PDSCH 620, among others); (12) the type of RS (e.g., the CRS 630 and/or DM-RS) that may be used by or applied for the UL transmission and/or the DL reception; (13) internal coupling loss of the WTRU 102 (e.g. the ability of the WTRU 102 by analog or digital means and/or procedures to reduce the interference, which may result, for example, from its transmission signal leaking into its receiver (e.g., receiver circuitry); (14) the UL MCS and/or TBS to be used or applied; and/or (15) quality criterion attached to a transmission (e.g., the DL transmission and/or the UL transmission) (for example, a DL transmission may have a QoS (e.g., a required QoS)), among others.

In certain embodiments, the WTRU's supportable SIL may be its maximum supportable SIL, for example in the case of the FD operation. For example, the WTRU's supportable SIL may be or may correspond to a supportable (or maximum supportable) UL power level (e.g., when using FD operation). For a determination of SIL or supportable SIL, the UL power level may be used herein as a non-limiting example measure, which may be or may correspond to the SIL. UL power and UL power level may be used interchangeably.

Although SIL is illustrated herein with regard to UL power level, other measures or representation of SIL or supportable SIL may be implemented including maximum UL power level, actual UL power level, signal-to-interference ratio and/or bit error rates associated with the one or more FDR.

Although subframes are illustrated herein as an example of a certain time or time window, it is contemplated that any other time or time window may be used for example, a portion of a subframe and/or multiple subframes, among others.

Representative Determination and Reporting of SIL and Supportable SIL

The WTRU 102 may determine the (e.g., its) SIL and/or the (e.g., its) supportable SIL, for example for a time (e.g., in a subframe and/or other time or time window) in which the WTRU 102 may transmit and receive simultaneously and/or concurrently and/or at the same time in an FDSC channel. The supportable SIL may or may not be subframe, time, and/or time window dependent.

In certain examples, the WTRU 102 may determine a maximum supportable UL power for which the WTRU 102 may support FD operation, which may be referred to as a maximum FDSC UL power. The maximum FDSC UL power may correspond (e.g., by a look-up table or other relationship) to a supportable SIL.

The WTRU 102 may determine the maximum FDSC UL power for a channel or a group of channels, for example of a serving cell (e.g., the power associated with or for any of the PUSCH 680 and/or the PUCCH including the combined PUSCH and PUCCH power).

The WTRU 102 may determine the maximum FDSC UL power, which may be based on at least one or more characteristics of the FDSC channel and/or at least one of the characteristics or criteria that supportable SIL may be a function of as described earlier herein.

The WTRU 102 may determine the maximum FDSC UL power for a given time or time interval (e.g., a given subframe and/or other time or time window), which may be based on: (1) one or more characteristics of the FDSC channel; and/or (2) one or more characteristics of the WTRU 102 transmit signal and/or receive signal (e.g., in the given subframe and/or other time or time window).

The WTRU 102 may determine the maximum FDSC UL power for a given subframe and/or other time or time window, which may be based on an applicable parameter of or associated with a DL assignment. For example, the applicable parameters of the DL assignment that may affect the maximum UL power may include at least one of: (1) the RB allocation of the DL assignment; (2) the MCS level and/or TBS; (3) the number of layers used or applied for DL transmission; (4) the precoder used or applied for the DL transmission; (5) the number of ports (e.g., antenna ports) used or applied for the DL transmission; (6) the HARQ process number; (7) whether the DL assignment is for new data or for a retransmission; and/or (8) the TM, among others.

The WTRU 102 may determine the UL power for transmission on a serving cell and/or on the WTRU 102 as a whole (e.g., as a single combined value or single power level) and may relate the UL power to a SIL such as an SIL in that subframe.

Representative Supportable SIL Capability

A WTRU, such as one of a certain type, class and/or compliant with a certain standards release, such as a 3GPP LTE standards release, may or may be required to support at least a certain, e.g., certain minimum, SIL.

The WTRU 102 may send a message or report to the eNB 160 which may indicate or include the SIL and/or the supportable SIL (e.g., of the WTRU 102). The WTRU 102 may send such a message and/or report using or in higher layer signaling such as RRC or MAC layer signaling and/or using or in physical layer signaling.

The WTRU 102 may indicate its capability to support FDSC (e.g., FD operations), for example to the eNB 160. The WTRU 102 may provide the indication using or in higher layer signaling such as in a capability message. The indication of the ability to support FDSC (e.g., FD operations) may imply that the WTRU 102 may support at least a certain (e.g., certain minimum) SIL or supportable SIL. The WTRU 102 may provide the indication of its supportable STL, for example to the eNB 160, which may be in the form of one or more supportable power levels.

Representative WTRU Reporting of SIL and Supportable SIL

The WTRU 102 may report or otherwise indicate its SIL (and/or supportable SIL) to the eNB 160 via higher layer signaling such as RRC or MAC layer signaling or via physical layer signaling.

The WTRU 102 may provide the report (and/or indication) periodically (e.g., based on a schedule provided by the eNB 160) or aperiodically (or on-demand) (e.g., based on a trigger such as a physical layer trigger, from the eNB 160, which may be provided in a DCI format).

The WTRU 102 may provide the report in certain subframes such as the FDSC subframes, the SINTF subframes, and/or the NINTF subframes (e.g., every one of these subframes) in which the WTRU 102 may transmit in the UL, for example if configured to so transmit the report by the eNB 160.

There may be a direct relationship between the subframe in which a trigger may be received and the subframe in which a SIL or supportable SIL may be reported. The relationship may be such that if the trigger is received by the WTRU 102 in subframe n, the WTRU 102 may determine the SIL and/or supportable SIL in subframe n+k and may report the determined value or values of the SIL and/or supportable SIL in subframe n+k, for example, where k may be equal to or greater than zero. The relationship between n and n+k may follow LTE (e.g., TDD LTE) timing for at least one of: UL scheduling, DL scheduling, UL HARQ, or DL HARQ, among others.

The WTRU 102 may provide the report and/or the indication based on an event such as the SIL reaching or exceeding a threshold (e.g., which may be predefined, configured (e.g., by signaling such as RRC signaling) by the eNB 160, and/or related to the WTRU's SIL or supportable SIL).

The report or indication may correspond to a certain subframe, for example, such that the eNB 160 may be aware of certain transmission parameters such as scheduling information (e.g., time and/or frequency resources assigned or used in the UL and/or DL) which may correspond to the reported SIL and/or supportable SIL.

The WTRU 102 may or may only send such a report or indication in or for certain subframes such as at least one of: (1) the FDSC subframes, (2) the SINTF subframes, (3) the NINTF subframes, and/or subframes indicated by the eNB 160.

The report or indication may include at least one of: (1) the SIL; (2) the supportable SIL; (3) the difference between SIL (e.g., WTRU SIL) and supportable (e.g., WTRU supportable) SIL (e.g., supportable SIL-SIL); (4) the WTRU maximum power such as $P_{CMAX}$ and/or $P_{CMAX,c}$; (5) the maximum FDSC UL power for the WTRU 102 as a whole and/or for one or more individual or groups of UL channels; (6) the WTRU UL power for the WTRU 102 as a whole and/or for one or more individual or groups of UL channels; (7) the difference between a UL power and a maximum FDSC UL power (e.g., maximum FDSC UL power–WTRU UL power), e.g., for the WTRU 102; (8) an indication as to whether the SIL (e.g., WTRU SIL) is more than a threshold below the supportable (e.g., WTRU supportable) STL (e.g., represented by a single or small number of bits), or the equivalent; and/or (9) an indication that the supportable SIL (e.g., of the WTRU 102) has been exceeded, among others.

In certain representative embodiments, the one or more values associated with the report or indication may be subframe specific (e.g., may each be subframe specific), for example based on at least one subframe specific parameter such as the transmission or reception RBs, or may be independent of the subframe. In certain representative embodiments, the one or more values may be serving cell specific or for the WTRU 102 as a whole. It is contemplated that the values may also be any combination of subframe specific and/or serving cell specific. The WTRU 102 may include values for multiple serving cells in a report.

Representative WTRU Reporting When Nearing, Reaching and/or Exceeding the Supportable SIL The WTRU 102 may send a report or other indication to the eNB 160 which may indicate that the WTRU's SIL (e.g., actual SIL determined or calculated) may be nearing, reaching or exceeding the supportable (e.g., WTRU's supportable) SIL. For example, the WTRU 102 may send the report or indication when the difference between the supportable SIL and the SIL (e.g., the supportable SIL minus the SIL) is below a threshold (e.g., at least one of: less than a certain positive value, zero, or a negative value). Nearing or exceeding the supportable SIL may be one of the triggers for sending an SIL or supportable SIL report, as described herein.

In certain representative embodiments, the WTRU 102 may report and/or indicate that the WTRU 102 may be nearing, exceeding, or has exceeded its supportable SIL (e.g., to the eNB 160) via higher layer signaling such as RRC or MAC layer signaling or via physical layer signaling. The WTRU 102 may send an indication in the PUCCH or in the UCI which may be carried by the PUSCH 680 (for example in a subframe in which the WTRU's SIL has exceeded its supportable SIL and/or in a subframe in which the WTRU 102 has modified its UL transmission to have its SIL not exceed its supportable SIL).

Representative WTRU Behavior in Case of SIL Exceeding Supportable SIL

The WTRU 102 may modify an intended or desired UL transmission based on the (e.g., its) supportable SIL. For example, if the WTRU 102 determines in a subframe in which the WTRU 102 may transmit and receive simultaneously in an FDSC that the (e.g., its) supportable SIL may be exceeded, the WTRU 102 may modify the UL transmission (e.g., may reduce its transmission power).

If the WTRU 102 determines that a subframe may be used for transmission by the WTRU 102 and may be a SINTF subframe, the WTRU 102 may modify the UL transmission (e.g., reduce its transmission power). The WTRU 102 may determine that the subframe may be a SINTF subframe in accordance with procedures described herein.

In certain representative embodiments, the WTRU 102 may modify and/or reduce the power level of the UL transmission (e.g., transmit at a lower power level) prior to actual transmission (for example, such that the STL of the WTRU 102 may not exceed the supportable SIL (e.g., of the WTRU 102). In certain representative embodiments, the WTRU 102 may modify and/or drop (e.g., not transmit or transmit at zero power) one or more UL channels, for example such that the SIL may not exceed the supportable STL.

Such a modification, power reduction, and/or channel dropping may be applicable in certain subframes, for example potential FDSC subframes, SINTF subframes, and/or specific subframes indicated by the eNB 160, among others.

Whether or not to modify the UL transmission may be dependent on the specific channels to be transmitted and/or received in a subframe, such as a FDSC subframe. For example, certain channels may have a higher priority (e.g., an established or predefined higher priority) than certain other channels. Priorities may be defined or assigned for the UL and DL channels such that a particular UL channel may or may only be modified (e.g., by a WTRU 102), if a particular higher priority channel may be interfered with in the DL (e.g., as determined by the WTRU 102, for example according to the defined or configured channel priorities, a priority list, priority index and/or priority table).

In certain representative embodiments, if the modification of the UL transmission occurs or is needed, for example to reduce power such that the (e.g., the WTRU's) SIL does not exceed the (e.g., its) supportable SIL and/or the WTRU's UL power does not exceed the (e.g., the WTRU's) maximum FDSC UL power, power allocation (e.g., by the WTRU 102) to and/or scaling (e.g., by the WTRU 102) of channels which may be transmitted may follow power scaling rules (e.g., which may be similar to LTE maximum power rules). The power scaling rules may allocate available power to the PUCCH channel first if any, and the remaining power may be allocated to any PUSCH 680 with the UCI. Power remaining after allocation to the PUCCH channel and the PUSCH 680 with the UCI may be to any PUSCH 680 without UCI. If there is no remaining power for certain channels, those channels may be dropped (e.g., not transmitted or transmitted at zero power). In certain representative embodiments, alternate or additional rules may be applied based on the priorities of the UL and the DL channels.

In certain representative embodiments, the WTRU 102 may modify its CSI reports based on the determined or calculated SIL. For example, the WTRU 102 may indicate a lower rank indication (RI) and/or CQI or a different PMI based on the SIL. The WTRU 102 may indicate to the eNB 160 in its feedback report that the CSI has been affected by high SIL. For example, the feedback report may include the CSI along with an indicator that the CSI was impacted by and/or affected by, for example the SIL or the SIL exceeding a threshold (e.g., the supportable SIL).

Representative Maximum Power Including Supportable SIL

Power modification and/or power reduction to adjust, limit or reduce the SIL may be combined with the LTE maximum power rules. The WTRU 102 may configure its maximum power for a serving cell or for the WTRU 102 as a whole accounting for its supportable SIL and/or maximum FDSC UL power. For example, the maximum (e.g., maximum WTRU configured) UL power may be or may be replaced by the lower of the ordinary maximum (e.g., maximum WTRU configured) UL power (e.g., $P_{CMAX}$ and/or $P_{CMAX,c}$) and the supportable (e.g., the WTRU's supportable) STL or supportable (e.g., WTRU's supportable) Sit maximum power (e.g., maximum FDSC UL power). The supportable SIL (e.g., maximum FDSC UL power) may be serving cell specific (e.g., for the WTRU 102) and/or specific to the WTRU 102 as a whole.

In certain representative embodiments, the signaled maximum UL power on the serving cell (e.g., $P_{EMAX,c}$) may be replaced by the lower of the signaled maximum and the supportable (e.g., the WTRU's supportable) SIL maximum power (e.g., maximum FDSC UL power) for the serving cell. For example, when the WTRU 102 configures the maximum output power $P_{CMAX,c}$ on the serving cell c, the WTRU 102 may set the $P_{CMAX,c}$ value within the following bounds:

$$P_{CMAX\_L,c} \le P_{CMAX,c} \le P_{CMAX\_H,c} \qquad (1)$$

For intra-band contiguous carrier aggregation, the lower bound may be, for example:

$$P_{CMAX\_L,c}=\text{MIN}\{P_{EMAX,c}-\Delta T_{C,c}, P_{PowerClass}-\text{MAX}(MPR_c+A-MPR_c, P-MPR_c)-\Delta T_{C,c}\} \qquad (2)$$

For inter-band carrier aggregation, the lower bound may for example be:

$$P_{CMAX\_L,c}=\text{MIN}\{P_{EMAX,c}-\to T_{C,c}, P_{PowerClass}-\text{MAX}(MPR_c+A-MPR_c+\Delta T_{IB,c}, P-MPR_c)-\Delta T_{C,c}\} \qquad (3)$$

The higher (or upper) bound may be, for example:

$$P_{CMAX\_H,c}=\text{MIN}\{P_{EMAX,c}, P_{PowerClass}\} \qquad (4)$$

$P_{EMAX,c}$ may be a value signaled by the eNB 160. $P_{PowerClass}$ may be the maximum WTRU power which may be based on its power class. The remaining terms in the equations may be allowed power reductions, for example to comply with spectral mask requirements, specific absorption requirements (SAR), and the like.

In certain representative embodiments, $P_{EMAX,c}$ may be replaced or modified (e.g., by the WTRU 102) by the minimum of $P_{EMAX,c}$ and the maximum FDSC UL power for serving cell c (e.g., for the WTRU 102), for example, in the lower and/or upper bound of $P_{CMAX,c}$, and may be applicable in certain subframes such as potential FDSC subframes, SINTF subframes, NINTF subframes, and/or specific subframes indicated by the eNB 160, among others.

In certain representative embodiments, the minimum (MIN) function in an upper and/or lower bound of the $P_{CMAX}$ and/or the $P_{CMAX,c}$ may be expanded to include another term which may be the maximum FDSC UL power. For example, Equation (2) may become:

$$P_{CMAX\_L,c}=\text{MIN}\{P_{EMAX,c}-\Delta T_{C,c}, P_{PowerClass}-\text{MAX}(MPR_c+A-MPR_c, P-MPR_c)-\Delta T_{C,c}, \text{maximum FDSC UL power}\} \qquad (5)$$

In certain representative embodiments, Equation (4) may become:

$$P_{CMAX\_H,c}=\text{MIN}\{P_{EMAX,c}, P_{PowerClass}, \text{maximum FDSC UL power}\} \qquad (6)$$

Representative Signaled Maximum Power for the NINTF and/or the SINTF

The WTRU 102 may receive the configuration of a maximum power level, for example from the eNB 160, which the WTRU 102 may not exceed in certain subframes such as in the SINTF subframes and/or the NINTF subframes. The configuration may be provided using or in higher layer signaling such as in RRC signaling or in physical layer signaling. In certain representative embodiments, the configuration may be provided using or in higher layer signaling and may be applied based on an indication using or in physical layer signaling.

In certain representative embodiments, the WTRU 102 may receive a maximum power value, (e.g., $P_{IMAX}$ and/or $P_{IMAX,c}$), which the WTRU 102 may use or apply to limit, to adjust and/or to reduce the UL power of the WTRU for the serving cell c and/or the UL power for WTRU 102 as a whole (e.g., the total UL power of the WTRU 102 (e.g., for transmission to all cells)), for example to reduce interference (e.g., interference to a neighbor WTRU 102) in a FDSC subframe. This received maximum power value may be referred to as the signaled interference maximum power.

In certain representative embodiments, the WTRU 102 may apply or may only apply the $P_{IMAX}$ and/or $P_{IMAX,c}$ in a subframe which it determines to be a SINTF subframe and/or a NINTF subframe.

In a determination by the WTRU 102 of its configured maximum output power for the serving cell or for the WTRU 102 as a whole, the WTRU 102 may include $P_{IMAX}$ and/or $P_{IMAX,c}$.

In certain representative embodiments, $P_{EMAX,c}$ may be replaced or modified (e.g., by the WTRU 102) by the minimum of $P_{EMAX,c}$ and $P_{IMAX,c}$ for example in the lower and/or upper bound of $P_{CMAX,c}$. This replacement or modification may be applicable in certain subframes such as potential FDSC subframes, SINTF subframes, NINTF subframes, and/or specific subframes indicated by the eNB 160, among others.

In certain representative embodiments, the minimum (MIN) function in an upper and/or lower bound of $P_{CMAX}$ and/or $P_{CMAX,c}$ may be expanded to include another term which may be $P_{IMAX}$ and/or $P_{IMAX,c}$. For example, Equation (2) may become:

$$P_{CMAX\_L,c} = \text{MIN}\{P_{EMAX,c} - \Delta T_{C,c}, P_{PowerClass} - \text{MAX}(MPR_c + A\text{-}MPR_c, P\text{-}MPR_c) - \Delta T_{C,c}, P_{IMAX,c}\} \quad (7)$$

In certain representative embodiments, Equation (4) may become:

$$P_{CMAX\_H,c} = \text{MIN}\{P_{EMAX,c}, P_{PowerClass}, P_{IMAX,c}\} \quad (8)$$

In certain representative embodiments, one or both of the maximum FDSC UL power and the signaled interference maximum power may be accounted for when determining the maximum WTRU UL power, for example in a subframe. A WTRU 102 may apply one or both of the maximum FDSC UL power and the signaled interference maximum power depending on whether the subframe may be a SINTF subframe and/or a NINTF subframe (e.g., which one to apply or whether to apply both may depend on whether the subframe may be a SINTF subframe and/or a NINTF subframe). For example, the WTRU 102 may account for the maximum FDSC UL power in a subframe which may be determined by the WTRU 102 to be a SINTF subframe. In another example, the WTRU 102 may account for the signaled interference maximum power in a subframe which may be determined by the WTRU 102 to be a NINTF subframe. A subframe may be both a SINTF subframe and a NINTF subframe.

Representative Prioritization Based on Channels

Channels may be handled by the WTRU 102 based on priorities (e.g., the relative priorities) of the channels. For example, the WTRU 102 may determine whether or not to modify the UL transmission in a subframe (for example a subframe which may be at least one of a FDSC subframe, a potential FDSC subframe, a SINTF subframe, and/or a NINTF subframe) based on the priorities of the channels the WTRU 102 may transmit in the UL as compared to the priorities of the channels which may be transmitted and/or received in the DL in the same subframe.

The WTRU 102 may determine whether to modify the UL transmission (for example whether to modify the power of one or more channels it may transmit in a subframe) based on the relative priorities of the UL channels (e.g., the UL channels which may be transmitted by the WTRU 102) and the DL channels which may be transmitted by the eNB 160 and/or received by the WTRU 102 in the subframe. For example, the WTRU 102 may make the determination in a subframe in which the WTRU's SIL may exceed its supportable SIL.

Modifying the UL transmission may include scaling and/or dropping (e.g., not transmitting or transmitting at a zero power level) one or more channels which the WTRU 102 may transmit in the UL.

The DL control channel (e.g., the PDCCH 610 and/or the EPDCCH) may have a higher priority than one or more of: (1) the PUSCH channels which may carry data (e.g., only data); (2) the PUSCH channels which may carry UCI such as any UCI or certain UCI (e.g., ACK/NACK information); (3) the PUCCH channel (for example any PUCCH channel); and/or (4) the PUCCH channel which may carry ACK/NACK information, among others. For example, the DL control channel may have a lower priority than the PUCCH carrying the ACK/NACK and may have a higher priority than the PUCCH not carrying the ACK/NACK. The DL control channel may have a lower priority than the PUSCH 680 carrying the UCI which may include ACK/NACK and may have a higher priority than the PUSCH 680 not carrying the UCI which may include ACK/NACK.

In certain representative embodiments, the PDSCH 620 carrying certain information, referred to herein as "priority" information may have a higher priority than one or more of: (1) the PUSCH channels which may carry data (e.g., only data); (2) the PUSCH channels which may carry UCI such as any UCI or certain UCI (e.g., ACK/NACK information); (3) the PUCCH channel (for example, any PUCCH channel); and/or (4) the PUCCH channel which may carry ACK/NACK information. The priority information that the PDSCH 620 may carry may include at least one of system information (e.g., any system information, any system information which may be applicable to the WTRU 102, or certain system information such as high priority system information) and/or paging information.

In certain examples, if the WTRU 102 may know (or knows) or may determine (or determines) (for example based on a configuration which may be signaled to the WTRU 102 via broadcast and/or RRC signaling that may be from an eNB 160) that a certain subframe may be one in which the WTRU 102 may monitor or receive EPDCCH or may receive the PDSCH 620 carrying priority information, the WTRU 102 may modify the UL channels the WTRU 102 may transmit in the subframe which may be of a lower priority than the EPDCCH (or the PDSCH 620 carrying the priority information). For such a subframe, the WTRU 102 may, for example to not exceed SIL, scale or drop (e.g., not transmit or transmit at zero power) the PUSCH 680 (for example the PUSCH carrying data (e.g., only data), the PUSCH 680 not carrying ACK/NACK information, and/or any PUSCH 680, among others).

In certain representative embodiments, for such a subframe, if it is (or may be) necessary or useful to reduce the power of the PUCCH to not exceed the WTRU's supportable SIL and if it is not (or may not be) necessary or useful to reduce the PUCCH power otherwise, the WTRU 102 may not reduce the power of the PUCCH, for example if the PUCCH carries ACK/NACK information.

In certain representative embodiments, for such a subframe, if it is (or may be) necessary or useful to reduce the power of the PUSCH 680 carrying the UCI (e.g., any UCI or certain UCI which may be or include ACK/NACK information), to not exceed the WTRU's supportable SIL and if it is not (or may not be) necessary or useful to reduce the PUSCH power otherwise, the WTRU 102 may not reduce the power of the PUSCH 680.

In certain examples, if the WTRU 102 may know (or knows) or may determine (or determines) (for example based on a configuration which may be signaled to the WTRU 102 via broadcast and/or RRC signaling that may be from an eNB 160) that a certain subframe may not be one in which the WTRU 102 may monitor or receive EPDCCH and/or may not be one in which the WTRU 102 may receive the PDSCH 620 carrying priority information, the WTRU 102 may not modify its UL transmissions (for example, to ensure that it does not exceed its supportable SIL), if such a modification is not warranted for other reasons.

For subframes in which the PDCCH 610 may be monitored and/or received by the WTRU 102, the WTRU 102 may modify the UL transmission in one or more of those subframes (for example, similar to the manner described for EPDCCH), based on the priorities (e.g., relative priorities) of the PDCCH 610 and the UL channels that the WTRU 102 may transmit. A modification, such as a reduction in power or dropping of a UL channel, may apply to the entire subframe or may apply to the symbols which may overlap with the PDCCH region.

Representative FDSC DL Handling

In a subframe which may be an FDSC subframe, if a (e.g., a first) WTRU 102 monitors the PDCCH 610 and/or the EPDCCH and/or receives or expects to receive the PDSCH 620 in the subframe, the WTRU 102 (e.g., the first WTRU) may take into account (e.g., based on a priori knowledge), UL transmissions by another (e.g., a second) WTRU 102 which may be made in the same FDSC (or FDSC subframe) as the DL transmissions (e.g., which may be intended for or received by the first WTRU 102). For example, the WTRU 102 (e.g., the first WTRU) may perform certain processing in the DL (for example to reduce or take into account the UL signal and/or SINTF or NINTF which may be present in the subframe).

The WTRU 102 (e.g., the first WTRU) may be provided with the knowledge (e.g., of the UL transmissions by the other or second WTRU 102) for example by an eNB 160, via physical layer signaling. For example, the PDCCH 610 or the EPDCCH in subframe n may provide information to the WTRU 102 (e.g., the first WTRU) regarding UL transmissions which may be scheduled for or made by another WTRU 102 (e.g., the second WTRU) in subframe n or a future subframe such as subframe n+k (e.g., where the value of k may be provided or may be known, such as by definition, or by scheduling and/or by HARQ timing rules). The WTRU 102 (e.g., the first WTRU) which may receive in the DL may be provided with parameters. For example the parameters may include UL scheduling information for the other WTRU 102 (e.g., the second WTRU) which may transmit in the UL. The UL scheduling information may assist the WTRU 102 (e.g., the first WTRU) with reception in the DL, for example by enabling cancellation of interference from other WTRUs 102 (e.g., the second WTRU). In response to the UL scheduling information, the WTRU 102 (e.g., the first WTRU) which may receive in the DL may perform special processing, such as interference cancellation in subframe n or n+k.

In certain representative embodiments, the WTRU 102 (e.g., the first WTRU) may be provided with information regarding scheduling for other WTRUs 102 (e.g., the second WTRU and/or other WTRUs 102) that may identify potential scheduling for the other WTRUs 102 in the opposite direction (e.g., from the first WTRU 102) for a period of time. For example, the WTRU 102 may be informed that certain RBs may be used or applied for FDSC (or FD operation) for a certain period of time. The WTRU 102 may take the scheduling information (e.g., potential RB usage for FDSC or FD operation) into account, for example in FDSC subframes for that period of time. The scheduling information may be provided to the WTRU 102 by the eNB 160 (e.g., via physical layer signaling) in one or more subframes (e.g., certain subframes such as subframe 0).

Representative MBSFN Usage for Full Duplex Operation

MBSFN subframes may be used or applied as FDSC or potential FDSC subframes. MBSFN subframes may be subframes which may be used or applied for Multimedia Broadcast Multicast Service (MBMS) or subframes which may be indicated, for example by broadcast or other signaling, as reserved, for example for MBMS. This configuration may be cell-specific and/or may be provided or indicated by the eNB 160 in a System Information Block (SIB) (for example, SIB1). The configuration of the MBSFN subframes may indicate which subframes of a frame and/or which frames may be used or applied for MBMS or reserved, for example for MBMS.

When a subframe, such as an MBSFN subframe, is used or applied for MBMS, a Physical Multicast Channel (PMCH) may be transmitted in the subframe. For a subframe that may be configured as an MBSFN subframe in which the PMCH is not transmitted, the subframe may be used or applied for other purposes including, for example, normal data transmission (e.g., a PDSCH transmission) to one or more WTRUs 102 which may receive and/or read a control channel such as the PDCCH 610 or the EPDCCH in the subframe to determine whether in the subframe the PDSCH 620 may be transmitted and/or intended for that WTRU 102.

In a subframe which may be configured as an MBSFN subframe, one or more of the following may apply to the subframe: (1) the subframe may have a control or non-MBSFN region and a data or MBSFN region; (2) the PMCH may be transmitted in the subframe in the data or the MBSFN region; (3) the PDSCH 620 may be transmitted in the subframe in the data or the MBSFN region; (4) the DL CRS 630 may not be transmitted in the data or the MBSFN region; (5) the PCFICH and/or the PHICH may be transmitted in the non-MBSFN region or the control region; (6) the PDCCH 610 may or may not be transmitted in the non-MBSFN region or the control region; (7) the control or non-MBSFN region may comprise a certain number of symbols (e.g., 2 symbols), which may have normal or extended CP length where the CP length may correspond to the CP length used or applied for the non-MBSFN subframes in the cell such as subframe 0; and/or (8) the data or the MBSFN region may comprise a certain number of symbols and a certain CP length may be used or applied (for example: (i) the number of symbols may be 10 when extended CP length is used or applied, for example for carrier frequency separation of 15 kHz; (ii) extended CP length may be used or applied, when the PMCH is transmitted in the subframe; and/or (iii) the extended CP length may be used or applied, when the PDSCH 620 is transmitted in the subframe (for example when extended CP length is used or applied for non-MBSFN subframes in the cell, such as subframe 0); (iv) the number of symbols may be 12 when a normal CP length is used or applied; and/or (v) the normal CP length may be used or applied, when the PDSCH 620 is transmitted in the subframe (for example when normal CP length is used or applied for non-MBSFN subframes in the cell such as subframe 0), among others.

An MBSFN subframe in which the PMCH may not be transmitted may be used or applied as a FDSC subframe (e.g., allocated as a FDSC subframe) or a potential FDSC subframe. In certain examples, the WTRU 102 may expect or determine that the MBSFN subframe (e.g., any MBSFN subframe) in which the PMCH may not be transmitted may be used or applied as an FDSC subframe. In certain representative embodiments, the WTRU 102 may expect or determine the MBSFN subframe may be used or applied as a FDSC subframe based on the PMCH and/or the MBMS service scheduling indications from the eNB 160.

In certain examples, the WTRU 102 may expect or determine the MBSFN subframe may be used or applied as a FDSC subframe based on the UL grant that is scheduled (or that schedules UL transmission) in the MBSFN subframe. For example, if a UL grant is received for an MBSFN subframe or a UL transmission is scheduled in an MBSFN subframe, the WTRU 102 may expect or determine the MBSFN subframe may be used or applied as a FDSC subframe.

In certain examples, the WTRU 102 may expect or determine the MBSFN subframe may be used or applied as a FDSC subframe based the DL grant indicated in the PDCCH 610 in the control or the non-MBSFN region of the MBSFN subframe. For example, if a DL grant is indicated in the PDCCH 610 in the control or the non-MBSFN region of the MBSFN subframe, the WTRU 102 may expect or determine the MBSFN subframe may be used or applied as a FDSC subframe.

An MBSFN subframe in which PMCH may be transmitted may be used or applied as a FDSC subframe. For example, the WTRU 102 may expect or determine that a MBSFN subframe is also a FDSC subframe based on the UL grant that is scheduled (or that schedules UL transmission) in the MBSFN subframe. In certain representative embodiments, the WTRU 102 may expect or determine that a MBSFN subframe is also a FDSC subframe if the WTRU 102 may be allocated (e.g., otherwise than by a grant) to transmit control information (e.g., UCI and/or SR in the UL) in the MBSFN subframe. The WTRU 102 may determine or receive an indication that the MBSFN subframe (e.g., the MBSFN in which PMCH may be transmitted and/or which may be used or applied as a FDSC subframe) may also be a potential SINTF subframe and/or a potential NINTF subframe.

In the MBSFN subframe, which may be an FDSC subframe, the PDSCH transmission may be (e.g., may always be) limited to certain TMs such as those which may rely on the DM-RS for demodulation (e.g., TM 9 and/or TM 10) and/or which may not rely on DL CRS 630 for demodulation.

In the MBSFN subframe which may be an FDSC subframe, the WTRU 102 may assume, know or may determine that the DL CRS 630 may not be present in the MBSFN or the data region in the subframe. The WTRU 102 may not adjust its transmission in the UL in that subframe to account for the DL CRS 630 in the DL data or the MBSFN region of the subframe.

In the MBSFN subframe, the FDSC resources may be allocated to or in any of: (1) the MBSFN region (e.g., only the MBSFN region) of the subframe; and/or (2) the symbols (e.g., all the symbols) of the subframe (e.g., both the MBSFN and the non-MBSFN regions of the subframe).

For the WTRU 102 which may transmit in the UL in the MBSFN subframe, which may be a FDSC subframe, the WTRU 102 may adjust its UL transmission based on the relative priorities of the channels which it may transmit in the UL and which may be present in the DL in one or more of the non-MBSFN region and the MBSFN-region of the subframe.

FIG. 22 is a diagram illustrating a representative method 2200 implemented in a WTRU 102 using time-frequency (TF) resources for communications in first and second directions.

Referring to FIG. 22, the representative method 2200 may include, at block 2210, the WTRU TF resource muting or symbol muting one or more TF resources for communication in the first direction based on information associated with a communication in the second direction or the WTRU subframe shortening by one or more TF resources for communication in the first direction based on information associated with a communication in the second direction.

In certain representative embodiments, the WTRU 102 may receive the communication in the second direction and may detect or determine the information associated with the communication in the second direction.

In certain representative embodiments, the WTRU 102 may obtain any of: a list, an ordered list or an indication of priority signaling, of priority channels, of priority resources, of priority Resource Elements (REs), of priority Resource Blocks and/or priority symbols.

In certain representative embodiments, the WTRU 102 may be configured to receive at least a portion of the communication in the second direction while transmitting at least a portion of the communication in the first direction.

In certain representative embodiments, the WTRU 102 may establish time intervals in which the communications in the first and second directions: (1) overlap in frequency and/or (2) a first frequency or a first frequency band of the communication in the first direction is within a threshold of a second frequency or a second frequency band of the communication in the second direction. For example, the WTRU 102 may be configured or may configure itself to enable FDR operations.

In certain representative embodiments, the WTRU 102 may set one or more subframes that are to include Full Duplex Resources (FDR). For example, the WTRU 102 may set the FDR subframes based on information from a Network Access Point (NAP) (e.g., a HeNB or eNB 160 or other access point device).

In certain representative embodiments the WTRU 102 may set the one or more subframe as one or more MBSFN subframes.

In certain representative embodiments, the TF resources may include any of: (1) one or more Resource Elements (REs), one or more Resource Blocks (RBs), and/or (3) one or more symbols.

In certain representative embodiments, the shortened subframe may include one or more symbols which are muted.

In certain representative embodiments, the WTRU 102 may mute the one or more TF resources via any of: (1) a blanking operation; (2) a puncturing operation; (3) a rate matching operation; and/or (4) a transmission power control operation.

In certain representative embodiments, the WTRU 102 may adjust transmission power levels between or among subsets of the TF resources associated with the communication in the first direction to reduce or substantially eliminate interference to the communication in the second direction that is being concurrently communicated to the WTRU 102.

In certain representative embodiments, the WTRU 102 may be configured to apply any of: (1) respectively different power control loops, (2) respectively different power control offsets and/or (3) respectively different $P_{CMAX}$ values for different TF resources associated with different TF regions based on a grant or DL control information (DCI).

In certain representative embodiments, the WTRU 102 may set a transmission power level of a first subset of the TF resources to a reduced level relative to a transmission power level of a second subset of the TF resources.

In certain representative embodiments, the WTRU 102 may adjust a modulation order of the first subset of the TF resources to any of: (1) a reduced modulation order and/or (2) a lowest modulation order.

In certain representative embodiments, the WTRU 102 may apply any of: (1) a fixed rank indicated from the DCI for the first subset of TF resources; and/or (2) a first rank indicated from the DCI for the first subset of TF resources that is smaller than a second rank for the second subset of TF resources.

In certain representative embodiments, the first rank may be indicated by an offset in the DCI.

In certain representative embodiments, the WTRU 102 may receive, in the DCI, a first modulation order for a first subset of a plurality of TF resources and a second modulation order for a second subset of the plurality of TF resources.

In certain representative embodiments, the WTRU 102 may set a modulation order of the first subset of the TF resources to the first modulation order and a modulation order of the second subset of TF resources to the second modulation order based on the received DCI.

In certain representative embodiments, the reduced level for setting the transmission power level of the first subset of the TF resources may be a zero power level or a non-zero power level which enables the communication in the second direction.

In certain representative embodiments, the WTRU 102 may receive (e.g., in the DCI) a first transmission power control (TPC) indicator associated with the first subset of the TF resources and a second TPC indicator associated with the second subset of the TF resources.

In certain representative embodiments, the WTRU 102 may adjust a transmission power level of the first subset of the TF resources based on the received first TPC indicator in the DCI and may adjust a transmission power level of the second subset of the TF resources based on the received second TPC indicator.

In certain representative embodiments, the WTRU 102 may receive transmission power muting information associated with the one or more TF resources to be muted such that the muting of the one or more TF resources is in accordance with the received transmission power muting information.

In certain representative embodiments, the received transmission power muting information may be any of: (1) offset power information associated with the one or more TF resources indicating an offset from the current transmission power of the one or more TF resources; and/or (2) differential power information associated with the one or more TF resources indicating one or more differences between the transmission power of the one or more TF resources and other TF resources in a subframe.

In certain representative embodiments, the communication in the first direction may be a communication in a UL direction and the communication in the second direction may be a communication in a DL direction. For example, for a wireless mobile terminal, the wires mobile terminal may transmit in the UL direction and may receive in the DL direction.

In certain representative embodiments, the WTRU 102 may the communication in the first direction may be a communication in a DL direction and the communication in the second direction may be a communication in a UL direction.

In certain representative embodiments, the WTRU is any of: a mobile terminal, a network access point, an eNB, a HeNB, a Node B or a HNB, among others.

In certain representative embodiments, the WTRU 102 may receive an indication or report that any of: one or more RSs, one or more control channels, one or more resource elements (REs) and/or one or more RBs in the communication in the second direction are a priority In certain representative embodiments, The WTRU 102 may determine a corresponding TF location or TF locations associated with the one or more TF resources in the communication in the first direction to be mute based on the indication such that the muting of the one or more TF resources is at the corresponding TF location or TF locations for the communication in the first direction.

In certain representative embodiments, the WTRU 102 may receive the indication or the report (e.g., of the priorities) in the DCI.

In certain representative embodiments, the WTRU 102 may receive a channel index indicating a priority order for channels for communication in the first and/or second directions.

In certain representative embodiments, the WTRU 102 may receive an indicator indicating one or more subframes for the WTRU 102 to operate in full duplex mode.

In certain representative embodiments, the WTRU 102 may selectively operate in full duplex mode in the indicated one or more subframes such that the one or more subframes are configured for simultaneous transmission and reception of radio frequency (RF) signals.

In certain representative embodiments, whether a WTRU 102 operates in full duplex mode and/or the number of subframes of a WTRU 102 operating in full duplex mode is independent of the distance of the WTRU 102 to a NAP.

In certain representative embodiments, the WTRU 102 may mute one or more TF resources to reduce or substantially eliminate transmit/receive SINTF from the WTRU 102 and/or NINTF for the WTRU 102 among the WTRU 102 and one or more other devices.

In certain representative embodiments, the WTRU 102 may shorten one or more subframes to reduce or substantially eliminate transmit/receive SINTF from the WTRU 102 and/or NINTF for the WTRU 102 among the WTRU 102 and one or more other devices.

In certain representative embodiments, the muting of the one or more TF resources may be based on one or more TF locations of a channel for communication in the second direction and/or one or more TF locations of a RS to be communicated in the second direction.

In certain representative embodiments, the RS to be communicated in the second direction may include any of: (1) a PSS and/or a SSS), (2) PBCH, (3) a DL CRS 630 and/or (4) a DM-RS.

In certain representative embodiments, the WTRU 102 may determine whether a subframe is potentially a SINTF subframe and/or potentially a NINTF subframe, as a determined result such that the WTRU 102 may mute the one or more TF resources is in accordance with the determined result.

In certain representative embodiments, the WTRU 102 may establish a supportable SINTF level (SIL) indicating a level of signal interference supportable for full duplex operations.

In certain representative embodiments the WTRU 102 may control transmission power of the one or more TF resources so that a SIL does not exceed an interference level in accordance with the supportable SIL.

In certain representative embodiments, the WTRU 102 may report to a network resource any of: (1) a SINTF level (SIL); (2) a supportable SIL; (3) a difference between the SIL and the supportable SIL; (4) a maximum transmission power; (5) a maximum full duplex single carrier (FDSC) transmission power in the first direction for the WTRU 102 as a whole; (6) a maximum full duplex single carrier (FDSC) transmission power in the first direction for one or more individual or groups of channels in the first direction; (7) a transmission power for the WTRU 102 as a whole; (8) a transmission power for one or more individual or groups of channels in the first direction; (9) a difference between a transmission power and a maximum FDSC power in the first direction; (10) an indication as to whether the SIL is more than a threshold below the supportable SIL; and/or (11) an indication that the supportable SIL has been exceeded.

In certain representative embodiments, the WTRU 102 may set the supportable SIL as a function of any of: (1) a full duplex single carrier (FDSC) frequency of transmission/ reception; (2) an actual frequency of transmission/reception; (3) a number and/or frequency location of RBs; (4) a number and/or frequency location of the RBs of the transmission/ reception; (5) properties of the FDSC; (6) a relative frequency location of the RBs and/or REs for WTRU transmission/reception; (7) a relative frequency location of the RBs and/or the REs, which are allocated for WTRU transmission/reception; (8) a number of WTRU antennas used for transmission/reception; (9) network resource transmission parameters; (10) a pathloss; (11) a channel type and/or types of the transmission/reception; (12) a type of RS that is used for transmission/reception; (13) an internal coupling loss of the WTRU 102; (14) a modulation and coding scheme (MCS) and/or a transport block size (TBS) to be applied; and/or (15) a quality criterion attached to a transmission.

In certain representative embodiments, the WTRU 102 may determine whether a subframe is used for MBSFN operations, as a determined result such that muting of the one or more TF resources is in accordance with the determined result.

In certain representative embodiments, the priority signaling may include any of: (1) a DL (DL) synchronization channel; (2) a DL broadcast channel; (3) a DL RS, (4) a DL control channel; (5) a UL control channel; and/or (6) a UL RS.

In certain representative embodiments, the WTRU 102 may map a signal to a plurality of TF resources including the one or more TF resources to be muted and the WTRU 102 may puncture the mapped TF resources at TF locations associated with the one or more TF resources.

In certain representative embodiments, the WTRU 102 may rate-match to avoid mapping a plurality of TF resources at TF locations associated with the one or more TF resources to be muted.

In certain representative embodiments, the WTRU 102 may be controlled or configured to mute the one or more TF resources for communication in the first direction via messaging with a network resource or entity.

In certain representative embodiments, the WTRU 102 may determine a relative priority of a first signal for communication in the first direction relative to a second signal for communication in the second direction based on at least the information associated with the communication in the second direction.

In certain representative embodiments, the WTRU 102 may selectively mute the one or more TF resources of a plurality of TF resources for communication in the first direction based on the determined relative priority.

In certain representative embodiments, the WTRU 102 may determine a relative priority of the first and second signals correspond to respective ones of TF locations or to each TF location associated with the plurality of TF resources and may mute a respective TF resource responsive to the relative priority (e.g., determined relative priority) of the first signal at a corresponding TF location being lower than the second signal at the same corresponding TF location.

In certain representative embodiments, the WTRU 102 may mute perform subframe shortening to reduce interference levels.

In certain representative embodiments, the WTRU 102 may mute of one or more TF resources to reduce interference levels.

In certain representative embodiments, the WTRU 102 may dynamically or semi-statically configure a number of symbols of a region of TF resources in the second direction and may perform the muting of the one more TF resources in accordance with the configured number of the symbols of the region of TF resources for the communication in the second direction.

In certain representative embodiments, the WTRU 102 may receive an indication of a starting symbol 760 associated with a subframe for communication in the first direction.

In certain representative embodiments, the WTRU 102 may mute one or more symbols of the subframe that are to be communicated in the first direction located at a time prior to a time indicated by the starting symbol 760.

In certain representative embodiments, the indication of the starting symbol 760 may be expressly provided in signaling to the WTRU 102 or implicit based on characteristics of information received by the WTRU 102.

In certain representative embodiments, the WTRU 102 may mute of the one or more TF resources conditioned on any of: (1) a transmission power in the second direction being higher than a threshold; (2) a TBS of the one or more TF resources exceeding a threshold; (3) a MCS of the one or more TF resources exceeding a threshold; and/or (4) a redundancy version of the one or more TF resources exceeding a threshold.

In certain representative embodiments, the one or more TF resources may be a subset of a subframe.

In certain representative embodiments, the WTRU 102 may transmit muted TF resources or a subset of the muted TF resources in one or more different parts of the subframe for communication in the first direction.

In certain representative embodiments, the WTRU 102 may time and/or frequency shift the TF resources to be muted or instead of muting these TF resources for communication in the first direction.

In certain representative embodiments, The WTRU 102 may condition the muting of the one or more TF resources on the one or more TF resources being located in any of: (1) one or more particular TF locations; (2) one or more TF locations in a center portion of a frequency band; (3) one or more TF locations in an edge portion of the frequency band; (4) a particular subframe; (5) a subframe relative to signaling or an indication in an earlier subframe; (6) a particular symbol; and/or (7) a particular symbol relative to signaling or an indication in an earlier symbol.

In certain representative embodiments, the WTRU 102 may apply a zero transmission power, a low transmission power and/or an ABS, as an applied transmission power, to respective ones of TF resources in the first direction.

In certain representative embodiments, the WTRU 102 may measure an interference level for the second direction at TF locations associated with the applied transmission power at the respective ones of the TF resources.

In certain representative embodiments, the WTRU 102 may determine one or more priorities for the one or more TF resources associated with the communication in the first direction based on any of: (1) Quality of Service (QoS) parameters for one or more logical channels associated with the one or more TF resources; (2) a number of retransmissions associated with respective ones of the one or more TF resources for the communication in the first direction; and/or (3) whether respective ones of the one or more TF resources are for a retransmission of the communication in the first direction.

In certain representative embodiments, the WTRU 102, from received information, may determine or detect one or more priorities associated with TF resources at TF locations for communication in the second direction that correspond to the one or more TF resources associated with the communication in the first direction.

In certain representative embodiments the TF muting, the symbol muting and/or subframe shortening are based on a relative prior of the TF resources associated with a corresponding TF location for the communication in the first direction and for the communication in the second direction.

In certain representative embodiments, the WTRU 102 may receive, detect, obtain or determine the information associated with the communication in the second direction.

In certain representative embodiments, the WTRU 102 may obtain any of: a priority or a relative priority of signaling, of channels, of resources, of Resource Elements (REs), of Resource Blocks and/or of symbols and/or a list, an ordered list or an indication of priority signaling, of priority channels, of priority resources, of priority Resource Elements (REs), of priority Resource Blocks and/or of priority symbols.

In certain representative embodiments, the WTRU 102 may receive or set one or more subframes that are to include Full Duplex Radio Resources (FDRR).

In certain representative embodiments, the WTRU 102 may configure one or a plurality of subframes of the set subframes as one or more MBSFN subframes.

In certain representative embodiments, the WTRU 102 may adjust transmission power levels between or among subsets of the TF resources associated with the communication in the first direction to reduce or substantially eliminate interference to the communication in the second direction.

In certain representative embodiments, the WTRU 102 may reduce a power level to a zero power level or a non-zero power level which is sufficient to enable the communication in the second direction.

In certain representative embodiments, the WTRU 102 may configure the WTRU 102 to apply any of: respectively different power control loops, respectively different power control offsets, respectively different PCMAX values and/or respectively different $P_{CMAX,c}$ values for different TF resources associated with different TF regions.

In certain representative embodiments, the WTRU 102 may adjust a Modulation Coding Scheme (MCS) level of the first subset of the TF resources to any of: (1) a lower MCS level and/or (2) a lowest MCS level.

In certain representative embodiments, the WTRU 102 may receive, in DCI, a first MCS level for a first subset of a plurality of TF resources and a second MCS level for a second subset of the plurality of TF resources.

In certain representative embodiments, the WTRU 102 may set a transmission power level of the first subset of the TF resources to a reduced level relative to a transmission power level of the second subset of the TF resources based on the received first and second MCS levels.

In certain representative embodiments, the WTRU 102 may set a MCS level of the first subset of the TF resources to the first MCS level and a MCS level of the second subset of the TF resources to the second MCS level based on the received first and second MCS levels.

In certain representative embodiments, the WTRU 102 may receive muting information related to power control that is associated with the one or more TF resources to be muted and the muting of the one or more TF resources may be in accordance with the received muting information related to the power control.

In certain representative embodiments, the received muting information related to power control may be any of: (1) offset power information associated with the one or more TF resources indicating an offset from the current transmission power of the one or more TF resources; and/or (2) differential power information associated with the one or more TF resources indicating one or more differences between the transmission power of the one or more TF resources and other TF resources in a subframe.

In certain representative embodiments, the WTRU 102 may be any of a mobile terminal, a network access point (NAP), an evolved Node B (eNB) 160, a Home eNB (HeNB), a Node B, a Home Node B (HNB), or a relay node.

In certain representative embodiments, the WTRU 102 may receive, determine, or obtain a priority or a relative priority of any of: one or more RSs, one or more control channels, one or more REs and/or one or more RBs for the communication in the second direction.

In certain representative embodiments, the WTRU 102 may determine a corresponding TF location or TF locations associated with the one or more TF resources for the communication in the first direction to be muted based on the priority or the relative priority and the muting may include muting the one or more TF resources at the corresponding TF location or TF locations for the communication in the first direction.

In certain representative embodiments, the WTRU 102 may receive the priority or relative priority in an indication in DCI.

In certain representative embodiments, the WTRU 102 may receive an indicator indicating one or more subframes for the WTRU to use a full duplex operation.

In certain representative embodiments, the WTRU 102 may selectively use the full duplex operation in the indicated one or more subframes such that the one or more subframes may be configured for simultaneous transmission and reception of radio frequency (RF) signals.

In certain representative embodiments, an operation and/or number of subframes of the WTRU 102 using the full duplex operation may be independent of a distance of the WTRU 102 to its network access point.

In certain representative embodiments, the WTRU 102 may mute of the one or more TF resources based on one or more TF locations of a signal communicated in the second direction, one or more TF locations of a channel for communication in the second direction and/or one or more TF locations of a RS to be communicated in the second direction.

In certain representative embodiments, the signal, the RS or the channel may include any of: (1) primary and secondary synchronization signals (PSS/SSS), (2) a physical broadcast channel (PBCH), (3) a DL CRS 630 and/or (4) a Demodulation-RS (DM-RS).

In certain representative embodiments, the WTRU 102 may determine a relative priority of a first signal for communication in the first direction relative to a second signal for communication in the second direction based on at least the information associated with the communication in the second direction.

In certain representative embodiments, the WTRU 102 may selectively mute the one or more TF resources of a plurality of TF resources for communication in the first direction based on the determined relative priority.

In certain representative embodiments, the WTRU 102 may dynamically or semi-statically configure a number of symbols of a subframe for communication in the first direction.

In certain representative embodiments, the WTRU 102 may determine a starting symbol 760 associated with the subframe for communication in the first direction.

In certain representative embodiments, the WTRU 102 may mute one or more symbols of the subframe that are to be communicated in the first direction located at a time prior to a time of the starting symbol 760.

In certain representative embodiments, the WTRU 102 may mute the one or more TF resources conditioned on any of: (1) a transmission power in the first direction being higher than a threshold; (2) a Transport Block Size (TBS) of the one or more TF resources exceeding a threshold; (3) a Modulation and Coding Scheme (MCS) of the one or more TF resources exceeding a threshold; and/or (4) a redundancy version of the one or more TF resources exceeding a threshold.

In certain representative embodiments, the one or more TF resources may be a subset of a subframe, and the WTRU 102 may transmit one or more signals or RSs associated with the muted TF resources or a subset of the muted TF resources in one or more different parts of the subframe for communication in the first direction.

In certain representative embodiments, the WTRU 102 may time and/or frequency shift one or more signals or one or more RSs associated with the muted TF resources for communication in the first direction.

In certain representative embodiments, the WTRU 102 may apply zero transmission power, low transmission power and/or an ABS, as an applied transmission power reduction, to one or a plurality of TF resources in the first direction In certain representative embodiments, the WTRU 102 may measure an interference level for the second direction at TF locations associated with the applied TF resources.

In certain representative embodiments, the WTRU 102 may determine one or more priorities for the one or more TF resources associated with the communication in the first direction based on any of: (1) Quality of Service (QoS) parameters for one or more logical channels associated with the one or more TF resources; (2) a number of retransmissions associated with one or a plurality of the one or more TF resources for the communication in the first direction; and/or (3) whether one or a plurality of the one or more TF resources are for a retransmission of the communication in the first direction.

In certain representative embodiments, the WTRU 102 may determine or detect one or more priorities associated with TF resources at TF locations for communication in the second direction that correspond to the one or more TF resources associated with the communication in the first direction.

In certain representative embodiments, the WTRU 102 may, the TF muting, the symbol muting and/or the subframe shortening may be based on a relative priority of the TF resources associated with a corresponding TF location for the communication in the first direction and the communication in the second direction.

FIG. 23 is a diagram illustrating another representative method 2300 implemented in a WTRU 102 using time-frequency (TF) resources for communications in first and second directions.

Referring to FIG. 23, the representative method 2300 may include, at block 2310, the WTRU 102 being configured for muting of one or more TF resources for communication in the first direction based on information associated with a communication in the second direction.

In certain representative embodiments, the WTRU 102 may receive the communication in the second direction and may detect or determine the information associated with the communication in the second direction.

In certain representative embodiments, the WTRU 102 may obtain any of: a list, an ordered list or an indication of priority signaling, of priority channels, of priority resources, of priority Resource Elements (REs), of priority Resource Blocks and/or priority symbols.

In certain representative embodiments, the WTRU 102 may be configured to receive at least a portion of the communication in the second direction while transmitting at least a portion of the communication in the first direction.

In certain representative embodiments, the WTRU 102 may establish time intervals in which the communications in the first and second directions: (1) overlap in frequency and/or (2) a first frequency or a first frequency band of the communication in the first direction is within a threshold of a second frequency or a second frequency band of the communication in the second direction. For example, the WTRU 102 may be configured or may configure itself to enable FDR operations.

In certain representative embodiments, the WTRU 102 may set one or more subframes that are to include Full Duplex Resources (FDR). For example, the WTRU 102 may set the FDR subframes based on information from a Network Access Point (NAP) (e.g., a HeNB or eNB 160 or other access point device).

In certain representative embodiments the WTRU 102 may set the one or more subframe as one or more MBSFN subframes.

In certain representative embodiments, the TF resources may include any of: (1) one or more Resource Elements (REs), one or more Resource Blocks (RBs), and/or (3) one or more symbols.

In certain representative embodiments, the WTRU 102 may mute the one or more TF resources via any of: (1) a blanking operation; (2) a puncturing operation; (3) a rate matching operation; and/or (4) a transmission power control operation.

In certain representative embodiments, the WTRU 102 may adjust transmission power levels between or among subsets of the TF resources associated with the communication in the first direction to reduce or substantially eliminate interference to the communication in the second direction that is being concurrently communicated to the WTRU 102.

In certain representative embodiments, the WTRU 102 may be configured to apply any of: (1) respectively different power control loops, (2) respectively different power control offsets and/or (3) respectively different $P_{CMAX}$ values for different TF resources associated with different TF regions based on a grant or DCI.

In certain representative embodiments, the WTRU 102 may set a transmission power level of a first subset of the TF resources to a reduced level relative to a transmission power level of a second subset of the TF resources.

In certain representative embodiments, the WTRU 102 may adjust a modulation order of the first subset of the TF resources to any of: (1) a reduced modulation order and/or (2) a lowest modulation order.

In certain representative embodiments, the WTRU 102 may apply any of: (1) a fixed rank indicated from the DCI for the first subset of TF resources; and/or (2) a first rank indicated from the DCI for the first subset of TF resources that is smaller than a second rank for the second subset of TF resources.

In certain representative embodiments, the first rank may be indicated by an offset in the DCI.

In certain representative embodiments, the WTRU 102 may receive, in the DCI, a first modulation order for a first subset of a plurality of TF resources and a second modulation order for a second subset of the plurality of TF resources.

In certain representative embodiments, the WTRU 102 may set a modulation order of the first subset of the TF resources to the first modulation order and a modulation order of the second subset of TF resources to the second modulation order based on the received DCI.

In certain representative embodiments, the reduced level for setting the transmission power level of the first subset of the TF resources may be a zero power level or a non-zero power level which enables the communication in the second direction.

In certain representative embodiments, the WTRU 102 may receive (e.g., in DCI) a first transmission power control (TPC) indicator associated with the first subset of the TF resources and a second TPC indicator associated with the second subset of the TF resources.

In certain representative embodiments, the WTRU 102 may adjust a transmission power level of the first subset of the TF resources based on the received first TPC indicator in the DCI and may adjust a transmission power level of the second subset of the TF resources based on the received second TPC indicator.

In certain representative embodiments, the WTRU 102 may receive transmission power muting information associated with the one or more TF resources to be muted such that the muting of the one or more TF resources is in accordance with the received transmission power muting information.

In certain representative embodiments, the received transmission power muting information may be any of (1) offset power information associated with the one or more TF resources indicating an offset from the current transmission power of the one or more TF resources; and/or (2) differential power information associated with the one or more TF resources indicating one or more differences between the transmission power of the one or more TF resources and other TF resources in a subframe.

In certain representative embodiments, the communication in the first direction may be a communication in a UL direction and the communication in the second direction may be a communication in a DL direction. For example, for a wireless mobile terminal, the wires mobile terminal may transmit in the UL direction and may receive in the DL direction.

In certain representative embodiments, the WTRU 102 may the communication in the first direction may be a communication in a DL direction and the communication in the second direction may be a communication in a UL direction.

In certain representative embodiments, the WTRU 102 is any of: a mobile terminal, a network access point, an evolved Node B (HeNB), Home eNB (HeNB), a Node B or a Home Node B (HNB), among others.

In certain representative embodiments, the WTRU 102 may receive an indication or report that any of: one or more RSs, one or more control channels, one or more REs and/or one or more RBs in the communication in the second direction are a priority In certain representative embodiments, The WTRU 102 may determine a corresponding TF location or TF locations associated with the one or more TF resources in the communication in the first direction to be mute based on the indication such that the muting of the one or more TF resources is at the corresponding TF location or TF locations for the communication in the first direction.

In certain representative embodiments, the WTRU 102 may receive the indication or the report (e.g., of the priorities) in the DCI.

In certain representative embodiments, the WTRU 102 may receive a channel index indicating a priority order for channels for communication in the first and/or second directions.

In certain representative embodiments, the WTRU 102 may receive an indicator indicating one or more subframes for the WTRU 102 to operate in full duplex mode.

In certain representative embodiments, the WTRU 102 may selectively operate in full duplex mode in the indicated one or more subframes such that the one or more subframes are configured for simultaneous transmission and reception of radio frequency (RF) signals.

In certain representative embodiments, whether a WTRU 102 operates in full duplex mode and/or the number of subframes of a WTRU 102 operating in full duplex mode is independent of the distance of the WTRU 102 to a NAP.

In certain representative embodiments, the WTRU 102 may mute one or more TF resources to reduce or substantially eliminate transmit/receive SINTF from the WTRU 102 and/or NINTF for the WTRU 102 among the WTRU 102 and one or more other devices.

In certain representative embodiments, the muting of the one or more TF resources may be based on one or more TF locations of a channel for communication in the second direction and/or one or more TF locations of a RS to be communicated in the second direction.

In certain representative embodiments, the RS to be communicated in the second direction may include any of: (1) a PSS and/or a SSS, (2) a PBCH, (3) a DL CRS 630 and/or (4) a DM-RS.

In certain representative embodiments, the WTRU 102 may determine whether a subframe is potentially a SINTF subframe and/or potentially a NINTF subframe, as a determined result such that the WTRU 102 may mute the one or more TF resources is in accordance with the determined result.

In certain representative embodiments, the WTRU 102 may establish a supportable SINTF level (SIL) indicating a level of signal interference supportable for full duplex operations.

In certain representative embodiments the WTRU 102 may control transmission power of the one or more TF resources so that a SIL does not exceed an interference level in accordance with the supportable SIL.

In certain representative embodiments, the WTRU 102 may report to a network resource any of: (1) a SINTF level (SIL); (2) a supportable SIL; (3) a difference between the SIL and the supportable SIL; (4) a maximum transmission power; (5) a maximum full duplex single carrier (FDSC) transmission power in the first direction for the WTRU 102 as a whole; (6) a maximum full duplex single carrier (FDSC) transmission power in the first direction for one or more individual or groups of channels in the first direction; (7) a transmission power for the WTRU 102 as a whole; (8) a transmission power for one or more individual or groups of channels in the first direction; (9) a difference between a transmission power and a maximum FDSC power in the first direction; (10) an indication as to whether the SIL is more than a threshold below the supportable SIL; and/or (11) an indication that the supportable SIL has been exceeded.

In certain representative embodiments, the WTRU 102 may set the supportable SIL as a function of any of: (1) a full duplex single carrier (FDSC) frequency of transmission/reception; (2) an actual frequency of transmission/reception; (3) a number and/or frequency location of RBs (4) a number and/or frequency location of the RBs of the transmission/reception; (5) properties of the FDSC; (6) a relative frequency location of the RBs and/or REs for WTRU transmission/reception; (7) a relative frequency location of the RBs and/or the REs, which are allocated for WTRU transmission/reception; (8) a number of WTRU antennas used for transmission/reception; (9) network resource transmission parameters; (10) a pathloss; (11) a channel type and/or types of the transmission/reception; (12) a type of RS that is used for transmission/reception; (13) an internal coupling loss of the WTRU 102; (14) a modulation and coding scheme (MCS) and/or a transport block size (TBS) to be applied; and/or (15) a quality criterion attached to a transmission.

In certain representative embodiments, the WTRU 102 may determine whether a subframe is used for MBSFN operations, as a determined result such that muting of the one or more TF resources is in accordance with the determined result.

In certain representative embodiments, the priority signaling may include any of (1) a DL synchronization channel; (2) a DL broadcast channel; (3) a DL RS, (4) a DL control channel; (5) a UL control channel; and/or (6) a UL RS.

In certain representative embodiments, the WTRU 102 may map a signal to a plurality of TF resources including the one or more TF resources to be muted and the WTRU 102 may puncture the mapped TF resources at TF locations associated with the one or more TF resources.

In certain representative embodiments, the WTRU 102 may rate-match to avoid mapping a plurality of TF resources at TF locations associated with the one or more TF resources to be muted.

In certain representative embodiments, the WTRU 102 may be controlled or configured to mute the one or more TF resources for communication in the first direction via messaging with a network resource or entity.

In certain representative embodiments, the WTRU 102 may determine a relative priority of a first signal for communication in the first direction relative to a second signal for communication in the second direction based on at least the information associated with the communication in the second direction.

In certain representative embodiments, the WTRU 102 may selectively mute the one or more TF resources of a plurality of TF resources for communication in the first direction based on the determined relative priority.

In certain representative embodiments, the WTRU 102 may determine a relative priority of the first and second signals correspond to respective ones of TF locations or to each TF location associated with the plurality of TF resources and may mute a respective TF resource responsive to the relative priority (e.g., determined relative priority) of the first signal at a corresponding TF location being lower than the second signal at the same corresponding TF location.

In certain representative embodiments, the WTRU 102 may mute perform subframe shortening to reduce interference levels.

In certain representative embodiments, the WTRU 102 may mute of one or more TF resources to reduce interference levels.

In certain representative embodiments, the WTRU 102 may dynamically or semi-statically configure a number of symbols of a region of TF resources in the second direction and may perform the muting of the one more TF resources in accordance with the configured number of the symbols of the region of TF resources for the communication in the second direction.

In certain representative embodiments, the WTRU 102 may receive an indication of a starting symbol 760 associated with a subframe for communication in the first direction.

In certain representative embodiments, the WTRU 102 may mute one or more symbols of the subframe that are to be communicated in the first direction located at a time prior to a time indicated by the starting symbol 760.

In certain representative embodiments, the indication of the starting symbol 760 may be expressly provided in signaling to the WTRU 102 or implicit based on characteristics of information received by the WTRU 102.

In certain representative embodiments, the WTRU 102 may mute of the one or more TF resources conditioned on any of: (1) a transmission power in the second direction being higher than a threshold; (2) a TBS of the one or more TF resources exceeding a threshold; (3) a MCS of the one or more TF resources exceeding a threshold; and/or (4) a redundancy version of the one or more TF resources exceeding a threshold.

In certain representative embodiments, the one or more TF resources may be a subset of a subframe.

In certain representative embodiments, the WTRU 102 may transmit muted TF resources or a subset of the muted TF resources in one or more different parts of the subframe for communication in the first direction.

In certain representative embodiments, the WTRU 102 may time and/or frequency shift the TF resources to be muted or instead of muting these TF resources for communication in the first direction.

In certain representative embodiments, The WTRU 102 may condition the muting of the one or more TF resources on the one or more TF resources being located in any of: (1) one or more particular TF locations; (2) one or more TF locations in a center portion of a frequency band; (3) one or more TF locations in an edge portion of the frequency band; (4) a particular subframe; (5) a subframe relative to signaling or an indication in an earlier subframe; (6) a particular symbol; and/or (7) a particular symbol relative to signaling or an indication in an earlier symbol.

In certain representative embodiments, the WTRU 102 may apply a zero transmission power, a low transmission power and/or an ABS, as an applied transmission power, to respective ones of TF resources in the first direction.

In certain representative embodiments, the WTRU 102 may measure an interference level for the second direction at TF locations associated with the applied transmission power at the respective ones of the TF resources.

In certain representative embodiments, the WTRU 102 may determine one or more priorities for the one or more TF resources associated with the communication in the first direction based on any of: (1) Quality of Service (QoS) parameters for one or more logical channels associated with the one or more TF resources; (2) a number of retransmissions associated with respective ones of the one or more TF resources for the communication in the first direction; and/or (3) whether respective ones of the one or more TF resources are for a retransmission of the communication in the first direction.

In certain representative embodiments, the WTRU 102, from received information, may determine or detect one or more priorities associated with TF resources at TF locations for communication in the second direction that correspond to the one or more TF resources associated with the communication in the first direction.

In certain representative embodiments the TF muting, the symbol muting and/or subframe shortening are based on a relative prior of the TF resources associated with a corresponding TF location for the communication in the first direction and for the communication in the second direction.

In certain representative embodiments, the WTRU 102 may receive, detect, obtain or determine the information associated with the communication in the second direction.

In certain representative embodiments, the WTRU 102 may obtain any of: a priority or a relative priority of signaling, of channels, of resources, of Resource Elements (REs), of Resource Blocks and/or of symbols and/or a list, an ordered list or an indication of priority signaling, of priority channels, of priority resources, of priority Resource Elements (REs), of priority Resource Blocks and/or of priority symbols.

In certain representative embodiments, the WTRU 102 may receive or set one or more subframes that are to include Full Duplex Radio Resources (FDRR).

In certain representative embodiments, the WTRU 102 may configure one or a plurality of subframes of the set subframes as one or more MBSFN subframes.

In certain representative embodiments, the WTRU 102 may adjust transmission power levels between or among subsets of the TF resources associated with the communication in the first direction to reduce or substantially eliminate interference to the communication in the second direction.

In certain representative embodiments, the WTRU 102 may reduce a power level to a zero power level or a non-zero power level which is sufficient to enable the communication in the second direction.

In certain representative embodiments, the WTRU 102 may configure the WTRU 102 to apply any of: respectively different power control loops, respectively different power control offsets, respectively different PCMAX values and/or respectively different $P_{CMAX,c}$ values for different TF resources associated with different TF regions.

In certain representative embodiments, the WTRU 102 may adjust a Modulation Coding Scheme (MCS) level of the first subset of the TF resources to any of: (1) a lower MCS level and/or (2) a lowest MCS level.

In certain representative embodiments, the WTRU 102 may receive, in the DCI, a first MCS level for a first subset of a plurality of TF resources and a second MCS level for a second subset of the plurality of TF resources.

In certain representative embodiments, the WTRU 102 may set a transmission power level of the first subset of the TF resources to a reduced level relative to a transmission power level of the second subset of the TF resources based on the received first and second MCS levels.

In certain representative embodiments, the WTRU 102 may set a MCS level of the first subset of the TF resources to the first MCS level and a MCS level of the second subset of the TF resources to the second MCS level based on the received first and second MCS levels.

In certain representative embodiments, the WTRU 102 may receive muting information related to power control that is associated with the one or more TF resources to be muted and the muting of the one or more TF resources may be in accordance with the received muting information related to the power control.

In certain representative embodiments, the received muting information related to power control may be any of (1) offset power information associated with the one or more TF resources indicating an offset from the current transmission power of the one or more TF resources; and/or (2) differential power information associated with the one or more TF resources indicating one or more differences between the transmission power of the one or more TF resources and other TF resources in a subframe.

In certain representative embodiments, the WTRU 102 may be any of: a mobile terminal, a network access point (NAP), an evolved Node B (eNB), a Home eNB (HeNB), a Node B, a Home Node B (HNB), or a relay node.

In certain representative embodiments, the WTRU 102 may receive, determine, or obtain a priority or a relative priority of any of: one or more RSs, one or more control channels, one or more REs and/or one or more RBs for the communication in the second direction.

In certain representative embodiments, the WTRU 102 may determine a corresponding TF location or TF locations associated with the one or more TF resources for the communication in the first direction to be muted based on the priority or the relative priority and the muting may include muting the one or more TF resources at the corresponding TF location or TF locations for the communication in the first direction.

In certain representative embodiments, the WTRU 102 may receive the priority or relative priority in an indication in the DCI.

In certain representative embodiments, the WTRU 102 may receive an indicator indicating one or more subframes for the WTRU 102 to use a full duplex operation.

In certain representative embodiments, the WTRU 102 may selectively use the full duplex operation in the indicated one or more subframes such that the one or more subframes may be configured for simultaneous transmission and reception of radio frequency (RF) signals.

In certain representative embodiments, an operation and/or number of subframes of the WTRU 102 using the full duplex operation may be independent of a distance of the WTRU 102 to its network access point.

In certain representative embodiments, the WTRU 102 may mute of the one or more TF resources based on one or more TF locations of a signal communicated in the second direction, one or more TF locations of a channel for communication in the second direction and/or one or more TF locations of a RS to be communicated in the second direction.

In certain representative embodiments, the signal, the RS or the channel may include any of: (1) a PSS and/or a SSS, (2) PBCH, (3) a DL CRS 630 and/or (4) a DM-RS.

In certain representative embodiments, the WTRU 102 may determine a relative priority of a first signal for communication in the first direction relative to a second signal for communication in the second direction based on at least the information associated with the communication in the second direction.

In certain representative embodiments, the WTRU 102 may selectively mute the one or more TF resources of a plurality of TF resources for communication in the first direction based on the determined relative priority.

In certain representative embodiments, the WTRU 102 may dynamically or semi-statically configure a number of symbols of a subframe for communication in the first direction.

In certain representative embodiments, the WTRU 102 may determine a starting symbol 760 associated with the subframe for communication in the first direction.

In certain representative embodiments, the WTRU 102 may mute one or more symbols of the subframe that are to be communicated in the first direction located at a time prior to a time of the starting symbol 760.

In certain representative embodiments, the WTRU 102 may mute the one or more TF resources conditioned on any of: (1) a transmission power in the first direction being higher than a threshold; (2) a Transport Block Size (TBS) of the one or more TF resources exceeding a threshold; (3) a Modulation and Coding Scheme (MCS) of the one or more TF resources exceeding a threshold; and/or (4) a redundancy version of the one or more TF resources exceeding a threshold.

In certain representative embodiments, the one or more TF resources may be a subset of a subframe, and the WTRU 102 may transmit one or more signals or RSs associated with the muted TF resources or a subset of the muted TF resources in one or more different parts of the subframe for communication in the first direction.

In certain representative embodiments, the WTRU 102 may time and/or frequency shift one or more signals or one or more RSs associated with the muted TF resources for communication in the first direction.

In certain representative embodiments, the WTRU 102 may apply zero transmission power, low transmission power and/or an ABS, as an applied transmission power reduction, to one or a plurality of TF resources in the first direction.

In certain representative embodiments, the WTRU 102 may measure an interference level for the second direction at TF locations associated with the applied TF resources.

In certain representative embodiments, the WTRU 102 may determine one or more priorities for the one or more TF resources associated with the communication in the first direction based on any of: (1) Quality of Service (QoS) parameters for one or more logical channels associated with the one or more TF resources; (2) a number of retransmissions associated with one or a plurality of the one or more TF resources for the communication in the first direction; and/or (3) whether one or a plurality of the one or more TF resources are for a retransmission of the communication in the first direction.

In certain representative embodiments, the WTRU 102 may determine or detect one or more priorities associated with TF resources at TF locations for communication in the second direction that correspond to the one or more TF resources associated with the communication in the first direction.

In certain representative embodiments, the WTRU 102 may, the TF muting, the symbol muting and/or the subframe shortening may be based on a relative priority of the TF resources associated with a corresponding TF location for the communication in the first direction and the communication in the second direction.

FIG. 24 is a diagram illustrating an additional representative method 2400 implemented in a WTRU 102 using one or a plurality of subframes for communications in first and second directions.

Referring to FIG. 24, the representative method 2400 may include, at block 2410, the WTRU 102 being configured for shortening of a subframe for communication in the first direction based on information associated with a communication in the second direction.

In certain representative embodiments, the WTRU 102 may receive the communication in the second direction and may detect or determine the information associated with the communication in the second direction.

In certain representative embodiments, the WTRU 102 may obtain any of: a list, an ordered list or an indication of priority signaling, of priority channels, of priority resources, of priority Resource Elements (REs), of priority Resource Blocks and/or priority symbols.

In certain representative embodiments, the WTRU 102 may be configured to receive at least a portion of the communication in the second direction while transmitting at least a portion of the communication in the first direction.

In certain representative embodiments, the WTRU 102 may establish time intervals in which the communications in the first and second directions: (1) overlap in frequency and/or (2) a first frequency or a first frequency band of the communication in the first direction is within a threshold of a second frequency or a second frequency band of the communication in the second direction. For example, the WTRU 102 may be configured or may configure itself to enable FDR operations.

In certain representative embodiments, the WTRU 102 may set one or more subframes that are to include Full Duplex Resources (FDR). For example, the WTRU 102 may set the FDR subframes based on information from a Network Access Point (NAP) (e.g., a HeNB or eNB 160 or other access point device).

In certain representative embodiments the WTRU 102 may set the one or more subframe as one or more MBSFN subframes.

In certain representative embodiments, the shortened subframe may include one or more symbols which are muted.

In certain representative embodiments, the communication in the first direction may be a communication in a UL direction and the communication in the second direction may be a communication in a DL direction. For example, for a wireless mobile terminal, the wires mobile terminal may transmit in the UL direction and may receive in the DL direction.

In certain representative embodiments, the WTRU 102 may receive an indicator indicating one or more subframes for the WTRU 102 to operate in full duplex mode.

In certain representative embodiments, the WTRU 102 may selectively operate in full duplex mode in the indicated one or more subframes such that the one or more subframes are configured for simultaneous transmission and reception of radio frequency (RF) signals.

In certain representative embodiments, whether a WTRU 102 operates in full duplex mode and/or the number of subframes of a WTRU 102 operating in full duplex mode is independent of the distance of the WTRU 102 to a NAP.

In certain representative embodiments, the WTRU 102 may shorten one or more subframes to reduce or substantially eliminate transmit/receive SINTF from the WTRU 102 and/or NINTF for the WTRU 102 among the WTRU 102 and one or more other devices.

In certain representative embodiments, the RS to be communicated in the second direction may include any of: (1) primary and secondary synchronization signals (PSS/SSS), (2) a physical broadcast channel (PBCH), (3) a DL CRS 630 and/or (4) a Demodulation-RS (DM-RS).

In certain representative embodiments, the WTRU 102 may report to a network resource any of: (1) a SINTF level (SIL); (2) a supportable SIL; (3) a difference between the SIL and the supportable SIL; (4) a maximum transmission power; (5) a maximum full duplex single carrier (FDSC) transmission power in the first direction for the WTRU 102 as a whole; (6) a maximum full duplex single carrier (FDSC) transmission power in the first direction for one or more individual or groups of channels in the first direction; (7) a transmission power for the WTRU 102 as a whole; (8) a transmission power for one or more individual or groups of channels in the first direction; (9) a difference between a transmission power and a maximum FDSC power in the first direction; (10) an indication as to whether the SIL is more than a threshold below the supportable SIL; and/or (11) an indication that the supportable SIL has been exceeded.

In certain representative embodiments, the priority signaling may include any of: (1) a DL synchronization channel; (2) a DL broadcast channel; (3) a DL RS, (4) a DL control channel; (5) a UL control channel; and/or (6) a UL RS.

In certain representative embodiments, the WTRU 102 may mute of one or more TF resources to reduce interference levels.

In certain representative embodiments, the WTRU 102 may apply a zero transmission power, a low transmission power and/or an ABS, as an applied transmission power, to respective ones of TF resources in the first direction.

In certain representative embodiments, the WTRU 102 may measure an interference level for the second direction at TF locations associated with the applied transmission power at the respective ones of the TF resources.

In certain representative embodiments, the WTRU 102, from received information, may determine or detect one or more priorities associated with TF resources at TF locations for communication in the second direction that correspond to the one or more TF resources associated with the communication in the first direction.

In certain representative embodiments the TF muting, the symbol muting and/or subframe shortening are based on a relative prior of the TF resources associated with a corresponding TF location for the communication in the first direction and for the communication in the second direction.

In certain representative embodiments, the WTRU 102 may receive, detect, obtain or determine the information associated with the communication in the second direction.

In certain representative embodiments, the WTRU 102 may obtain any of: a priority or a relative priority of signaling, of channels, of resources, of Resource Elements (REs), of Resource Blocks and/or of symbols and/or a list, an ordered list or an indication of priority signaling, of priority channels, of priority resources, of priority Resource Elements (REs), of priority Resource Blocks and/or of priority symbols.

In certain representative embodiments, the WTRU 102 may receive or set one or more subframes that arc to include Full Duplex Radio Resources (FDRR).

In certain representative embodiments, the WTRU 102 may configure one or a plurality of subframes of the set subframes as one or more MBSFN subframes.

In certain representative embodiments, the WTRU 102 may receive an indicator indicating one or more subframes for the WTRU 102 to use a full duplex operation.

In certain representative embodiments, the WTRU 102 may selectively use the full duplex operation in the indicated one or more subframes such that the one or more subframes may be configured for simultaneous transmission and reception of radio frequency (RF) signals.

In certain representative embodiments, an operation and/or number of subframes of the WTRU 102 using the full duplex operation may be independent of a distance of the WTRU 102 to its network access point.

FIG. 25 is a diagram illustrating a further representative method 2500 implemented in a WTRU 102 using time-frequency (TF) resources in first and second directions.

Referring to FIG. 25, at block 2510, the WTRU 102 may obtain information associated with communication in the second direction indicating a SINTF condition, a potential SINTF condition, a neighboring interference condition or a potential neighboring interference condition. At block 2520, the WTRU 102 may configure the WTRU 102 (e.g., itself or a WTRU) for an interference avoiding TF resource structure on condition that the information associated with communication in the second direction indicates any of: the self-interference condition, the potential SINTF condition, the neighboring interference condition and/or the potential neighboring interference condition the self-interference condition or the neighboring interference condition.

In certain representative embodiments, the SINTF condition may indicate interference between TF resources for transmission in the first direction from the WTRU 102 and priority TF resources for reception in the second direction by the WTRU 102.

In certain representative embodiments, the neighboring interference condition may indicate interference between or among TF resources for transmission in the first direction from the WTRU 102 and priority TF resources from one or more other WTRUs 102 for interference (e.g., reception) in the second direction by the WTRU 102.

In certain representative embodiments, the SINTF condition may indicate interference between TF resources for transmission in the first direction from the WTRU 102 and priority TF resources for reception in the second direction by the WTRU 102 and the neighboring interference condition may indicate interference between or among TF resources for transmission in the first direction from the WTRU 102 and priority TF resources for reception in the second direction by one or more other WTRUs 102.

In certain representative embodiments, the WTRU 102 may combination any of the RE muting, symbol muting and/or subframe shortening procedures or methods to further reduce the effect of interference.

FIG. 26 is a diagram illustrating a representative method 2600 implemented Network Access Point (NAP) in communication with a WTRU 102 using time-frequency (TF) resources for communications in first and second directions.

Referring to FIG. 26, at block 2610, the NAP may determine whether to TF mute, symbol mute, and/or subframe shorten a communication in the first direction for controlling interference between the communication in the first direction and a communication in the second direction. At block 2620, the NAP may send configuration information for the WTRU 102 to TF mute, symbol mute and/or subframe shorten one or more TF resources, one or more symbols and/or one or more subframes for communication in the first direction.

In certain representative embodiments, the NAP may send a configuration to the WTRU 102 to enable the WTRU 102 to receive at least a portion of the communication in the second direction while transmitting at least a portion of the communication in the first direction.

In certain representative embodiments, the NAP may send an indication of one or more subframes that are to include Full Duplex Resources (FDR).

In certain representative embodiments, the NAP may send in a grant or DCI, the configuration information for the WTRU 102 to apply any of: (1) respectively different power control loops, respectively different power control offsets and/or respectively different $P_{CMAX}$ values for different TF resources associated with different TF regions.

In certain representative embodiments, the NAP may send the configuration information which may include any of: (1) a fixed rank indicated from DCI for a first subset of TF resources; and/or (2) a first rank indicated from the DCI for the first subset of TF resources that is smaller than a second rank for a second subset of TF resources.

In certain representative embodiments, the NAP may send the DCI that may indicate an offset for the first rank from the second rank.

In certain representative embodiments, the NAP may send in the DCI a first modulation order for a first subset of a plurality of TF resources and a second modulation order for a second subset of the plurality of TF resources to set for the WTRU 102 a transmission power level of the first subset of the TF resources to a reduced level relative to a transmission power level of the second subset of the TF resources based on the received first and second modulation orders in the DCI and to set a modulation order of the first subset of the TF resources to the first modulation order and a modulation order of the second subset of TF resources to the second modulation order.

In certain representative embodiments, the NAP may send in the DCI a first transmission power control (TPC) indicator associated with a first subset of the TF resources and a second TPC indicator associated with a second subset of the TF resources to individually adjust a transmission power level of the first and second subsets of the TF resources.

In certain representative embodiments, the NAP may send transmission power muting information associated with the one or more TF resources to be muted.

In certain representative embodiments, the NAP may send an indication or report that any of: one or more RSs, one or more control channels, one or more REs and/or one or more RBs for the communication in the second direction are a priority.

In certain representative embodiments, the NAP may send a channel index indicating a priority order for channels for communication in the first and/or second directions.

In certain representative embodiments, the NAP may send an indicator indicating one or more subframes for the WTRU 102 to operate in full duplex mode.

In certain representative embodiments, the NAP may receive from the WTRU 102 by the NAP, a report indicating any of: (1) a SINTF level (SIL) of the WTRU 102; (2) a supportable SIL of the WTRU 102; (3) a difference between the SIL and the supportable SIL; (4) a maximum transmission power; (5) a maximum full duplex single carrier (FDSC) transmission power in the first direction for the WTRU 102 as a whole; (6) a maximum full duplex single carrier (FDSC) transmission power in the first direction for one or more individual or groups of channels in the first direction; (7) a transmission power for the WTRU 102 as a whole; (8) a transmission power for one or more individual or groups of channels in the first direction; (9) a difference between a transmission power and a maximum FDSC power in the first direction; (10) an indication as to whether the SIL is more than a threshold below the supportable SIL; and/or (11) an indication that the supportable SIL has been exceeded.

In certain representative embodiments, the NAP may send an indication of a starting symbol 760 associated with a subframe for communication in the first direction to configure the WTRU 102 for muting one or more symbols of a subframe that arc to be communicated in the first direction located at a time prior to a time indicated by the starting symbol 760.

In certain representative embodiments, the NAP may determine, set and/or establish one or more priorities for the one or more TF resources associated with the communication in the first direction based on any of: (1) Quality of Service (QoS) parameters for one or more logical channels associated with the one or more TF resources; (2) a number of retransmissions associated with respective ones of the one or more TF resources for the communication in the first direction; and/or (3) whether respective ones of the one or more TF resources are for a retransmission of the communication in the first direction.

In certain representative embodiments, the configuration information may include an indication to selectively TF mute, selectively symbol mute and/or selectively subframe shorten the one or more TF resources, the one or more symbols and/or the one or more subframes based on a relative priority of any of: one or more signals, one or more channels, one or more RBs, one or more REs and/or one more symbols.

In certain representative embodiments, the NAP may send an indication of one or more subframes that are to include Full Duplex Radio Resources (FDRR).

In certain representative embodiments, the NAP may send the configuration information to enable the WTRU 102 to apply any of: respectively different power control loops, respectively different power control offsets, respectively different PCMAX values and/or respectively different $P_{CMAX,c}$ values for different TF resources associated with different TF regions.

In certain representative embodiments, the NAP may send, in DCI, a first Modulation and Coding Scheme (MCS) level for a first subset of a plurality of TF resources and a second MCS level for a second subset of the plurality of TF resources for the WTRU 102 to set a transmission power level of the first subset of the TF resources to a reduced level relative to a transmission power level of the second subset of the TF resources based on the received first and second MCS levels and to set a MCS level of the first subset of the TF resources to the first MCS level and a MCS level of the second subset of TF resources to the second MCS level based on the received first and second MCS levels.

In certain representative embodiments, the NAP may send muting information related to power control associated with the one or more TF resources to be muted.

In certain representative embodiments, the NAP may send an indicator indicating one or more subframes for the WTRU 102 to use a full duplex operation.

In certain representative embodiments, the NAP may determine or establish one or more priorities for the one or more TF resources associated with the communication in the first direction based on any of: (1) Quality of Service (QoS) parameters for one or more logical channels associated with the one or more TF resources; (2) a number of retransmissions associated with one or a plurality of the one or more TF resources for the communication in the first direction; and/or (3) whether one or a plurality of the one or more TF resources arc for a retransmission of the communication in the first direction.

Representative Embodiments

In representative embodiment 1, a method implemented in a Wireless Transmit/Receive Unit (WTRU) using time-frequency (TF) resources for communications in first and second directions may comprise TF resource muting or symbol muting, by the WTRU, one or more TF resources for communication in the first direction based on information associated with a communication in the second direction or subframe shortening, by the WTRU, one or more TF resources for communication in the first direction based on information associated with a communication in the second direction.

In representative embodiment 2, a method implemented in a Wireless Transmit/Receive Unit (WTRU) using time-frequency (TF) resources for communication in first and second directions may comprise configuring the WTRU for muting one or more TF resources for communication in the first direction based on information associated with a communication in the second direction.

In representative embodiment 3, a method implemented in a Wireless Transmit/Receive Unit (WTRU) using a one or a plurality of subframes for communications in first and second directions may comprise configuring the WTRU for shortening of a subframe for communication in the first direction based on information associated with a communication in the second direction.

In representative embodiment 4, the method of any one of the preceding embodiments may further comprise: receiving, detecting, obtaining or determining, by the WTRU, the information associated with the communication in the second direction.

In representative embodiment 5, the method of representative embodiment 4, wherein the receiving, the detecting, the obtaining or the determining of the information associated with the communication in the second direction may include obtaining any of: a priority or a relative priority of signaling, of channels, of resources, of Resource Elements (REs), of Resource Blocks and/or of symbols and/or a list, an ordered list or an indication of priority signaling, of priority channels, of priority resources, of priority Resource Elements (REs), of priority Resource Blocks and/or of priority symbols.

In representative embodiment 6, the method of any one of the preceding representative embodiments may further comprise configuring the WTRU to receive at least a portion of the communication in the second direction while transmitting at least a portion of the communication in the first direction.

In representative embodiment 7, the method of representative embodiment 6, wherein the configuring of the WTRU to receive at least the portion of the communication in the second direction while transmitting at least the portion of the communication in the first direction may include establishing time intervals in which the communications in the first and second directions: (1) overlap in frequency and/or (2) a first frequency or a first frequency band of the communication in the first direction is within a threshold of a second frequency or a second frequency band of the communication in the second direction.

In representative embodiment 8, the method of any one of the preceding representative embodiments, may further comprises receiving or setting one or more subframes that are to include Full Duplex Radio Resources (FDRRs).

In representative embodiment 9, the method of representative embodiment 8, wherein the setting of the one or more subframes may include configuring one or a plurality of subframes of the set subframes as one or more multimedia broadcast multicast service single frequency network (MBSFN) subframes.

In representative embodiment 10, the method of any one of representative embodiments 1-2 and 4-9, wherein the one or more TF resources may include any of: (1) one or more Resource Elements (REs), one or more Resource Blocks (RBs), and/or (3) one or more symbols.

In representative embodiment 11, the method of any one of representative embodiments 1, 3-10, wherein the shortened subframe may include one or more symbols which are muted.

In representative embodiment 12, the method of any one of representative embodiments 1-2 and 4-11, wherein the muting of the one or more TF resources may include muting of the one or more TF resources via any of: (1) a blanking operation; (2) a puncturing operation; (3) a rate matching operation; and/or (4) a transmission power control operation.

In representative embodiment 13, the method of any one of representative embodiments 1-2 and 4-12, wherein the muting of the one or more TF resources may include adjusting transmission power levels between or among subsets of the TF resources associated with the communication in the first direction to reduce or substantially eliminate interference to the communication in the second direction.

In representative embodiment 14, the method of representative embodiment 13, wherein the adjusting of the transmission power level may reduce a power level to a zero power level or a non-zero power level which is sufficient to enable the communication in the second direction.

In representative embodiment 15, the method of any one of representative embodiments 1-2 and 4-14 may further comprise configuring the WTRU to apply any of: respectively different power control loops, respectively different power control offsets, respectively different $P_{CMAX}$ values and/or respectively different $P_{CMAX,c}$ values for different TF resources associated with different TF regions.

In representative embodiment 16, the method of any one of representative embodiments 1-2 and 4-15, wherein the muting of the TF resources may include setting a transmission power level of a first subset of the TF resources to a reduced level relative to a transmission power level of a second subset of the TF resources.

In representative embodiment 17, the method of representative embodiment 16, wherein the setting of the transmission power level may include adjusting a Modulation Coding Scheme (MCS) level of the first subset of the TF resources to any of: (1) a lower MCS level and/or (2) a lowest MCS level.

In representative embodiment 18, the method of any one of representative embodiments 1-2 and 4-17, wherein the muting of the one or more TF resources may include: receiving, in downlink control information (DCI), a first MCS level for a first subset of a plurality of TF resources and a second MCS level for a second subset of the plurality of TF resources; setting a transmission power level of the first subset of the TF resources to a reduced level relative to a transmission power level of the second subset of the TF resources based on the received first and second MCS levels; and setting a MCS level of the first subset of the TF resources to the first MCS level and a MCS level of the second subset of the TF resources to the second MCS level based on the received first and second MCS levels.

In representative embodiment 19, the method of representative embodiment 18, wherein the reduced level may be a zero power level or a non-zero power level which is sufficient to enable the communication in the second direction.

In representative embodiment 20, the method of representative embodiment 16 may further comprises: receiving, in downlink control information (DCI), a first transmission power control (TPC) indicator associated with the first subset of the TF resources and a second TPC indicator associated with the second subset of the TF resources; adjusting the transmission power level of the first subset of the TF resources based on the received first TPC indicator; and adjusting the transmission power level of the second subset of the TF resources based on the received second TPC indicator.

In representative embodiment 21, the method of any one of representative embodiments 1-2 and 4-20 may further comprise: receiving, by the WTRU, muting information related to power control that is associated with the one or more TF resources to be muted, wherein the muting of the one or more TF resources may be in accordance with the received muting information related to the power control.

In representative embodiment 22, the method of representative embodiment 21, wherein the received muting information related to power control may be any of: (1) offset power information associated with the one or more TF resources indicating an offset from the current transmission power of the one or more TF resources; and/or (2) differential power information associated with the one or more TF resources indicating one or more differences between the transmission power of the one or more TF resources and other TF resources in a subframe.

In representative embodiment 23, the method of any one of the preceding representative embodiments, wherein the communication in the first direction may be a communication in an uplink direction and the communication in the second direction may be a communication in a downlink direction.

In representative embodiment 24, the method of any one of representative embodiments 1-2 and 4-22, wherein the communication in the first direction may be a communication in a downlink direction and the communication in the second direction may be a communication in an uplink direction.

In representative embodiment 25, the method of any one of representative embodiments 1-2 and 4-24, wherein the WTRU may be any of a mobile terminal, a network access point (NAP), an evolved Node B (eNB), a Home eNB (HeNB), a Node B, a Home Node B (HNB), or a relay node.

In representative embodiment 26, the method of any one of representative embodiments 1-2 and 4-25 may further comprise: receiving, determining, or obtaining a priority or a relative priority of any of: one or more Demodulation Reference Signals, one or more control channels, one or more resource elements and/or one or more Resource Blocks for the communication in the second direction; and determining a corresponding TF location or TF locations associated with the one or more TF resources for the communication in the first direction to be muted based on the priority or the relative priority, wherein the muting may include muting the one or more TF resources at the corresponding TF location or TF locations for the communication in the first direction.

In representative embodiment 27, the method of representative embodiment 26, wherein the receiving of the priority or relative priority may include receiving an indication in downlink control information (DCI).

In representative embodiment 28, the method of any one of the preceding representative embodiments may further comprise: receiving an indicator indicating one or more subframes for the WTRU to use a full duplex operation; and selectively using, by the WTRU, the full duplex operation in the indicated one or more subframes such that the one or more subframes are configured for simultaneous transmission and reception of radio frequency (RF) signals.

In representative embodiment 29, the method of any one of the preceding representative embodiments, wherein an operation and/or a number of subframes of the WTRU using the full duplex operation may be independent of a distance of the WTRU to its network access point.

In representative embodiment 30, the method of any one of representative embodiments 1-2 and 4-29, wherein the muting of the one or more TF resources may reduce or substantially eliminate transmit/receive self-interference from the WTRU and/or neighbor interference for the WTRU between or among the WTRU and one or more other devices.

In representative embodiment 31, the method of any one of representative embodiments 1 and 3-30, wherein the shortening of the one or more subframes may reduce or substantially eliminate transmit/receive self-interference from the WTRU and/or neighbor interference for the WTRU between or among the WTRU and one or more other devices.

In representative embodiment 32, the method of any one of representative embodiments 1-2 and 4-31, wherein the muting of the one or more TF resources may be based on one or more TF locations of a signal communicated in the second direction, one or more TF locations of a channel for communication in the second direction and/or one or more TF locations of a reference signal (RS) to be communicated in the second direction.

In representative embodiment 33, the method of representative embodiment 32, wherein the signal, the RS or the channel may include any of: (1) primary and secondary synchronization signals (PSS/SSS), (2) a physical broadcast channel (PBCH), (3) a cell-specific RS (CRS) and/or (4) a Demodulation-RS (DM-RS).

In representative embodiment 34, the method of any one of representative embodiments 1-2 and 4-33 may further comprise: determining whether a subframe is potentially a self-interference subframe and/or potentially a neighbor-interference subframe, as a determined result, wherein the muting of the one or more TF resources may be in accordance with the determined result.

In representative embodiment 35, the method of any one of representative embodiments 1-2 and 4-34 may further comprise: establishing a supportable self-interference level (SIL) indicating a level of signal interference supportable for full duplex operations; and controlling transmission power of the one or more TF resources such that a SIL does not exceed an interference level in accordance with the supportable SIL.

In representative embodiment 36, the method of any one of representative embodiments 1-2 and 4-35 may further comprise: determining whether a subframe is to be used for MBSFN operations, as a determined result, wherein the muting of the one or more TF resources may be in accordance with the determined result.

In representative embodiment 37, the method of representative embodiment 5, wherein the priority signaling may include any of: (1) a downlink (DL) synchronization channel; (2) a DL broadcast channel; (3) a DL reference signal; (4) a DL control channel; (5) a UL control channel; and/or (6) a UL reference signal.

In representative embodiment 38, the method of any one of representative embodiments 1-2 and 4-37 may further comprise mapping a signal to a plurality of TF resources including the one or more TF resources to be muted, wherein the muting of the one or more TF resources for communication in the first direction may include puncturing the mapped TF resources at TF locations associated with the one or more TF resources.

In representative embodiment 39, the method of any one of representative embodiments 1-2 and 4-38, wherein the muting of one or more TF resources for communication in the first direction may include rate-matching so as to avoid mapping a plurality of TF resources at TF locations associated with the one or more TF resources to be muted.

In representative embodiment 40, the method of any one of representative embodiments 1-2 and 4-39, wherein the muting of one or more TF resources for communication in the first direction may be configured via messaging with a network resource.

In representative embodiment 41, the method of any one of representative embodiments 1-2 and 4-40, wherein the muting of one or more TF resources for communication in the first direction may include: determining a relative priority of a first signal for communication in the first direction relative to a second signal for communication in the second direction based on at least the information associated with the communication in the second direction; and selectively muting the one or more TF resources of a plurality of TF resources for communication in the first direction based on the determined relative priority.

In representative embodiment 42, the method of any one of representative embodiments 1-2 and 4-41, wherein the muting of the one or more TF resources may include subframe shortening to reduce interference levels.

In representative embodiment 43, the method of any one of representative embodiments 1, and 3-42, wherein the shortening of the subframe may include muting of the one or more TF resources to reduce interference levels.

In representative embodiment 44, the method of any one of representative embodiments 1-2 and 4-43, wherein the muting of the one or more TF resources may include dynamically or semi-statically configuring a number of symbols of a subframe for communication in the first direction.

In representative embodiment 45, the method of any one of representative embodiments 1-2 and 4-44, wherein the dynamically or semi-statically configuring of the number of symbols may include: determining a starting symbol associated with the subframe for communication in the first direction; and muting one or more symbols of the subframe that are to be communicated in the first direction located at a time prior to a time of the starting symbol.

In representative embodiment 46, the method of any one of representative embodiments 1-2 and 4-45, wherein the muting of the one or more TF resources may be conditioned on any of: (1) a transmission power in the first direction being higher than a threshold; (2) a Transport Block Size (TBS) of the one or more TF resources exceeding a threshold; (3) a Modulation and Coding Scheme (MCS) of the one or more TF resources exceeding a threshold; and/or (4) a redundancy version of the one or more TF resources exceeding a threshold.

In representative embodiment 47, the method of any one of representative embodiments 1-2 and 4-46, wherein the one or more TF resources may be a subset of a subframe, the method may further comprise transmitting one or more signals or reference signals (RSs) associated with the muted TF resources or a subset of the muted TF resources in one or more different parts of the subframe for communication in the first direction.

In representative embodiment 48, the method of any one of representative embodiments 1-2 and 4-47 may further comprise time and/or frequency shifting one or more signals or one or more reference signals (RSs) associated with the muted TF resources for communication in the first direction.

In representative embodiment 49, the method of any one of representative embodiments 1-2 and 4-48, wherein the muting of the one or more TF resources may be conditioned on: the one or more TF resources being located in any of: (1) one or more particular TF locations; (2) one or more TF locations in a center portion of a frequency band; (3) one or more TF locations in an edge portion of the frequency band; (4) a particular subframe; (5) a subframe relative to signaling or an indication in an earlier subframe; (6) a particular symbol; and/or (7) a particular symbol relative to signaling or an indication in an earlier symbol.

In representative embodiment 50, the method of any one of the preceding representative embodiments may further comprise: applying zero transmission power, low transmission power and/or an almost blank subframe (ABS), as an applied transmission power reduction, to one or a plurality of TF resources in the first direction; and measuring an interference level for the second direction at TF locations associated with the applied TF resources.

In representative embodiment 51, the method of any one of representative embodiments 1-2 and 4-50 may further comprise determining one or more priorities for the one or more TF resources associated with the communication in the first direction based on any of: (1) Quality of Service (QoS) parameters for one or more logical channels associated with the one or more TF resources; (2) a number of retransmissions associated with one or a plurality of the one or more TF resources for the communication in the first direction; and/or (3) whether one or a plurality of the one or more TF resources are for a retransmission of the communication in the first direction.

In representative embodiment 52, the method of any one of the preceding representative embodiments may further comprise determining or detecting one or more priorities associated with TF resources at TF locations for communication in the second direction that correspond to the one or more TF resources associated with the communication in the first direction, wherein the TF muting, the symbol muting and/or the subframe shortening may be based on a relative priority of the TF resources associated with a corresponding TF location for the communication in the first direction and the communication in the second direction.

In representative embodiment 53, a method implemented in a Wireless Transmit/Receive Unit (WTRU) may comprise: obtaining information associated with communication in the second direction indicating a self-interference condition, a potential self-interference condition, a neighboring interference condition or a potential neighboring interference condition; and configuring the WTRU for an interference avoiding TF resource structure on condition that the information associated with communication in the second direction indicates any of: the self-interference condition, the potential self-interference condition, the neighboring interference condition and/or the potential neighboring interference condition.

In representative embodiment 54, the method of representative embodiment 53, wherein: the self-interference condition may indicate interference between TF resources for transmission in the first direction from the WTRU and priority TF resources for reception in the second direction by the WTRU; and the neighboring interference condition may indicate interference between or among TF resources for transmission in the first direction from the WTRU and priority TF resources for reception in the second direction by one or more other WTRUs.

In representative embodiment 55, the method of any of the preceding representative embodiments may use any combination of TF muting, symbol muting and subframe shortening.

In representative embodiment 56, a method implemented by a Network Access Point (NAP) in communication with a Wireless Transmit/Receive Unit (WTRU) using time-frequency (TF) resources for communications in first and second directions may comprise: determining whether to TF mute, symbol mute, and/or subframe shorten a communication in the first direction for controlling interference between the communication in the first direction and a communication in the second direction, and sending, by the NAP, configuration information for the WTRU to TF mute, symbol mute and/or subframe shorten one or more TF resources, one or more symbols and/or one or more subframes for communication in the first direction.

In representative embodiment 57, the method of representative embodiment 56, wherein the configuration information may include an indication to selectively TF mute, selectively symbol mute and/or selectively subframe shorten the one or more TF resources, the one or more symbols and/or the one or more subframes based on a relative priority of any of: one or more signals, one or more channels, one or more RBs, one or more REs and/or one more symbols.

In representative embodiment 58, the method of any one of representative embodiments 56 or 57 may further comprise sending, by the NAP, an indication of one or more subframes that are to include Full Duplex Radio Resources (FDRRs).

In representative embodiment 59, the method of any one of representative embodiments 56-58, wherein the sending of the configuration information may enable the WTRU to apply any of: respectively different power control loops, respectively different power control offsets, respectively different $P_{CMAX}$ values and/or respectively different $P_{CMAX,c}$ values for different TF resources associated with different TF regions.

In representative embodiment 60, the method of any one of representative embodiments 56-59, wherein the configuration information may include any of: (1) a fixed rank indicated from downlink control information (DCI) for a first subset of TF resources; and/or (2) a first rank indicated from the DCI for the first subset of TF resources that is smaller than a second rank for a second subset of TF resources.

In representative embodiment 61, the method of embodiment 60, wherein the DCI may indicate an offset for the first rank from the second rank.

In representative embodiment 62, the method of any one of representative embodiments 56-61, wherein the sending of the configuration information may include sending, in downlink control information (DCI), a first Modulation and Coding Scheme (MCS) level for a first subset of a plurality of TF resources and a second MCS level for a second subset of the plurality of TF resources for the WTRU to set a transmission power level of the first subset of the TF resources to a reduced level relative to a transmission power level of the second subset of the TF resources based on the received first and second MCS levels and to set a MCS level of the first subset of the TF resources to the first MCS level and a MCS level of the second subset of TF resources to the second MCS level based on the received first and second MCS levels.

In representative embodiment 63, the method of any one of representative embodiments 56-62, wherein the sending of the configuration information may include sending, in downlink control information (DCI), a first transmission power control (TPC) indicator associated with a first subset of the TF resources and a second TPC indicator associated with a second subset of the TF resources to individually adjust a transmission power level of the first and second subsets of the TF resources.

In representative embodiment 64, the method of any one of embodiments 56-63, wherein the sending of the configuration information may include sending muting information related to power control associated with the one or more TF resources to be muted.

In representative embodiment 65, the method of any one of representative embodiments 56-64, wherein the sending of the configuration information may include sending an indication that any of: one or more reference signals, one or more control channels, one or more resource elements and/or one or more Resource Blocks in the communication in the second direction are a priority.

In representative embodiment 66, the method of any one of representative embodiments 56-65, wherein the sending of the configuration information may include sending an indicator indicating one or more subframes for the WTRU to use a full duplex operation.

In representative embodiment 67, the method of any one of representative embodiments 56-66, wherein the sending of the configuration information may include sending an indication of a starting symbol associated with a subframe for communication in the first direction to configure the WTRU for muting one or more symbols of the subframe that are to be communicated in the first direction located at a time prior to a time indicated by the starting symbol.

In representative embodiment 68, the method of any one of representative embodiments 56-67 may further comprise determining or establishing, by the NAP, one or more priorities for the one or more TF resources associated with the communication in the first direction based on any of: (1) Quality of Service (QoS) parameters for one or more logical channels associated with the one or more TF resources; (2) a number of retransmissions associated with one or a plurality of the one or more TF resources for the communication in the first direction; and/or (3) whether one or a plurality of the one or more TF resources are for a retransmission of the communication in the first direction.

In representative embodiment 69, a Wireless Transmit/Receive Unit (WTRU) configured to use time-frequency (TF) resources for communication in first and second directions may comprises: a full duplex transmitter/receiver unit configured to transmit and receive full duplex communications; and a processor configured to TF resource mute or symbol mute one or more TF resources for communication in the first direction based on information associated with a communication in the second direction or subframe shorten one or more TF resources for communication in the first direction based on information associated with a communication in the second direction.

In representative embodiment 70, a Wireless Transmit/Receive Unit (WTRU) configured to use time-frequency (TF) resources for communications in first and second directions may comprise a processor configured to mute one or more TF resources for communication in the first direction based on information associated with a communication in the second direction.

In representative embodiment 71, a Wireless Transmit/Receive Unit (WTRU) configured to use one or a plurality of subframes for communications in first and second directions may comprise a processor configured to shorten a subframe for communication in the first direction based on information associated with a communication in the second direction.

In representative embodiment 72, the WTRU of any one of representative embodiment 69 to 71, wherein: the full duplex transmitter/receiver unit may be configured to receive the information associated with the communication in the second direction; and the processor may be configured to detect, obtain or determine the information associated with the communication in the second direction.

In representative embodiment 73, the WTRU of representative embodiment 72, wherein the full duplex transmitter/receiver unit and the processor may be configured to obtain any of: a priority or a relative priority of signaling, of channels, of resources, of Resource Elements (REs), of Resource Blocks and/or of symbols and/or a list, an ordered list or an indication of priority signaling, of priority channels, of priority resources, of priority Resource Elements (REs), of priority Resource Blocks and/or of priority symbols.

In representative embodiment 74, the WTRU of any one of representative embodiments 69-73, wherein the full duplex transmitter/receiver unit may be configured to receive at least a portion of the communication in the second direction while transmitting at least a portion of the communication in the first direction.

In representative embodiment 75, the WTRU of representative embodiment 73, wherein the processor may be configured to establish time intervals in which the communications in the first and second directions: (1) overlap in frequency and/or (2) a first frequency or a first frequency band of the communication in the first direction is within a threshold of a second frequency or a second frequency band of the communication in the second direction.

In representative embodiment 76, the WTRU of any one of the representative embodiments 69-75, wherein: the processor may be configured to establish one or more subframes that are to include Full Duplex Radio Resources (FDRRs); and the full duplex transmitter/receiver unit may be configured to receive the one or more subframes that are to include the FDRRs.

In representative embodiment 77, the WTRU of representative embodiment 76, wherein the processor may be configured to configure one or a plurality of subframes of the set subframes as one or more multimedia broadcast multicast service single frequency network (MBSFN) subframes.

In representative embodiment 78 the WTRU of any one of representative embodiments 69, 70, and 72-77, wherein the one or more TF resources may include any of: (1) one or more Resource Elements (REs), one or more Resource Blocks (RBs), and/or (3) one or more symbols.

In representative embodiment 79, the WTRU of any one of representative embodiments 69 and 71-78, wherein the processor may be configured to shorten a subframe that includes one or more symbols which are muted.

In representative embodiment 80, the WTRU of any one of representative embodiments 69, 70 and 72-79, wherein the processor may be configured to mute the one or more TF resources via any of: (1) a blanking operation; (2) a puncturing operation; (3) a rate matching operation; and/or (4) a transmission power control operation.

In representative embodiment 81, the WTRU of any one of representative embodiments 69, 70 and 72-80, wherein the processor may be configured to adjust transmission power levels between or among subsets of the TF resources associated with the communication in the first direction to reduce or substantially eliminate interference to the communication in the second direction.

In representative embodiment 82, the WTRU of representative embodiment 81, wherein the processor may be configured to reduce a power level to a zero power level or a lion-zero power level which is sufficient to enable the communication in the second direction.

In representative embodiment 83, the WTRU of any one of representative embodiments 69, 70 and 72-82, wherein the processor may be configured to apply any of: respectively different power control loops, respectively different power control offsets, respectively different $P_{CMAX}$ values and/or respectively different $P_{CMAX,c}$ values for different TF resources associated with different TF regions.

In representative embodiment 84, the WTRU of any one of representative embodiments 69, 70 and 72-83, wherein the processor may be configured to set a transmission power level of a first subset of the TF resources to a reduced level relative to a transmission power level of a second subset of the TF resources.

In representative embodiment 85, the WTRU of representative embodiment 84, wherein the processor may be configured to adjust a Modulation Coding Scheme (MCS) level of the first subset of the TF resources to any of: (1) a lower MCS level and/or (2) a lowest MCS level.

In representative embodiment 86, the WTRU of any one of representative embodiments 69, 70 and 72-85, wherein: the full duplex transmitter/receiver unit may be configured to receive, in downlink control information (DCI), a first MCS level for a first subset of a plurality of TF resources and a second MCS level for a second subset of the plurality of TF resources; and the processor may be configured to set a transmission power level of the first subset of the TF resources to a reduced level relative to a transmission power level of the second subset of the TF resources based on the received first and second MCS levels and set a MCS level of the first subset of the TF resources to the first MCS level and a MCS level of the second subset of the TF resources to the second MCS level based on the received first and second MCS levels.

In representative embodiment 87, the WTRU of representative embodiment 86, wherein the reduced level may be a zero power level or a non-zero power level which is sufficient to enable the communication in the second direction.

In representative embodiment 88, the WTRU of any one of representative embodiments 69, 70 and 72-87, wherein: the full duplex transmitter/receiver unit may be configured to receive, in downlink control information (DCI), a first transmission power control (TPC) indicator associated with a first subset of the TF resources and a second TPC indicator associated with a second subset of the TF resources; and the processor may be configured to adjust the transmission power level of the first subset of the TF resources based on the received first TPC indicator and adjust the transmission power level of the second subset of the TF resources based on the received second TPC indicator.

In representative embodiment 89, the WTRU of any one of representative embodiments 69, 70 and 72-88, wherein: the full duplex transmitter/receiver unit may be configured to receive muting information related to power control that is associated with the one or more TF resources to be muted; and, the processor may be configured to mute the one or more TF resources in accordance with the received muting information related to the power control.

In representative embodiment 90, the WTRU of representative embodiment 89, wherein the received muting information related to power control may be any of: (1) offset power information associated with the one or more TF resources indicating an offset from the current transmission power of the one or more TF resources; and/or (2) differential power information associated with the one or more TF resources indicating one or more differences between the transmission power of the one or more TF resources and other TF resources in a subframe.

In representative embodiment 91, the WTRU of any one of the representative embodiments 69-90, wherein the communication in the first direction may be a communication in an uplink direction and the communication in the second direction may be a communication in a downlink direction.

In representative embodiment 92, the WTRU of any one of representative embodiments 69-90, wherein the communication in the first direction may be a communication in a downlink direction and the communication in the second direction may be a communication in an uplink direction.

In representative embodiment 93, the WTRU of any one of representative embodiments 69, 70 and 72-92, wherein the WTRU may be any of: a mobile terminal, a network access point (NAP), an evolved Node B (eNB), a Home eNB (HeNB), a Node B, a Home Node B (HNB), and/or a relay node.

In representative embodiment 94, the WTRU of any one of representative embodiments 69, 70 and 72-93, wherein the WTRU may be configured to: receive, determine, or obtain a priority or a relative priority of any of: one or more Demodulation Reference Signals, one or more control channels, one or more resource elements and/or one or more Resource Blocks for the communication in the second direction; and determine a corresponding TF location or TF locations associated with the one or more TF resources for the communication in the first direction to be muted based on the priority or the relative priority such that one or more TF resources at the corresponding TF location or TF locations for the communication in the first direction may be muted.

In representative embodiment 95, the WTRU of representative embodiment 94, wherein the full duplex transmitter/receiver unit may be configured to receive the priority or relative priority in an indication in downlink control information (DCI).

In representative embodiment 96, the WTRU of any one of representative embodiments 69-95, wherein: the full duplex transmitter/receiver unit may be configured to receive an indicator indicating one or more subframes for the WTRU to use full duplex operation; and the processor may be configured to selectively use the full duplex operation in the indicated one or more subframes such that the one or more subframes may be configured for simultaneous transmission and reception of radio frequency (RF) signals.

In representative embodiment 97, the WTRU of any one of representative embodiments 69-96, wherein an operation and/or a number of subframes of the WTRU using the full duplex operation may be independent of a distance of the WTRU to its network access point.

In representative embodiment 98, the WTRU of any one of representative embodiments 69, 70 and 72-97, wherein the processor may be configured to mute the one or more TF resources to reduce or substantially eliminate transmit/receive self-interference from the WTRU and/or neighbor interference for the WTRU between or among the WTRU and one or more other devices.

In representative embodiment 99, the WTRU of any one of representative embodiments 69 and 71-98, wherein the processor may be configured to shorten the one or more subframes to reduce or substantially eliminate transmit/receive self-interference from the WTRU and/or neighbor interference for the WTRU between or among the WTRU and one or more other devices.

In representative embodiment 100, the WTRU of any one of representative embodiments 69, 70 and 72-99, wherein the processor may be configured to mute the one or more TF resources based on one or more TF locations of a signal communicated or to be communicated in the second direction, one or more TF locations of a channel for communication in the second direction and/or one or more TF locations of a reference signal (RS) to be communicated in the second direction.

In representative embodiment 101, the WTRU of representative embodiment 100, wherein the signal, the RS or the channel may include any of: (1) primary and secondary synchronization signals (PSS/SSS), (2) a physical broadcast channel (PBCH), (3) a cell-specific RS (CRS) and/or (4) a Demodulation-RS (DM-RS).

In representative embodiment 102, the WTRU of any one of representative embodiments 69-70 and 72-101, wherein the processor may be configured to: determine whether a subframe is potentially a self-interference subframe and/or potentially a neighbor-interference subframe, as a determined result; and mute the one or more TF resources in accordance with the determined result.

In representative embodiment 103, the method of any one of representative embodiments 69, 70 and 72-102, wherein the processor may be configured to: establish a supportable self-interference level (SIL) indicating a level of signal interference supportable for full duplex operations; and control transmission power of the one or more TF resources such that a SIL does not exceed an interference level in accordance with the supportable SIL.

In representative embodiment 104, the WTRU of any one of representative embodiments 69, 70 and 72-103, wherein the processor may be configured to: determine whether a subframe is to be used for MBSFN operations, as a determined result; and mute the one or more TF resources in accordance with the determined result.

In representative embodiment 105, the WTRU of representative embodiment 73, wherein the priority signaling may include any of: (1) a downlink (DL) synchronization channel; (2) a DL broadcast channel; (3) a DL reference signal, (4) a DL control channel; (5) a UL control channel; and/or (6) a UL reference signal.

In representative embodiment 106, the WTRU of any one of representative embodiments 69, 70 and 72-105, wherein the processor may be configured to: map a signal to a plurality of TF resources including the one or -more TF resources to be muted; and puncture the mapped TF resources at TF locations associated with the one or more TF resources.

In representative embodiment 107, the WTRU of any one of representative embodiments 69, 70 and 72-106, wherein the processor may be configured to rate-match so as to avoid mapping a plurality of TF resources at TF locations associated with the one or more TF resources to be muted.

In representative embodiment 108. the WTRU of any one of representative embodiments 69, 70 and 72-107, wherein the processor may be configured to mute the one or more TF resources for communication in the first direction via messaging with a network resource.

In representative embodiment 109, the WTRU of any one of representative embodiments 69, 70 and 72-108, wherein the processor may be configured to: determine a relative priority of a first signal for communication in the first direction relative to a second signal for communication in the second direction based on at least the information associated with the communication in the second direction; and selectively mute the one or more TF resources of a plurality of TF resources for communication in the first direction based on the determined relative priority.

In representative embodiment 110, the WTRU of any one of representative embodiments 69, 70 and 72-109, wherein the processor may be configured to shorten a subframe to reduce interference levels.

In representative embodiment 111, the WTRU of any one of representative embodiments 69, 70 and 72-110, wherein the processor may be configured to mute the one or more TF resources to reduce interference levels.

In representative embodiment 112, the WTRU of any one of representative embodiments 69, 70 and 72-111, wherein the processor may be configured to dynamically or semi-statically configure a number of symbols of a subframe for communication in the first direction.

In representative embodiment 113, the WTRU of any one of representative embodiments 69, 70 and 72-112, wherein the processor may be configured to: determine a starting symbol associated with the subframe for communication in the first direction; and mute one or more symbols of the subframe that are to be communicated in the first direction located at a time prior to a time of the starting symbol.

In representative embodiment 114, the WTRU of any one of representative embodiments 69, 70 and 72-113, wherein the processor may be configured to mute the one or more TF resources conditioned on any of: (1) a transmission power in the first direction being higher than a threshold; (2) a Transport Block Size (TBS) of the one or more TF resources exceeding a threshold; (3) a Modulation and Coding Scheme (MCS) of the one or more TF resources exceeding a threshold; and/or (4) a redundancy version of the one or more TF resources exceeding a threshold.

In representative embodiment 115, the WTRU of any one of representative embodiments 69, 70 and 72-114, wherein the full duplex transmitter/receiver unit may be configured to transmit one or more signals or reference signals (RSs) associated with the muted TF resources or a subset of the muted TF resources in one or more different parts of the subframe for communication in the first direction.

In representative embodiment 116, the WTRU of any one of representative embodiments 69, 70 and 72-115, wherein the processor may be configured to time and/or frequency shift one or more signals or one or more reference signals (RSs) associated with the muted TF resources for communication in the first direction.

In representative embodiment 117, the WTRU of any one of representative embodiments 69, 70 and 72-116, wherein the processor may be configured to mute the one or more TF resources conditioned on: the one or more TF resources being located in any of: (1) one or more particular TF locations; (2) one or more TF locations in a center portion of a frequency band; (3) one or more TF locations in an edge portion of the frequency band; (4) a particular subframe; (5) a subframe relative to signaling or an indication in an earlier subframe; (6) a particular symbol; and/or (7) a particular symbol relative to signaling or an indication in an earlier symbol.

In representative embodiment 118, the WTRU of any one of representative embodiments 69-117, wherein the processor may be configured to: apply zero transmission power, low transmission power and/or an almost blank subframe (ABS), as an applied transmission power reduction, to one or a plurality of TF resources in the first direction; and measure an interference level for the second direction at TF locations associated with the applied TF resources.

In representative embodiment 119, the WTRU of any one of representative embodiments 69, 70 and 72-118, wherein the processor may be configured to determine one or more priorities for the one or more TF resources associated with the communication in the first direction based on any of: (1) Quality of Service (QoS) parameters for one or more logical channels associated with the one or more TF resources; (2) a number of retransmissions associated with one or a plurality of the one or more TF resources for the communication in the first direction; and/or (3) whether one or a plurality of the one or more TF resources are for a retransmission of the communication in the first direction.

In representative embodiment 120, the WTRU of any one of representative embodiments 69, 70 and 72-119, wherein the processor may be configured to: determine or detect one or more priorities associated with TF resources at TF locations for communication in the second direction that correspond to the one or more TF resources associated with the communication in the first direction; and TF mute, symbol mute and/or subframe shorten based on a relative priority of the TF resources associated with a corresponding TF location for the communication in the first direction and the communication in the second direction.

In representative embodiment 121, a Wireless Transmit/Receive Unit (WTRU) may comprise: a transmitter/receiver unit configured to obtain information associated with communication in the second direction indicating a self-interference condition, a potential self-interference condition, a neighboring interference condition or a potential neighboring interference condition; and a processor configured to configure the WTRU for an interference avoiding TF resource structure on condition that the information associated with communication in the second direction indicates any of: the self-interference condition, the potential self-interference condition, the neighboring interference condition and/or the potential neighboring interference condition.

In representative embodiment 122, the WTRU of representative embodiments 121, wherein: the self-interference condition may indicate interference between TF resources for transmission in the first direction from the WTRU and priority TF resources for reception in the second direction by the WTRU; and the neighboring interference condition may indicate interference between or among TF resources for transmission in the first direction from the WTRU and priority TF resources for reception in the second direction by one or more other WTRUs.

In representative embodiment 123, the WTRU of any one of representative embodiments 121-122, wherein the processor may be configured to use any combination of TF muting, symbol muting and subframe shortening to reduce or substantially eliminate self-interference or neighboring interference.

In representative embodiment 124, a Network Access Point (NAP) in communication with a Wireless Transmit/Receive Unit (WTRU) using time-frequency (TF) resources for communications in first and second directions may comprise: a processor configured to determine whether to TF mute, symbol mute, and/or subframe shorten a communication in the first direction for controlling interference between the communication in the first direction and a communication in the second direction; and a full duplex transmitter/receiver unit configured to send configuration information for the WTRU to TF mute, symbol mute and/or subframe shorten one or more TF resources, one or more symbols and/or one or more subframes for communication in the first direction.

In representative embodiment 125, the NAP of representative embodiment 124, wherein the configuration information may include an indication to selectively TF mute, selectively symbol mute and/or selectively subframe shorten the one or more TF resources, the one or more symbols and/or the one or more subframes based on a relative priority of any of: one or more signals, one or more channels, one or more RBs, one or more REs and/or one more symbols.

In representative embodiment 126, the NAP of any one of representative embodiments 124-125, wherein the full duplex transmitter/receiver unit may be configured to send an indication of one or more subframes that are to include Full Duplex Radio Resources (FDRRs).

In representative embodiment 127, the NAP of any one of representative embodiments 124-126, wherein the processor and the full duplex transmitter/receiver unit may be configured to generate and send the configuration information to the WTRU to enable the WTRU to apply any of: respectively different power control loops, respectively different power control offsets, respectively different $P_{CMAX}$ values and/or respectively different $P_{CMAX,c}$ values for different TF resources associated with different TF regions.

In representative embodiment 128, the NAP of any one of representative embodiments 124-127, wherein the configuration information may include any of: (1) a fixed rank indicated from downlink control information (DCI) for a first subset of TF resources; and/or (2) a first rank indicated from the DCI for the first subset of TF resources that is smaller than a second rank for a second subset of TF resources.

In representative embodiment 129, the NAP of representative embodiment 128, wherein the DCI may indicate an offset for the first rank from the second rank.

In representative embodiment 130, the NAP of any one of representative embodiments 124-129, wherein the processor and the full duplex transmitter/receiver unit may be configured to generate and send, in downlink control information (DCI), a first Modulation and Coding Scheme (MCS) level for a first subset of a plurality of TF resources and a second MCS level for a second subset of the plurality of TF resources for the WTRU to set a transmission power level of the first subset of the TF resources to a reduced level relative to a transmission power level of the second subset of the TF resources based on the received first and second MCS levels and to set a MCS level of the first subset of the TF resources to the first MCS level and a MCS level of the second subset of TF resources to the second MCS level based on the received first and second MCS levels.

In representative embodiment 131, the NAP of any one of representative embodiments 124-130, wherein the processor and the full duplex transmitter/receiver unit may be configured to generate and send, in downlink control information (DCI), a first transmission power control (TPC) indicator associated with a first subset of the TF resources and a second TPC indicator associated with a second subset of the TF resources to individually adjust a transmission power level of the first and second subsets of the TF resources.

In representative embodiment 132, the NAP of any one of representative embodiments 124-131, wherein the processor and the full duplex transmitter/receiver unit may be configured to generate and send muting information related to power control associated with the one or more TF resources to be muted.

In representative embodiment 133, the NAP of any one of representative embodiments 124-132, wherein the processor and the full duplex transmitter/receiver unit may be configured to generate and send an indication that any of: one or more reference signals, one or more control channels, one or more resource elements and/or one or more Resource Blocks in the communication in the second direction are a priority.

In representative embodiment 134, the NAP of any one of representative embodiments 124-133, wherein the processor and the full duplex transmitter/receiver unit may be configured to generate and send an indicator indicating one or more subframes for the WTRU to use full duplex operation.

In representative embodiment 135, the NAP of any one of representative embodiments 124-134, wherein the processor and the full duplex transmitter/receiver unit may be configured to generate and send an indication of a starting symbol associated with a subframe for communication in the first direction to configure the WTRU for muting one or more symbols of the subframe that are to be communicated in the first direction located at a time prior to a time indicated by the starting symbol.

In representative embodiment 136, the NAP of any one of representative embodiments 124-135, wherein the processor and the full duplex transmitter/receiver unit may be configured to: determine or establish one or more priorities for the one or more TF resources associated with the communication in the first direction based on any of (1) Quality of Service (QoS) parameters for one or more logical channels associated with the one or more TF resources; (2) a number of retransmissions associated with one or a plurality of the one or more TF resources for the communication in the first direction; and/or (3) whether one or a plurality of the one or more TF resources are for a retransmission of the communication in the first direction.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a UE, WTRU, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any WTRU recited herein, are provided below with respect to FIGS. 1-5.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used in conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method implemented by a Wireless Transmit/Receive Unit (WTRU), the method comprising:
   receiving first information indicating a pattern of one or more timeslots, wherein each timeslot of the one or more timeslots is associated with one of a plurality of timeslot types, and wherein the plurality of timeslot types are configured to be used for any one or more of a first communication direction or a second communication direction;
   receiving second information indicating that at least one of the one or more timeslots is associated with a Synchronization Signal (SS) transmission or Physical Broadcast Channel (PBCH) transmission in the first communication direction;
   determining whether a scheduled transmission in the second communication direction would overlap with any symbol of the SS transmission or any symbol of the PBCH transmission in the first communication direction; and
   on condition that the scheduled transmission would not overlap with any symbol of the SS transmission or any symbol of the PBCH transmission in the first communication direction, transmitting the scheduled transmission in the second communication direction in at least one timeslot from among the one or more timeslots.

2. The method of claim 1, wherein the pattern indicates one or more timeslots associated with a first timeslot type for communication in the first communication direction, one or more timeslots associated with a second timeslot type for communication in the second communication direction, and one or more timeslots associated with a third timeslot type for communication in any of: the first communication direction or the second communication direction.

3. The method of claim 2, wherein the pattern indicates a sequence of a first set of downlink timeslots of the first timeslot type for communication in the first communication direction, followed by a second set of uplink/downlink timeslots of the third timeslot type for communication in either the first direction or the second direction, followed by a third set of downlink uplink timeslots of the second timeslot type for communication in the second direction.

4. The method of claim 1, further comprising:
   receiving, by the WTRU in Downlink Control Information, third information indicating an uplink grant; and
   determining, by the WTRU, whether to transmit a Physical Uplink Shared Channel (PUSCH) transmission or a Physical Uplink Control Channel (PUCCH) transmission in the second communication direction in a timeslot, based on at least the third information and a timeslot type of the timeslot.

5. The method of claim 1, further comprising:
   determining, by the WTRU, whether to transmit a Physical Uplink Shared Channel (PUSCH) transmission or a Physical Uplink Control Channel (PUCCH) transmission in the second communication direction in a timeslot, based on at least a grant and whether a collision is expected to occur in the timeslot between: (1) any of the PUSCH transmission or the PUCCH transmission in the second communication direction, and (2) the SS transmission or PBCH transmission in the first communication direction.

6. The method of claim 1, further comprising:
   receiving, by the WTRU in Downlink Control Information, third information indicating an uplink grant; and
   determining, by the WTRU, whether to transmit a Physical Uplink Shared Channel (PUSCH) transmission or a Physical Uplink Control Channel (PUCCH) transmission in the second communication direction in a timeslot, based on at least the third information, a timeslot type of the timeslot and whether a collision is expected to occur in the timeslot between: (1) any of the PUSCH transmission or the PUCCH transmission in the second communication direction, and (2) the SS transmission or PBCH transmission in the first communication direction.

7. The method of claim 1, wherein:
   the first information is received via Radio Resource Control signaling or physical layer signaling, and
   the SS transmission is any of a primary SS transmission or a secondary SS transmission.

8. The method of claim 1, wherein the first communication direction is a downlink communication direction to the WTRU and the second communication direction is an uplink communication direction from the WTRU.

9. A Wireless Transmit/Receive Unit (WTRU), comprising:
   a transmit/receive unit configured to:
   receive first information indicating a pattern of one or more timeslots, wherein each timeslot of the one or more timeslots is associated with one of a plurality of timeslot types, and wherein the plurality of timeslot types are configured to be used for any one or more of a first communication direction or a second communication direction, and receive second information indicating that at least one of the one or more timeslots is associated with a Synchronization Signal (SS) transmission or Physical Broadcast Channel (PBCH) transmission in the first communication direction; and a processor configured to:

determine whether a scheduled transmission in the second communication direction would overlap with any symbol of the SS transmission or any symbol of the PBCH transmission in the first communication direction, and on condition that the scheduled transmission would not overlap with any symbol of the SS transmission or any symbol of the PBCH transmission in the first communication direction, transmit the scheduled transmission in the second communication direction in at least one timeslot from among the one or more timeslots.

10. The WTRU of claim 9, wherein the processor is configured to at least one of:

selectively timeslot mute transmissions associated with time-frequency (TF) resources of the second communication direction, the time-frequency resources corresponding to the at least one of the timeslots associated with the SS transmission or the PBCH transmission in the first communication direction; or selectively mute a portion of the scheduled transmission in the second communication direction.

11. The WTRU of claim 10, wherein the processor is configured to drop or shift a Physical Uplink Shared Channel (PUSCH) transmission or a Physical Uplink Control Channel (PUCCH) transmission to be carried by the TF resources of the muted timeslot.

12. The WTRU of claim 9, wherein the pattern indicates one or more timeslots that are associated with a first timeslot type for communication in the first communication direction, one or more timeslots that are associated with a second timeslot type for communication in the second communication direction, and one or more timeslots associated with a third timeslot type for communication in any of: the first communication direction or the second communication direction.

13. The WTRU of claim 12, wherein the pattern indicates a sequence of a first set of downlink timeslots of the first timeslot type for communication in the first communication direction, followed by a second set of uplink/downlink timeslots of the third timeslot type for communication in either the first direction or the second direction, followed by a third set of uplink timeslots of the second timeslot type for communication in the second direction.

14. The WTRU of claim 9, wherein:

the transmit/receive unit is configured to receive in Downlink Control Information, third information indicating an uplink grant; and the processor is configured to determine whether to transmit a Physical Uplink Shared Channel (PUSCH) transmission in the second communication direction in a timeslot, based on at least the third information and the timeslot type of the timeslot.

15. The WTRU of claim 9, wherein the processor is configured to determine whether to transmit a Physical Uplink Shared Channel (PUSCH) transmission or a Physical Uplink Control Channel (PUCCH) transmission in the second communication direction in a timeslot, based on at least a grant and whether a collision is expected to occur in the timeslot between: (1) any of the PUSCH transmission or the PUCCH transmission in the second communication direction, and (2) the SS transmission or PBCH transmission in the first communication direction.

16. The WTRU of claim 9, wherein:

the transmit/receive unit is configured to receive in Downlink Control Information, third information indicating an uplink grant; and the processor is configured to determine whether to transmit a Physical Uplink Shared Channel (PUSCH) transmission in the second communication direction in a timeslot, based on at least the third information, a timeslot type of the timeslot and whether a collision is expected to occur in the timeslot between: (1) any of the PUSCH transmission or the PUCCH transmission in the second communication direction, and (2) the SS transmission or PBCH transmission in the first communication direction.

17. The WTRU of claim 9, wherein:

the first information is received via Radio Resource Control signaling or physical layer signaling, and the SS transmission is any of a primary SS transmission or a secondary SS transmission.

18. The WTRU of claim 9, wherein the first communication direction is a downlink communication direction to the WTRU and the second communication direction is an uplink communication direction from the WTRU.

19. The method of claim 1, comprising:

on condition that the scheduled transmission would overlap with any symbol of the SS transmission or the PBCH transmission in the first communication direction, prior to the transmitting, muting at least a portion of the scheduled transmission in the second communication direction.

20. The WTRU of claim 9, wherein:

on condition that the scheduled transmission would overlap with any symbol of the SS transmission or the PBCH transmission in the first communication direction, the processor is configured to:

prior to the transmitting, mute at least a portion of the scheduled transmission in the second communication direction.

21. A method implemented by a Wireless Transmit/Receive Unit (WTRU), the method comprising:

receiving first information indicating a pattern of one or more timeslots, wherein each timeslot of the one or more timeslots is one of a plurality of timeslot types, and wherein the plurality of timeslot types are configured to be used for any of a first communication direction and a second communication direction;

receiving, second information indicating that at least one of the one or more timeslots is associated with a Synchronization Signal (SS) transmission or Physical Broadcast Channel (PBCH) transmission in the first communication direction;

determining, whether a scheduled transmission in the second communication direction would overlap with any symbol of the SS transmission or any symbol of the PBCH transmission in the first communication direction; and on condition that the scheduled transmission would overlap with any symbol of the SS transmission or any symbol of the PBCH transmission in the first communication direction, not transmitting the scheduled transmission in the second communication direction in at least one timeslot from among the one or more timeslots.

22. A Wireless Transmit/Receive Unit (WTRU), comprising:

a transmit/receive unit configured to:

receive first information indicating a pattern of one or more timeslots, wherein each timeslot of the one or more timeslots is one of a plurality of timeslot types, and wherein the plurality of timeslot types are configured to be used for any of a first communication direction and a second communication direction;

receive second information indicating that at least one of the one or more timeslots is associated with a Synchronization Signal (SS) transmission or Physical Broadcast Channel (PBCH) transmission in the first communication direction; and a processor configured to:

determine whether a scheduled transmission the second communication direction would overlap with any symbol of the SS transmission or any symbol of the PBCH transmission in the first communication direction; and on condition that the scheduled transmission would overlap with any symbol of the SS transmission or any symbol of the PBCH transmission in the first communication direction, not transmit the scheduled transmission in the second communication direction in at least one timeslot from among the one or more timeslots.

23. The method of claim 1, wherein one of the plurality of timeslot types comprises a flexible timeslot type configured for simultaneous transmission in an uplink direction and reception in a downlink direction.

24. The WTRU of claim 9, wherein one of the plurality of timeslot types comprises a flexible timeslot type configured for simultaneous transmission in an uplink direction and reception in a downlink direction.

* * * * *